United States Patent
Han et al.

(10) Patent No.: US 11,563,336 B2
(45) Date of Patent: Jan. 24, 2023

(54) WIRELESS CHARGING RECEIVER CIRCUIT AND CHIP, AND WIRELESS CHARGING RECEIVER

(71) Applicant: Halo Microelectronics Co., Ltd., Foshan (CN)

(72) Inventors: Shuang Han, Foshan (CN); Rui Liu, Fremont, CA (US); Songnan Yang, Frisco, TX (US)

(73) Assignee: Halo Microelectronics Co., Ltd., Foshan (CN)

( * ) Notice: Subject to any disclaimer, the term of this patent is extended or adjusted under 35 U.S.C. 154(b) by 0 days.

(21) Appl. No.: 17/650,128

(22) Filed: Feb. 7, 2022

(65) Prior Publication Data

US 2022/0166246 A1 May 26, 2022

Related U.S. Application Data

(63) Continuation-in-part of application No. 17/410,694, filed on Aug. 24, 2021, now Pat. No. 11,290,027.

(30) Foreign Application Priority Data

Sep. 23, 2020 (CN) .......................... 202011011827.4

(51) Int. Cl.
*H02J 7/02* (2016.01)
*H02J 50/10* (2016.01)
*H02M 7/219* (2006.01)
*H02M 3/07* (2006.01)
*H02M 1/00* (2006.01)

(52) U.S. Cl.
CPC ................ *H02J 7/02* (2013.01); *H02J 50/10* (2016.02); *H02M 1/0095* (2021.05); *H02M 3/07* (2013.01); *H02M 7/219* (2013.01); *H02J 2207/20* (2020.01); *H02M 1/0045* (2021.05)

(58) Field of Classification Search
CPC ...... H02J 7/02; H02J 2207/20; H02M 1/0095; H02M 3/07; H02M 7/219
USPC ........................................................ 307/149
See application file for complete search history.

(56) References Cited

U.S. PATENT DOCUMENTS

| | | | |
|---|---|---|---|
| 2013/0147280 A1* | 6/2013 | Oettinger | H02J 50/80 307/104 |
| 2013/0229062 A1 | 9/2013 | Bae | |
| 2013/0300204 A1* | 11/2013 | Partovi | H04B 5/0093 307/104 |
| 2014/0132210 A1* | 5/2014 | Partovi | H02J 50/90 320/108 |
| 2018/0131239 A1 | 5/2018 | Stephenson et al. | |
| 2018/0219405 A1 | 8/2018 | Qiu et al. | |
| 2019/0067995 A1* | 2/2019 | Schaevitz | H04B 5/0081 |

* cited by examiner

*Primary Examiner* — Alfonso Perez Borroto
(74) *Attorney, Agent, or Firm* — Slater Matsil, LLP

(57) ABSTRACT

A wireless charging receiver circuit includes a first bridge arm unit connected to the first node and a common ground node, a second bridge arm unit connected to the second node and the common ground node, a first voltage converter unit connected to the second node and the common ground node, a second voltage converter unit connected to the first node and a common ground node, a filter circuit, a bias power supply circuit, and a control unit configure to control the switch transistors, such that the voltage output terminals of the first voltage converter unit and the second voltage converter unit output a voltage signal.

20 Claims, 37 Drawing Sheets

WIRELESS CHARGING RECEIVER CIRCUIT AND CHIP, AND WIRELESS CHARGING RECEIVER

PRIORITY CLAIM

This application is a continuation-in-part of U.S. patent application Ser. No. 17/410,694, filed Aug. 24, 2021, and entitled "Wireless Charging Receiver Circuit and Chip, and Wireless Charging Receiver," which claims the benefit of and priority to Chinese Patent Application No. 202011011827.4, filed Sep. 23, 2020, all of which are hereby incorporated by reference.

TECHNICAL FIELD

The present disclosure relates to the technical field of wireless charging, and in particular, relates to a wireless charging receiver circuit and chip, and a wireless charging receiver.

BACKGROUND

At present, it is common to wirelessly charge batteries in smart phones. Since a wireless charging transmitter transmits energy in the form of a magnetic field, the energy of the magnetic field needs to be converted to electric energy using a wireless charging receiver. For high efficiency, coils of the wireless charging receiver are capable of operating at an operating voltage reaching 20 V to reduce power consumption of resistance in the coils. However, a maximum operating voltage of a single battery is less than 5 V. For a minimum power loss during charging of the battery, a high-efficient DC/DC conversion is needed to lower the output voltage of the wireless charging receiver to 5 V or even lower. A charge pump based DC/DC converter is a main topological structure for achieving such a voltage conversion. In a 2:1 voltage down converting ratio, the efficiency may reach 98%.

For system powered by a single-cell battery, two charge pump based DC/DC converters need to be cascaded (first 4:2 and then 2:1), to lower the output voltage of the wireless charging receiver (reaching 20 V) to the voltage of the single-cell battery (5 V). Therefore, three integrated circuit chips are used in front of the battery.

In practice, the wireless charging receiver chip and the high-voltage 4:2 charge pump chip are generally placed together to be proximal to the coils of the wireless charging receiver, and the low-voltage 2:1 charge pump chip is placed to be proximal to a battery connector. This is because an output current of the 2:1 charge pump is four times the output current of the wireless charging receiver. A device with such high output current needs to be placed to be proximal to the load thereof, to reduce power consumption of the resistance in a PCB as much as possible. In a smart phone system, configuration of such components allows the wireless charging receiver and the high-voltage charge pump to be integrated in a single device.

FIG. 1 illustrates a block diagram of a simplified system directly integrating a wireless charging receiver and a charge pump. In FIG. 1, although the wireless charging receiver and the high-voltage charge pump are integrated, since these two devices operate independently of each other. In such integration, filtering needs to be performed at outputs of synchronization rectifiers (Q1 to Q4) and at an output of a primary low dropout regulator (LDO) (Q5). In addition, from the coils to VOUT, five or six power switch devices are connected in series for converting a received alternating-current power supply into a direct-current power supply. Therefore, in the related art, additional filter capacitors ($C_{RECT}$, $C_{PMID}$) need to be configured, and a large number of power switches are used. As a result, a large-size integrated circuit device is needed and the integration cost is higher.

SUMMARY

The present disclosure provides a wireless charging receiver circuit and chip, and a wireless charging receiver, which may reduce the size of an integrated circuit device and lower the integration cost.

In the first aspect, embodiments of the present disclosure provide a wireless charging receiver circuit. The wireless charging receiver circuit includes a first bridge arm unit, a second bridge arm unit, a first voltage converter unit, a second voltage converter unit, a filter circuit, a bias power supply circuit, and a control unit, wherein one terminal of the first bridge arm unit and one terminal of the second voltage converter unit are both connected to a first node, one terminal of the second bridge arm unit and one terminal of the first voltage converter unit are both connected to a second node, and the other terminal of the first bridge arm unit, the other terminal of the second bridge arm unit, the other terminal of the first voltage converter unit, and the other terminal of the second voltage converter unit are all connected to a common ground node. Voltage output terminals of the first voltage converter unit and the second voltage converter unit are both connected to the filter circuit, wherein the first bridge arm unit includes a first switch transistor and a second switch transistor, wherein the first switch transistor and the second switch transistor are series-connected in a same direction, and a connection node between a source of the first switch transistor and a drain of the second switch transistor is a first connection node, and a non-inverting output terminal of an externally input alternating current signal being connected to the first connection node, the second bridge arm unit includes a third switch transistor and a fourth switch transistor, wherein the third switch transistor and the fourth switch transistor are series-connected in a same direction, and a connection node between a source of the third switch transistor and a drain of the fourth switch transistor is a second connection node, an inverting output terminal of the alternating current signal being connected to the second connection node, the bias power supply circuit is arranged between the first connection node and the second connection node, and is configured to supply a startup power supply, and the control unit is connected to the first bridge arm unit, the second bridge arm unit, the first voltage converter unit, and the second voltage converter unit, and is configured to control turn-on or turn-off of the switch transistors based on the externally input alternating current signal, such that the voltage output terminals of the first voltage converter unit and the second voltage converter unit output a voltage signal.

In a second aspect, embodiments of the present disclosure further provide a wireless charging receiver chip. The wireless charging receiver chip includes a wireless charging receiver circuit. The wireless charging receiver circuit includes a first bridge arm unit, a second bridge arm unit, a first voltage converter unit, a second voltage converter unit, a filter circuit, a bias power supply circuit, and a control unit.

One terminal of the first bridge arm unit and one terminal of the second voltage converter unit are both connected to a first node, one terminal of the second bridge arm unit and one terminal of the first voltage converter unit are both connected to a second node, and the other terminal of the first bridge arm unit, the other terminal of the second bridge arm unit, the other terminal of the first voltage converter unit, and the other terminal of the second voltage converter unit are all connected to a common ground node.

The voltage output terminals of the first voltage converter unit and the second voltage converter unit are both connected to the filter circuit, wherein the first bridge arm unit comprises a first switch transistor and a second switch transistor, wherein the first switch transistor and the second switch transistor are series-connected in a same direction, and a connection node between a source of the first switch transistor and a drain of the second switch transistor is a first connection node, and a non-inverting output terminal of an externally input alternating current signal being connected to the first connection node.

The second bridge arm unit comprises a third switch transistor and a fourth switch transistor, wherein the third switch transistor and the fourth switch transistor are series-connected in a same direction, and a connection node between a source of the third switch transistor and a drain of the fourth switch transistor is a second connection node, an inverting output terminal of the alternating current signal being connected to the second connection node.

The bias power supply circuit is arranged between the first connection node and the second connection node, and is configured to supply a startup power and the control unit is connected to the first bridge arm unit, the second bridge arm unit, the first voltage converter unit, and the second voltage converter unit, and is configured to control turn-on or turn-off of the switch transistors based on the externally input alternating current signal, such that the voltage output terminals of the first voltage converter unit and the second voltage converter unit output a voltage signal.

In a third aspect, embodiments of the present disclosure further provide a wireless charging receiver. The wireless charging receiver includes a wireless charging receiver coil and the wireless charging receiver chip as described above, wherein the wireless charging receiver coil is configured to generate the alternating current signal.

The present disclosure provides a wireless charging receiver circuit and chip, and a wireless charging receiver. The wireless charging receiver circuit includes a first bridge arm unit, a second bridge arm unit, a first voltage converter unit, a second voltage converter unit, and a control unit. One terminal of the first bridge arm unit and one terminal of the second voltage converter unit are both connected to a first node, one terminal of the second bridge arm unit and one terminal of the first voltage converter unit are both connected to a second node, and the other terminal of the first bridge arm unit, the other terminal of the second bridge arm unit, the other terminal of the first voltage converter unit, and the other terminal of the second voltage converter unit are all connected to a common ground node. The first bridge arm unit includes a first switch transistor and a second switch transistor. The first switch transistor and the second switch transistor are series-connected in a same direction. A connection node between a source of the first switch transistor and a drain of the second switch transistor is a first connection node, and a non-inverting output terminal of an externally input alternating current signal is connected to the first connection node. The second bridge arm unit includes a third switch transistor and a fourth switch transistor. The third switch transistor and the fourth switch transistor are series-connected in a same direction. A connection node between a source of the third switch transistor and a drain of the fourth switch transistor is a second connection node, and an inverting output terminal of the alternating current signal is connected to the second connection node. In this way, the external filter capacitors are reduced, and thus the size of the integrated circuit device is reduced, and the integration cost is lowered.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

For clearer descriptions of the objectives, technical solutions, and advantages of the embodiments of the present disclosure, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. Based on the embodiments of the present disclosure, all other embodiments derived by persons of ordinary skill in the art without any creative efforts shall fall within the protection scope of the present disclosure.

Figure 2:
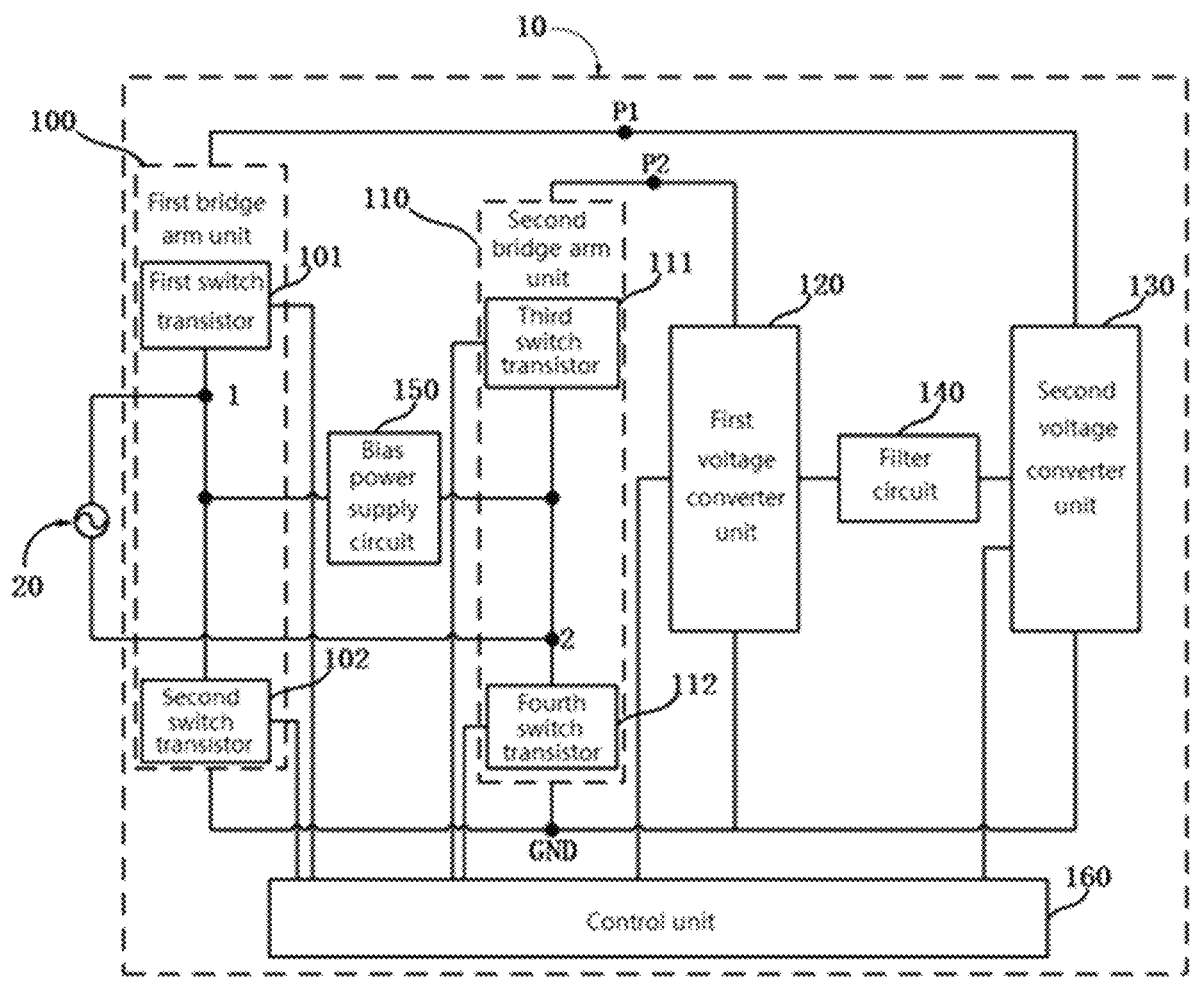
FIG. 2 is a schematic circuit diagram of a wireless charging receiver circuit according to an embodiment of the present disclosure.

Referring to FIG. 2, FIG. 2 is a schematic circuit diagram of a wireless charging receiver circuit according to an embodiment of the present disclosure. A wireless charging receiver circuit 10 includes a first bridge arm unit 100, a second bridge arm unit 110, a first voltage converter unit 120, a second voltage converter unit 130, a filter circuit 140, a bias power supply circuit 150, and a control unit 160.

Specifically, one terminal of the first bridge arm unit 100 and one terminal of the second voltage converter unit 130 are both connected to a first node P1. One terminal of the second bridge arm unit 110 and one terminal of the first voltage converter unit 120 are both connected to a second node P2. The other terminal of the first bridge arm unit 100, the other terminal of the second bridge arm unit 110, the other terminal of the first voltage converter unit 120, and the other terminal of the second voltage converter unit 130 are all connected to a common ground node GND. Voltage output terminals of the first voltage converter unit 120 and the second voltage converter unit 130 are both connected to the filter circuit 140. The first bridge arm unit 100 includes a first switch transistor 101 and a second switch transistor 102. The first switch transistor 101 and the second switch transistor 102 are series-connected in a same direction. A connection node between a source of the first switch transistor 101 and a drain of the second switch transistor 102 is a first connection node 1, and a non-inverting output terminal of an externally input alternating current signal 20 is connected to the first connection node 1. The second bridge arm unit 110 includes a third switch transistor 111 and a fourth switch transistor 112. The third switch transistor 111 and the fourth switch transistor 112 are series-connected in a same direction. A connection node between a source of the third switch transistor 111 and a drain of the fourth switch transistor 112 is a second connection node 2, and an inverting output terminal of the alternating current signal 20 is connected to the second connection node 2. The bias power supply circuit 150 is arranged between the first connection node 1 and the second connection node 2. The control unit 160 is connected to the first bridge arm unit 100, the second bridge arm unit 110, the first voltage converter unit 120, and the second voltage converter unit 130.

The bias power supply circuit 150 is configured to supply a startup power. The control unit 160 is configured to control the turn-on or turn-off of the switch transistors based on an externally input alternating current signal 20, such that voltage output terminals of the first voltage converter unit 120 and the second voltage converter unit 130 each outputs a voltage signal. The voltage signal is filtered by the filter circuit 140, and then output to a load terminal.

In practice, when the alternating current signal 20 is just input to the wireless charging receiver circuit 10, first, the bias power supply circuit 150 receives power, and then the bias power supply circuit 150 supplies a desired operating voltage to the control unit 160. The control unit 160, after a startup process, is capable of controlling the turn-on or turn-off of the switch transistors.

Figure 3:
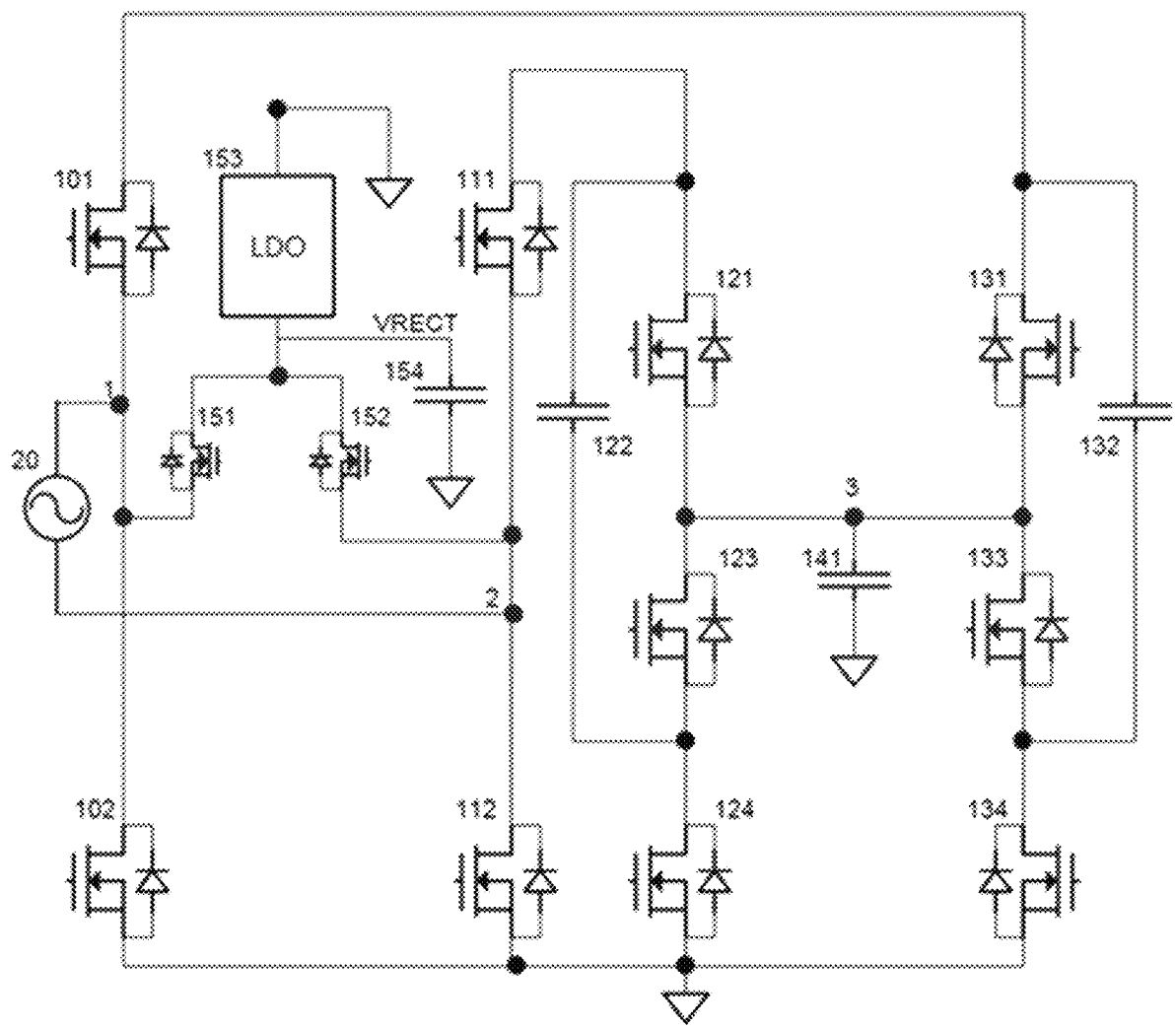
FIG. 3 is a schematic circuit diagram of a wireless charging receiver circuit according to an embodiment of the present disclosure.

Optionally, referring to FIG. 3 in combination with FIG. 2, the bias power supply circuit 150 includes a first bias switch transistor 151, a second bias switch transistor 152, a low-dropout regulator 153, and a second filter capacitor 154.

Specifically, a voltage input terminal of the low-dropout regulator 153 is connected to a drain of the first bias switch transistor 151, a drain of the second bias switch transistor 152, and one terminal of the second filter capacitor 154. A source of the first bias switch transistor 151 is connected to the first connection node 1. A source of the second bias switch transistor 152 is connected to the second connection node 2. The other terminal of the second filter capacitor 154 is connected to ground.

In one aspect, the bias power supply circuit 150 is intended to act as a startup bias power supply. In the case that the alternating current signal 20 is initially applied to the wireless charging receiver circuit 10, a bias power supply VRECT is provided to the low-dropout regulator 153 by the first bias switch transistor 151, the second bias switch transistor 152, the second switch transistor 102, and the fourth switch transistor 112, and by filtering by the second filter capacitor 154. The bias power supply VRECT acts as a startup power supply of the control unit 160. In this way, in the case that the wireless charging receiver circuit according to the present disclosure is placed on a wireless charging transmitter, the wireless charging receiver circuit may be automatically started up with no need of an external bias power supply. In another aspect, the bias power supply circuit 150 is intended to use the voltage from the bias power supply VRECT as a monitor of the voltage of a receiver coil, and in turn to regulate an output power of the wireless charging transmitter such that a desired output voltage is acquired at a wireless receiver end.

Optionally, the filter circuit 140 includes a first filter capacitor 141. One terminal of the first filter capacitor 141 is connected to a third connection node 3, and the other terminal of the first filter capacitor 141 is connected to ground.

In another embodiment, still referring to FIG. 3 in combination with FIG. 2, the first voltage converter unit 120 includes a first capacitor 122, and a fifth switch transistor 121, a sixth switch transistor 123, and a seventh switch transistor 124 that are successively series-connected in a same direction. A unit formed by the fifth switch transistor 121 and the sixth switch transistor 123 series-connected in the same direction is connected in parallel with the first capacitor 122. That is, one terminal of the first capacitor 122 is connected to a drain of the fifth switch transistor 121, and the other terminal of the first capacitor 122 is connected to a source of the sixth switch transistor 123. A source of the seventh switch transistor 124 is connected to ground. The second voltage converter unit 130 includes a second capacitor 132, and an eighth switch transistor 131, a ninth switch transistor 133, and a tenth switch transistor 134 that are successively series-connected in a same direction. A unit formed by the eighth switch transistor 131 and the ninth switch transistor 133 series-connected in the same direction is connected in parallel with the second capacitor 132. That is, one terminal of the second capacitor 132 is connected to a drain of the eighth switch transistor 131, and the other terminal of the second capacitor 132 is connected to a source of the ninth switch transistor 133. A source of the tenth switch transistor 134 is connected to ground. A connection node between the fifth switch transistor 121 and the sixth switch transistor 123, and a connection node between the eighth switch transistor 131 and the ninth switch transistor 133 are both connected to the filter circuit 140 at the third connection node 3.

Further, the control unit 160 controls the turn-on or turn-off of the switch transistors as illustrated in FIG. 3, such that the wireless charging receiver circuit 10 operates in different operating modes. For example, the operating modes may include a bypass mode, a charge pump mode, a reverse bypass mode, and a reverse charge pump mode.

In the case that the wireless charging receiver circuit 10 operates in the bypass mode, in response to voltages on the first capacitor 122 and the second capacitor 132 being less than a first predetermined voltage, the control unit 160 controls the seventh switch transistor 124 and the tenth switch transistor 134 to be turned on. In response to the voltages on the first capacitor 122 and the second capacitor 132 being greater than or equal to the first predetermined voltage, the control unit 160 continues controlling the fifth switch transistor 121 and the eighth switch transistor 131 to be turned on. In response to a voltage on the third connection node 3 being greater than or equal to a second predetermined voltage, the control unit 160 controls the first switch transistor 101 and the fourth switch transistor 112 to be turned on together in alternate with the second switch transistor 102 and the third switch transistor 111 in a mode of synchronous rectification.

In practice, in the bypass mode, the seventh switch transistor 124 and the tenth switch transistor 134 are constantly in a turn-on state, whereas the sixth switch transistor 123 and the ninth switch transistor 133 are constantly in a turn-off state, such that a voltage on the first filter capacitor 141 is maintained at zero. The first switch transistor 101, the second switch transistor 102, the third switch transistor 111, and the fourth switch transistor 112 operate as a full-wave synchronous rectifier. The first capacitor 122 and the second capacitor 132 act as output filter capacitors of the synchronous rectifier. The fifth switch transistor 121 and the eighth switch transistor 131 act as output low dropout regulators (LDOs). In the case that the wireless charging receiver circuit according to the present disclosure is placed on the wireless charging transmitter, the low dropout regulator 153 first turns on the sixth switch transistor 123 and the ninth switch transistor 133, and meanwhile maintains the other switch transistors in a turn-off state. Parasitic diodes of the first switch transistor 101, the second switch transistor 102, the third switch transistor 111, and the fourth switch transistor 112 act as a full-wave rectifier and are turned on to generate a voltage across the first capacitor 122 and the second capacitor 132. In response to the voltages on the first capacitor 122 and the second capacitor 132 reaching a target value, the fifth switch transistor 121 and the eighth switch transistor 131 are turned on, such that the first filter capacitor 141 acquires a charge voltage, that is, the voltage on the third connection node 3.

In response to an output power of the third connection node 3 reaching a predetermined value, the first switch transistor 101, the second switch transistor 102, the third switch transistor 111, and the fourth switch transistor 112 act as a synchronous rectifier, such that the efficiency of the entire system is improved. The VRECT voltage is constantly monitored, and the output power of the wireless charging transmitter is controlled based on different output load states or load transient states, to regulate the voltage on the third connection node 3.

In the case that the wireless charging receiver circuit 10 operates in the charge pump mode, in response to the alternating current signal 20 being in a positive half cycle, the control unit 160 controls the first switch transistor 101, the fourth switch transistor 112, the fifth switch transistor 121, the seventh switch transistor 124 and the ninth switch transistor 133 to be turned on. In response to the alternating current signal 20 being in a negative half cycle, the control unit 160 controls the second switch transistor 102, the third switch transistor 111, the sixth switch transistor 123, the eighth switch transistor 131, and the tenth switch transistor 134 to be turned on and controls the other switch transistors to be turned off.

In the charge pump mode, the fifth switch transistor 121 and the eighth switch transistor 131 no longer function as the low dropout regulators. The first switch transistor 101, the eighth switch transistor 131, the ninth switch transistor 133, the tenth switch transistor 134, and the second capacitor 132 constitute one phase of a 4:2 charge pump. The third switch transistor 111, the fifth switch transistor 121, the sixth switch transistor 123, the seventh switch transistor 124, and the first capacitor 122 constitute the other phase of the 4:2 charge pump. The charge pump operates in an operating frequency equal to that of the wireless charging transmitter, and a 180-degree phase shift is produced between the two phases of circuits of the charge pump.

Figure 1:
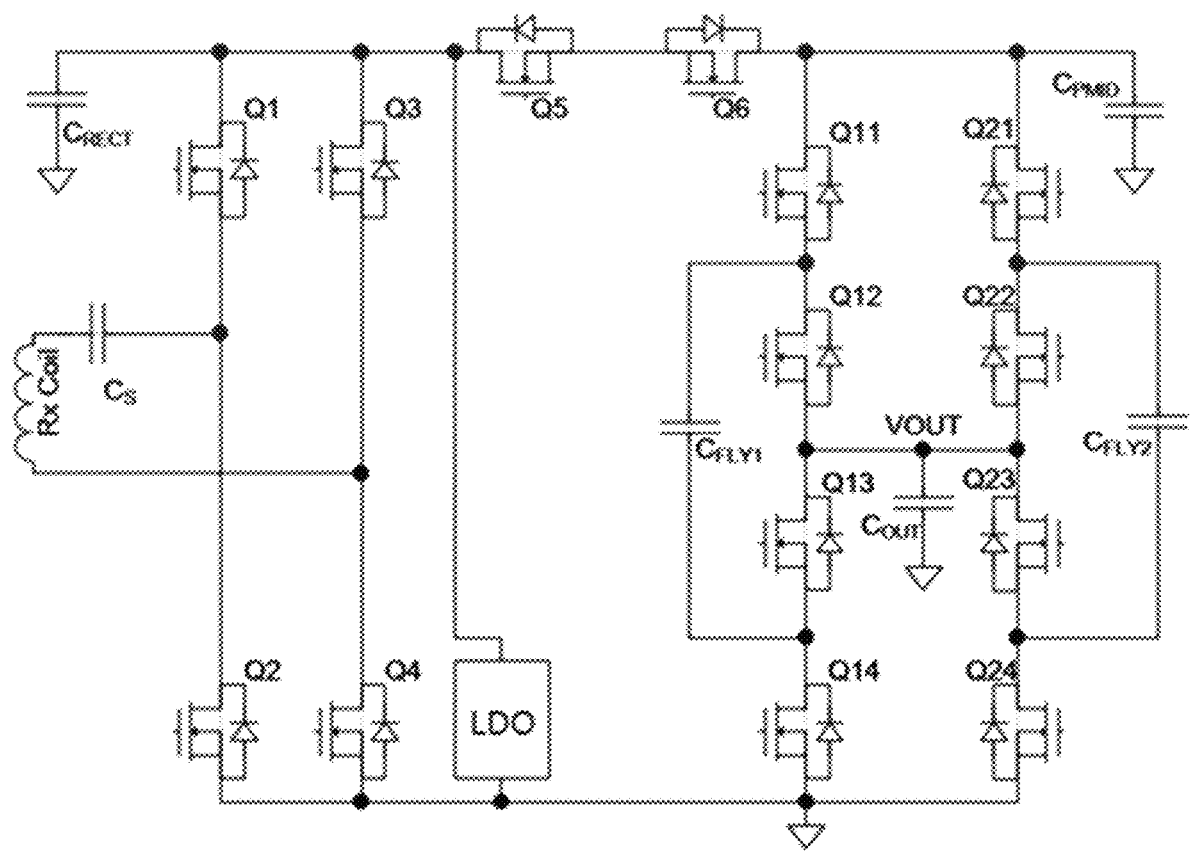
FIG. 1 is a schematic circuit diagram of a wireless charging receiver circuit in the related art.

The first capacitor 122 and the second capacitor 132 are generally alternately charged by the alternating current signal 20. With such a solution, a large surge current may not be generated during the startup process. In addition, during a transition between the bypass mode and the charge pump mode, no large surge current may be generated. In this way, at the minimum, the switch transistor Q5 and the switch transistor Q6, as illustrated in FIG. 1, can be eliminated, and thus power consumption during operation of the circuit is reduced and high power conversion efficiency is achieved. In addition, the current signal traveling through the first bridge arm unit 100 and the second bridge arm unit 110 may directly charge the first capacitor 122 and the second capacitor 132. Therefore, the synchronous rectifier does not need to be filtered, and thus capacitors CRECT and CPMID, as illustrated in FIG. 1, may be omitted and external elements and required PCB area are reduced.

Figure 4:
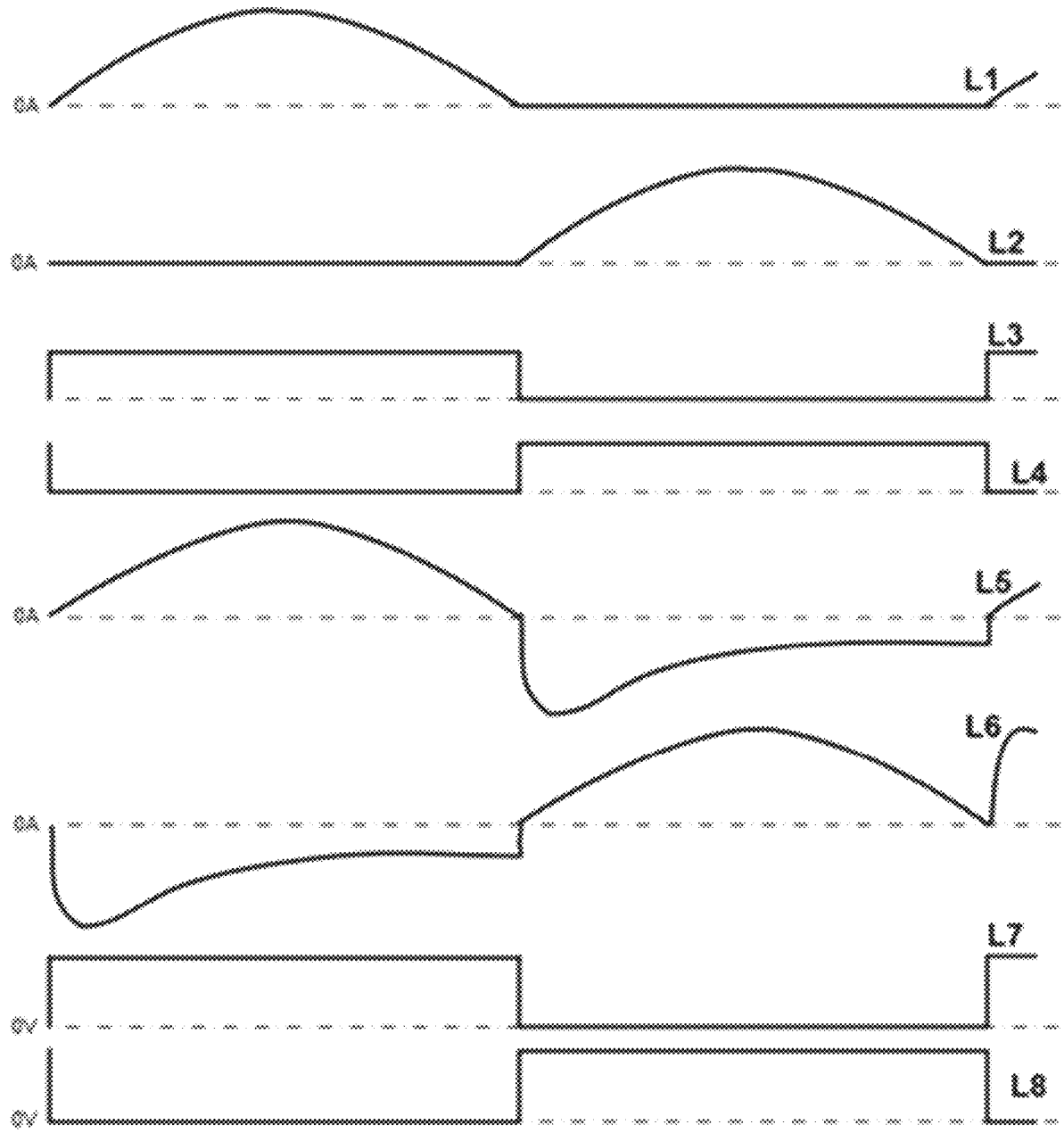
FIG. 4 is a waveform diagram of a current and a voltage in the wireless charging receiver circuit according to an embodiment of the present disclosure.

A waveform of a current and a voltage in the wireless charging receiver circuit in the charge pump mode is as illustrated in FIG. 4. Referring to FIG. 4 in combination with FIG. 3, a curve L1 is a curve of a current signal traveling through the first switch transistor 101 in the case that the alternating current signal 20 is in the positive half cycle. A curve L2 is a curve of a current signal traveling through the third switch transistor 111 in the case that the alternating current signal 20 is in the negative half cycle. A curve L3 reflects switch signals of the first switch transistor 101, the fourth switch transistor 112, the fifth switch transistor 121, the seventh switch transistor 124 and the ninth switch transistor 133. A curve L4 represents switch signals of the second switch transistor 102, the third switch transistor 111, the sixth switch transistor 123, the eighth switch transistor 131 and the tenth switch transistor 134. A curve L5 reflects a current signal traveling through the second capacitor 132. A curve L6 reflects a current signal traveling through the first capacitor 122. A curve L7 reflects a voltage signal on the first connection node 1. A curve L8 reflects a voltage signal on the second connection node 2.

In the positive half cycle of the alternating current signal 20, starting from point 0 of the curve, the first switch transistor 101, the fourth switch transistor 112, and the ninth switch transistor 133 are being turned on. The voltage on the first connection node 1 is twice the voltage on the third connection node 3, and the voltage on the second connection node 2 is clamped to ground, that is, a voltage at a highest point on the curve L7 is twice the voltage on the third connection node 3. During this time period, the second capacitor 132 and the first filter capacitor 141 are charged by the alternating current signal 20 in the positive half cycle, and a current on the curve L5 starts increasing. Meanwhile, the fifth switch transistor 121 and the seventh switch transistor 124 are turned on, such that the first capacitor 122 is discharged to the first filter capacitor 141, and a current on the curve L6 starts decreasing. Once the positive half cycle of the alternating current signal 20 reaches zero, the first switch transistor 101, the fourth switch transistor 112, and the ninth switch transistor 133 are turned off under a zero current. Afterwards, in the negative half cycle of the alternating current signal 20, the eighth switch transistor 131 and the tenth switch transistor 134 are turned on, and energy stored in the second capacitor 132 is transferred to the first filter capacitor 141, and thus the current on the curve L5 starts decreasing. The second switch transistor 102, the third switch transistor 111, and the sixth switch transistor 123 are turned on, and the alternating current signal 20 in the negative half cycle charges the first capacitor 122 and the first filter capacitor 141, and thus the current on the curve L6 starts increasing. During this time period, the fifth switch transistor 121 and the seventh switch transistor 124 are turned off. In the case that the negative half cycle of the alternating current signal 20 reaches zero, the second switch transistor 102, the third switch transistor 111, and the ninth switch transistor 133 are turned off at the zero current, and then the alternating current signal 20 enters another positive half cycle, and the entire process is cyclically performed.

In the case that the wireless charging receiver circuit 10 operates in the reverse bypass mode, the control unit 160 controls the fifth switch transistor 121, the seventh switch transistor 124, the eighth switch transistor 131 and the tenth switch transistor 134 to be turned on, and meanwhile controls the sixth switch transistor 123 and the ninth switch transistor 133 to be turned off. The control unit 160 controls the first switch transistor 101 and the fourth switch transistor 112 to be turned on or turned off phase-complementarily with the second switch transistor 102 and the third switch transistor 111 at a first predetermined switching frequency.

In the case that the wireless charging receiver circuit 10 operates in the reverse bypass mode, the fifth switch transistor 121, the seventh switch transistor 124, the eight switch transistor 131, and the tenth switch transistor 134 are constantly in a turn-on state, and meanwhile the sixth switch transistor 123 and the ninth switch transistor 133 are constantly in a turn-off state. The first capacitor 122 and the second capacitor 132 are constantly connected to ground by the seventh switch transistor 124 and the tenth switch transistor 134, and act as bypass capacitors of a full-bridge inverter. The first switch transistor 101 and the fourth switch transistor 112 are turned on or turned off phase-complementarily with the second switch transistor 102 and the third switch transistor 111 at a same predetermined switching frequency, and thus a direct-current voltage applied to the full-bridge inverter is equal to the voltage applied to the third connection node 3.

In the case that the wireless charging receiver circuit 10 operates in the reverse charge pump mode, the control unit 160 controls a first switch transistor group constituted by the first switch transistor 101, the fourth switch transistor 112, the fifth switch transistor 121, the seventh switch transistor 124, and the ninth switch transistor 133 to be turned on or turned off at a second predetermined switching frequency. The control unit 160 controls a second switch transistor group constituted by the second switch transistor 102, the third switch transistor 111, the sixth switch transistor 123, the eighth switch transistor 131, and the tenth switch transistor 134 to be turned on or turned off phase-complementarily with the first switch transistor group at the second predetermined switching frequency.

In a reverse 1:2 charge pump mode, the sixth switch transistor 123 and the ninth switch transistor 133 are turned on or turned off under the same control signal intended to control the third switch transistor 111 and the first switch transistor 101. The fifth switch transistor 121 and the seventh switch transistor 124 are controlled under the same control signal intended to control the first switch transistor 101. The eighth switch transistor 131 and the tenth switch transistor 134 are controlled under the same control signal intended to control the third switch transistor 111. In such an operating mode, the direct-current voltage applied to the full-bridge inverter is twice the voltage applied to the connection node 3. This reverse charge mode is equivalent to series-connecting the wireless charging transmitter to a 1:2 charge pump, and the voltage at the input terminal of the wireless charging transmitter is doubled from the voltage applied to the third connection node 3. In the reverse 1:2 charge pump mode, the switching frequency is equal to an operating frequency of an equivalent transmitter.

Figure 5:
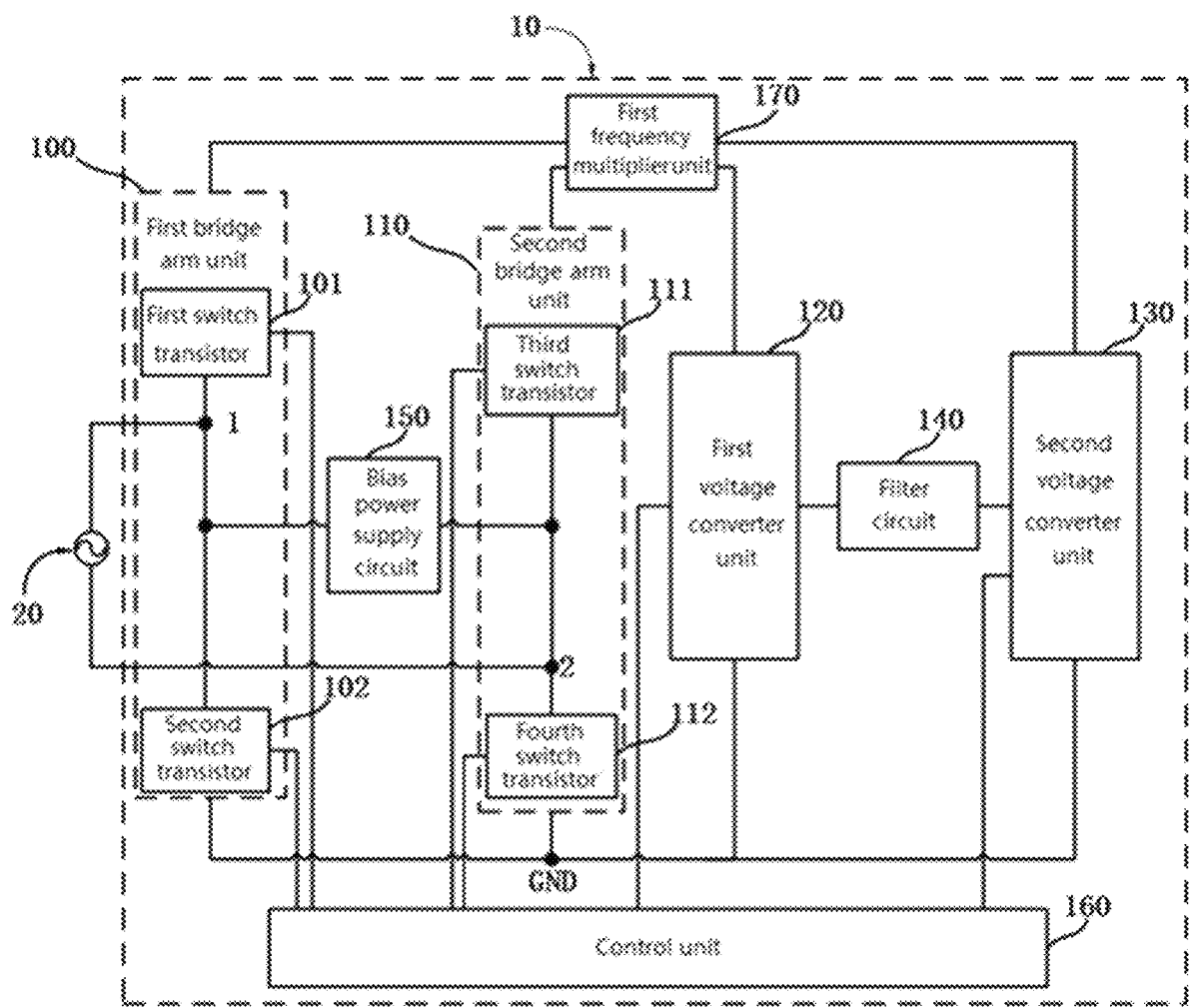
FIG. 5 is a schematic circuit diagram of a wireless charging receiver circuit according to an embodiment of the present disclosure.

In an embodiment, as illustrated in FIG. 5, the wireless charging receiver circuit 10 further includes a first frequency multiplier unit 170. The first frequency multiplier unit 170 is connected to the first bridge arm unit 100, the second bridge arm unit 110, the first voltage converter unit 120, and the second voltage converter unit 130. With the first frequency multiplier unit 170, the first voltage converter unit 120 and the second voltage converter unit 130 operate in a switching frequency that is an integer multiple of a frequency of the alternating current signal 20.

Figure 5A:
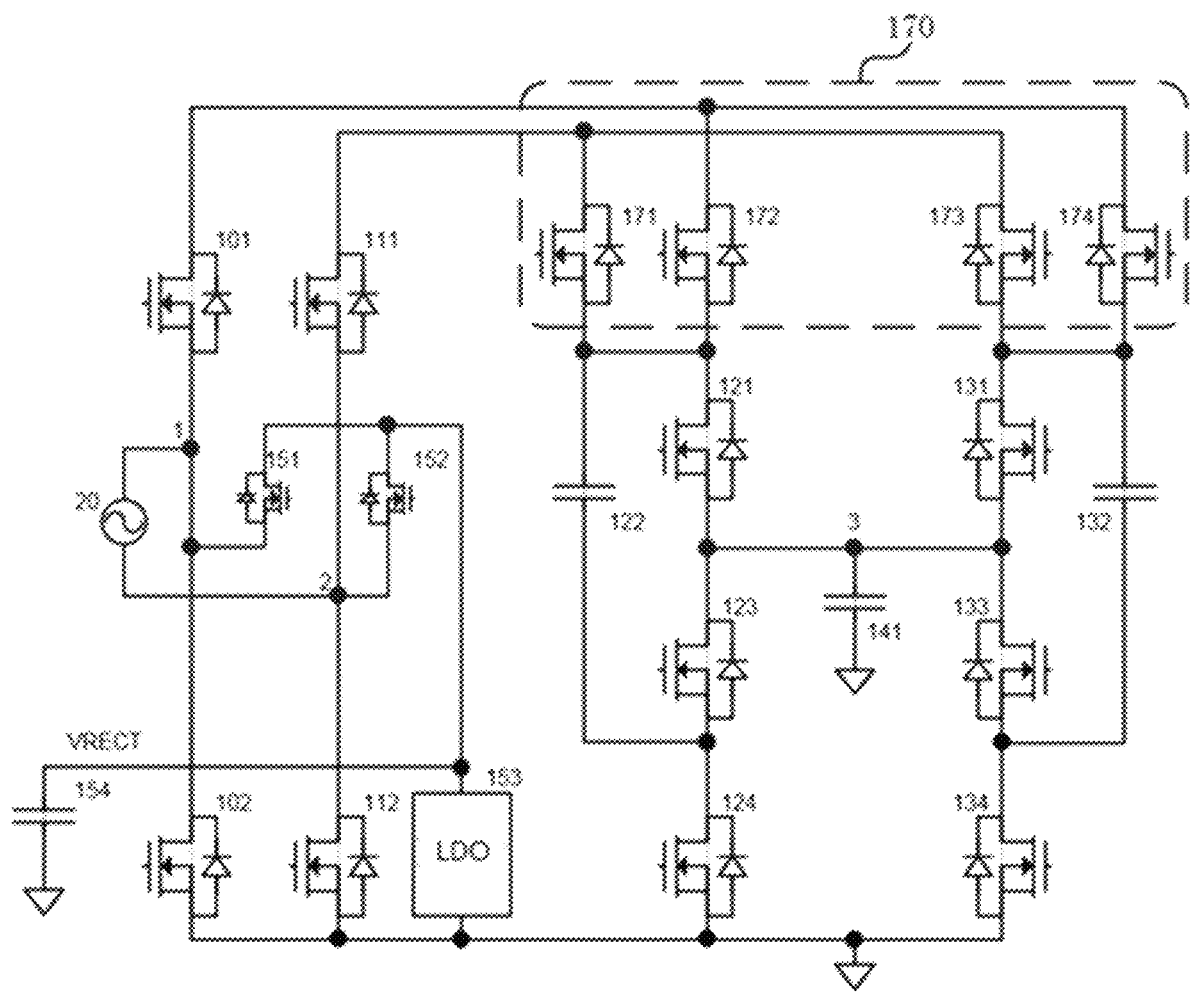
FIG. 5a is a schematic circuit diagram of a wireless charging receiver circuit according to an embodiment of the present disclosure.

Optionally, as illustrated in FIG. 5a, the first frequency multiplier unit 170 includes an eleventh switch transistor 171, a twelfth switch transistor 172, a thirteenth switch transistor 173, and a fourteenth switch transistor 174. A source of the eleventh switch transistor 171 is connected to a source of the twelfth switch transistor 172. A drain of the eleventh switch transistor 171 is connected to a drain of the third switch transistor 111. A drain of the twelfth switch transistor 172 is connected to a drain of the first switch transistor 101. A source of the thirteenth switch transistor 173 is connected to a source of the fourteenth switch transistor 174. A drain of the thirteenth switch transistor 173 is connected to the drain of the third switch transistor 111, and a drain of the fourteenth switch transistor 174 is connected to the drain of the first switch transistor 101.

In practice, in the case that the wireless charging receiver circuit 10 operates in a charge pump mode, between a starting point of a positive half cycle and a peak of the positive half cycle of the alternating current signal 20, the control unit 160 controls the first switch transistor 101, the fourth switch transistor 112, the fifth switch transistor 121, the seventh switch transistor 124, the ninth switch transistor 133, and the fourteenth switch transistor 174 to be turned on, and controls the other switch transistors to be turned off. Between the peak of the positive half cycle and an end of the positive half cycle of the alternating current signal 20, the control unit 160 maintains the first switch transistor 101 and the fourth switch transistor 112 in a turn-on state, controls the sixth switch transistor 123, the eighth switch transistor 131, the tenth switch transistor 134, and the twelfth switch transistor 172 to be turned on, and controls the other switch transistors to be turned off. Between a starting point of a negative half cycle and a peak of the negative half cycle of the alternating current signal 20, the control unit 160 controls the second switch transistor 102, the third switch transistor 111, the fifth switch transistor 112, the seventh switch transistor 124, the ninth switch transistor 133, and the thirteenth switch transistor 173 to be turned on, and controls the other switch transistors to be turned off. Between the peak of the negative half cycle and an end of the negative half cycle of the alternating current signal 20, the control unit 160 maintains the second switch transistor 102 and the third switch transistor 111 in the turn-on state, controls the sixth switch transistor 123, the eighth switch transistor 131, the tenth switch transistor 134, and the eleventh switch transistor 171 to be turned on, and controls the other switch transistors to be turned off.

In the case that the first switch transistor 101 is turned on, the eleventh switch transistor 171 and the thirteenth switch transistor 173 allow two phases of the charge pump to be charged. Likewise, in the case that the third switch transistor 111 is turned on, the twelfth switch transistor 172 and the fourteenth switch transistor 174 allow two phases of the charge pump to be charged. From a starting point of the positive half cycle of the alternating current signal 20, the first switch transistor 101 and the fourth switch transistor 112 are turned on. The fourteenth switch transistor 174 and the ninth switch transistor 133 are turned on to allow the alternating current signal 20 to charge the second capacitor 132 and the first filter capacitor 141, and meanwhile, during this time period, the fifth switch transistor 121 and the seventh switch transistor 124 are turned on to allow the first capacitor 122 to discharge to the first filter capacitor 141. In response to reaching the peak of the positive half cycle of the alternating current signal 20, the fifth switch transistor 121 and seventh switch transistor 124 are turned off. The twelfth switch transistor 172 and the sixth switch transistor 123 are turned on, and the alternating current signal 20 starts charging the first capacitor 122 and the first filter capacitor 141. Meanwhile, the fourteenth switch transistor 174 and the ninth switch transistor 133 are turned off, and the eighth switch transistor 131 and the tenth switch transistor 134 are turned on, to transfer energy stored in the second capacitor 132 to the first filter capacitor 141. In the case that the current of the alternating current signal 20 is reversed, the second switch transistor 102 and the third switch transistor 111 are turned on, and then the above operations are cyclically performed. Under this operating condition, the switching frequency of the charge pump is twice the operating frequency of the wireless charging transmitter.

Figure 6:
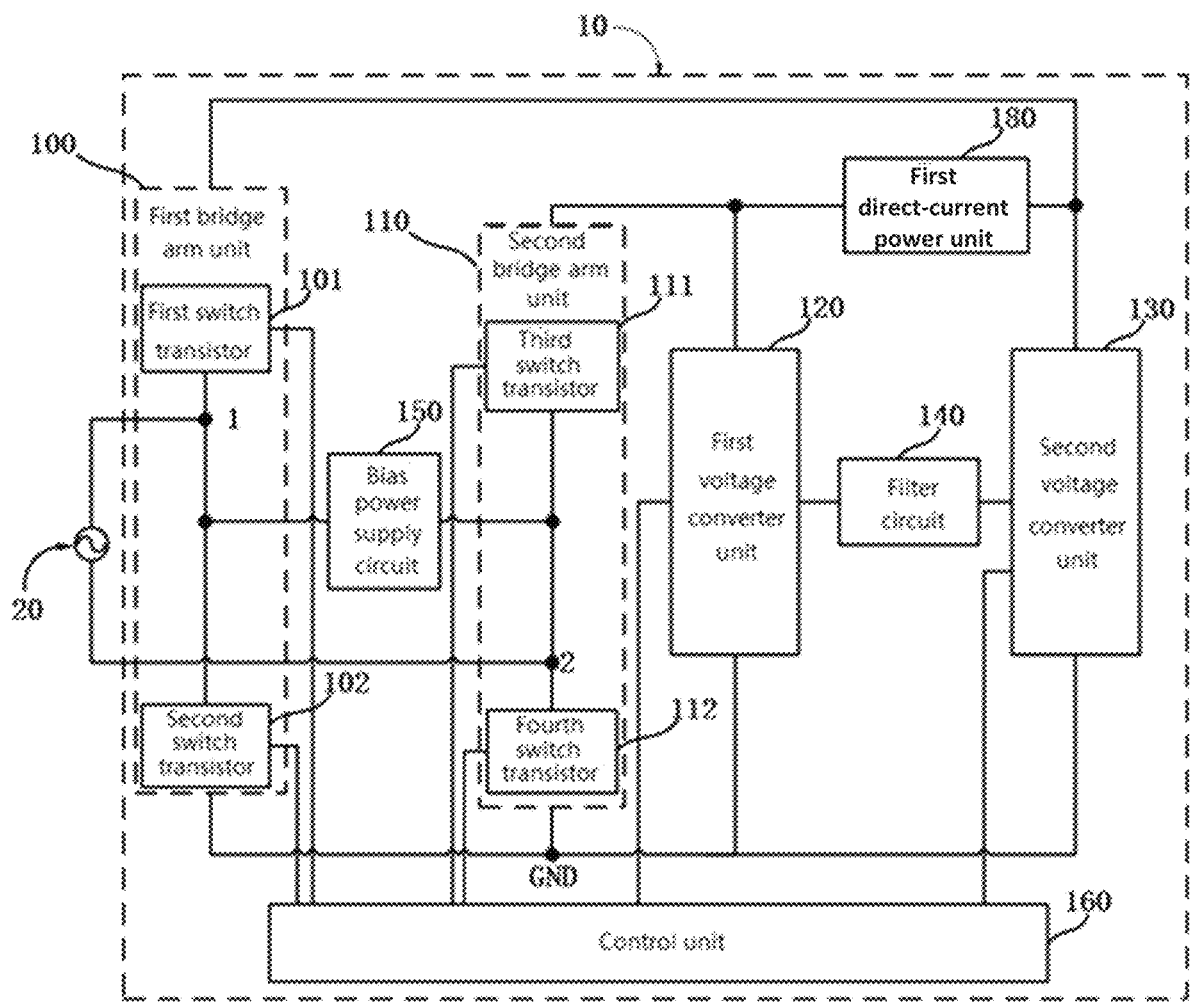
FIG. 6 is a schematic circuit diagram of a wireless charging receiver circuit according to an embodiment of the present disclosure.

In another embodiment, as illustrated in FIG. 6, the wireless charging receiver circuit 10 further includes a first direct-current power unit 180. The first direct-current power unit 180 is configured to act as a direct-current power supply. The operating mode of the wireless charging receiver circuit 10 further includes a direct-current input charge pump mode.

Figure 6A:
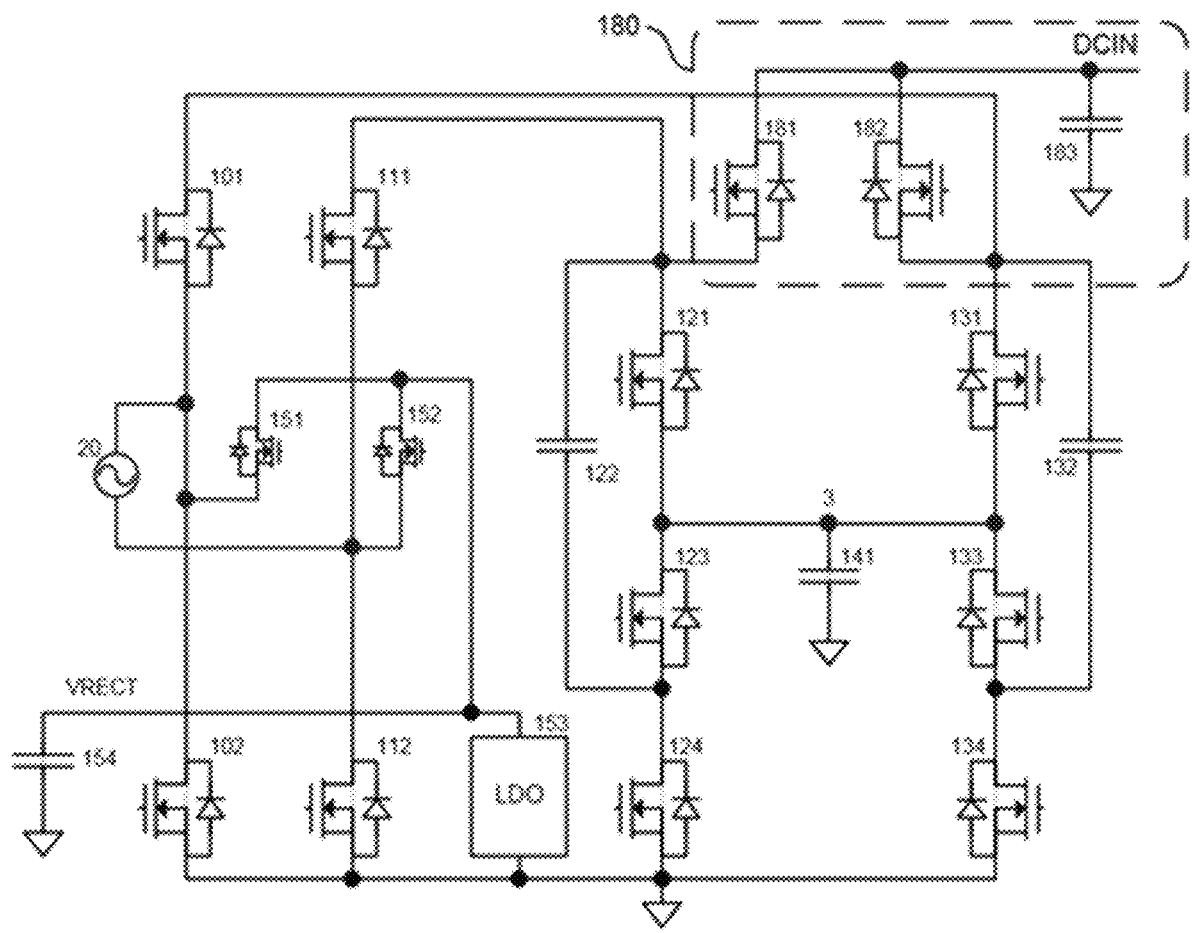
FIG. 6a is a schematic circuit diagram of a wireless charging receiver circuit according to an embodiment of the present disclosure.

Specifically, as illustrated in FIG. 6a, the first direct-current power supply unit 180 includes a fifteenth switch transistor 181, a sixteenth switch transistor 182, and a third capacitor 183. A source of the fifteenth switch transistor 181 is connected to the drain of the fifth switch transistor 121. A source of the sixteenth switch transistor 182 is connected to the drain of the eighth switch transistor 131. A drain of the fifteenth switch transistor 181 and a drain of the sixteenth switch transistor 182 are both connected to one terminal of the third capacitor 183, and the other terminal of the third capacitor 183 is connected to ground.

In the case that the wireless charging receiver circuit 10 operates in the direct-current input charge pump mode, the control unit 160 controls a third switch transistor group formed by the fifth switch transistor 121, the seventh switch transistor 124, the ninth switch transistor 133, and the sixteenth switch transistor 182 to be turned on or turned off at a third predetermined switching frequency. The control unit 160 controls a fourth switch transistor group formed by the sixth switch transistor 123, the eighth switch transistor 131, the tenth switch transistor 134, and the fifteenth switch transistor 181 to be turned on or turned off complementarily with the third switch transistor group at the third predetermined switching frequency, and controls the other switch transistors to be turned off.

It should be understood that a DCIN pin of the first direct-current power supply unit 180 is configured as an input of an external direct-current power supply. For example, the input may be a USB input or a direct-current power supply input.

Figure 7:
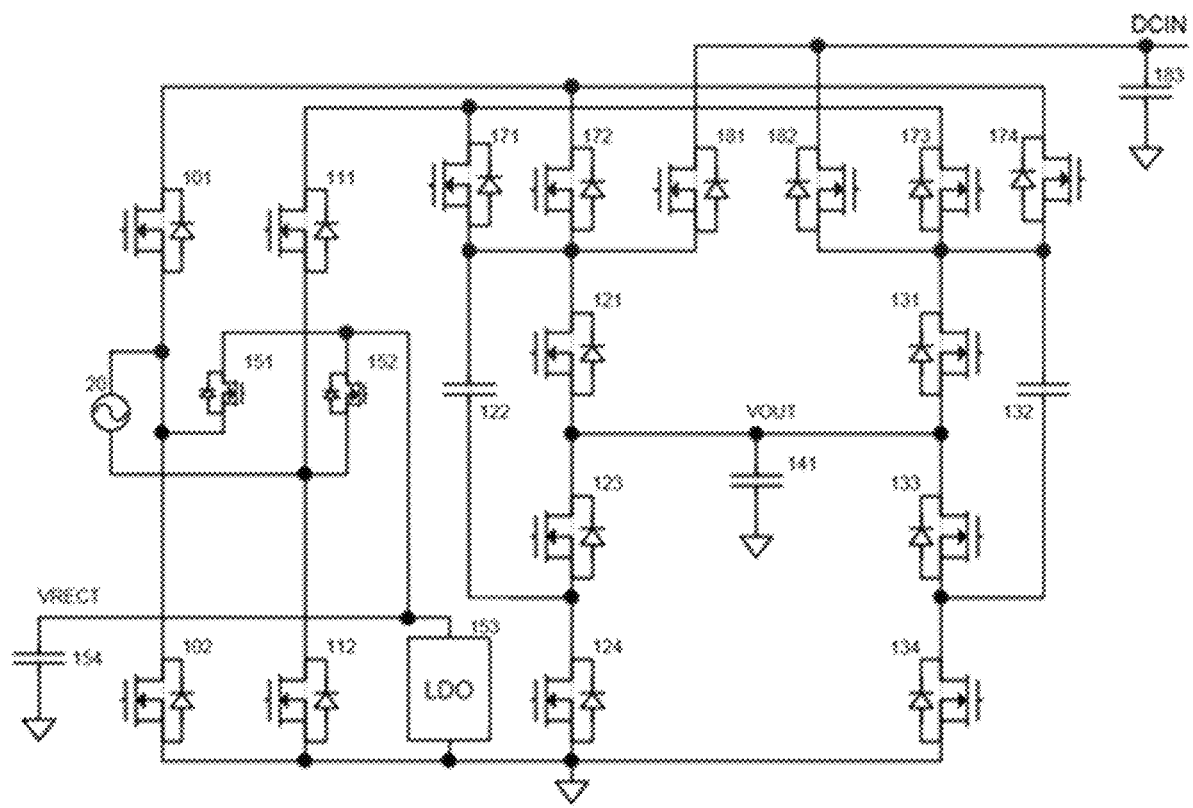
FIG. 7 is a schematic circuit diagram of a wireless charging receiver circuit according to an embodiment of the present disclosure.

In another embodiment, as illustrated in FIG. 7, the wireless charging receiver circuit 10 further includes the first frequency multiplier unit 170 and the first direct-current power supply unit 180 as described above. In this way, a charge pump operates at a switching frequency that is a multiple of an operating frequency of the wireless charging transmitter and a 2:1 charge pump that converts the direct-current power supply are simultaneously achieved.

Figure 8:
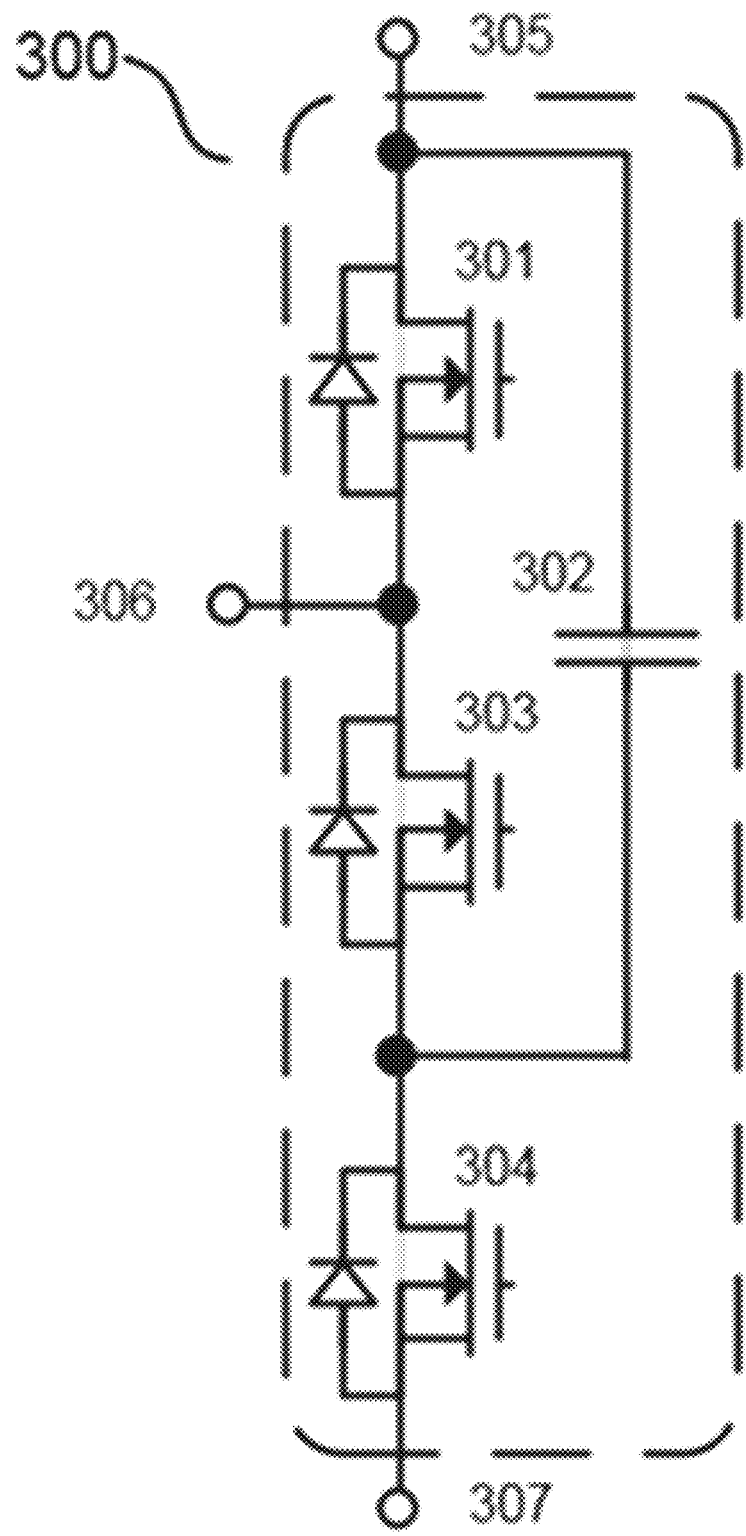
FIG. 8 is a schematic circuit diagram of a first expansion unit according to an embodiment of the present disclosure.

In another embodiment, the wireless charging receiver circuit 10 further includes at least one first expansion unit 300 as illustrated in FIG. 8. The at least one first expansion unit 300 is configured to convert a ratio of an effective value of a voltage difference between the first connection node 1 and the second connection node 2 to an output voltage of the wireless charging receiver circuit 10 to N:1. N is a positive integer.

The first expansion unit 300 includes a fourth capacitor 302, and a first expansion switch transistor 301, a second expansion switch transistor 303, and a third expansion switch transistor 304 that are successively series-connected in a same direction. One terminal of the fourth capacitor 302 is connected to a drain of the first expansion switch transistor 301, and the other terminal of the fourth capacitor 302 is connected to a source of the second expansion switch transistor 303. In addition, three connection nodes 305, 306 and 307 are used to connect other circuits.

Figure 9:
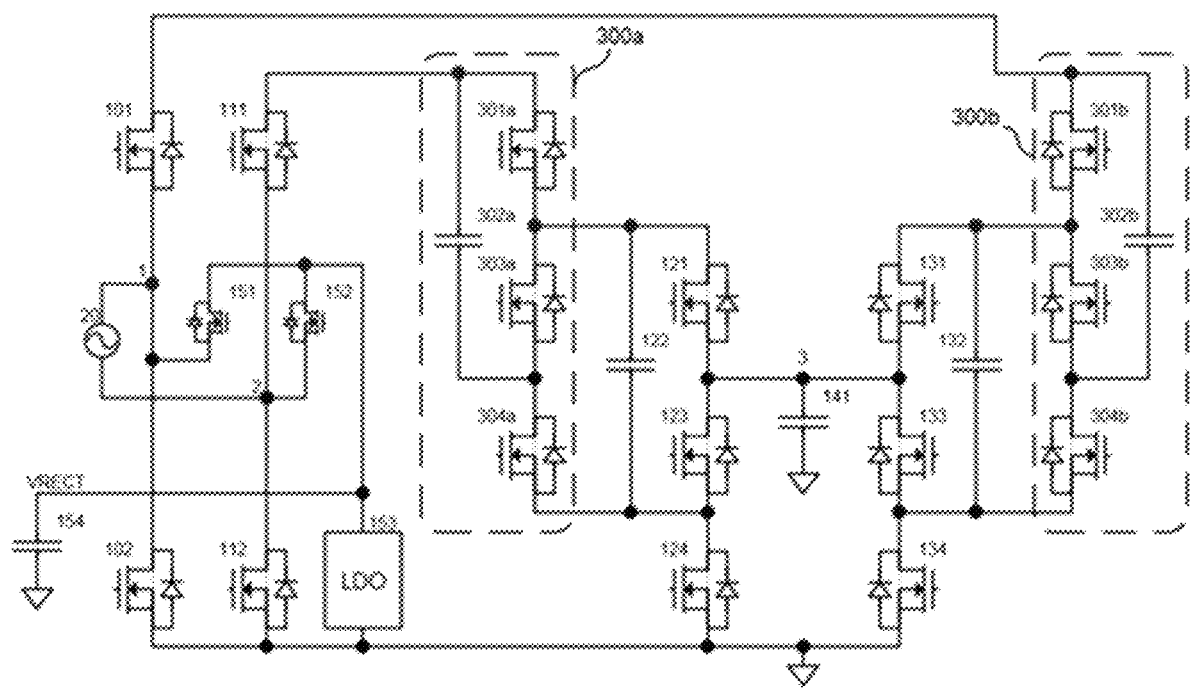
FIG. 9 is a schematic circuit diagram of a wireless charging receiver circuit according to an embodiment of the present disclosure.

In an embodiment, the wireless charging receiver circuit 10 includes two first expansion units 300, as illustrated in FIG. 9, that is, a first expansion unit 300a, a first expansion unit 300b. The two first expansion units 300 are configured to convert a conversion ratio of the effective value of the voltage difference between the first connection node 1 and the second connection node 2 to an output voltage of a voltage output terminal, that is, the voltage on the third connection node 3, to 3:1.

Specifically, the drain of the first expansion switch transistor 301a of one first expansion unit 300a of the two first expansion units is connected to the drain of the third switch transistor 111. A source of the first expansion switch transistor 301a of the one first expansion unit 300a is connected to the drain of the fifth switch transistor 121, and a source of the third expansion switch transistor 304a of the one first expansion unit 300a is connected to the source of the sixth switch transistor 123. The drain of the first expansion switch transistor 301b of the other first expansion unit 300b of the two first expansion units is connected to the drain of the first switch transistor 101. The source of the first expansion switch transistor 301b of the other first expansion unit 300b is connected to the drain of the eighth switch transistor 131, and the source of the third expansion switch transistor 304b of the other first expansion unit 300b is connected to the source of the ninth switch transistor 133.

In the case that the wireless charging receiver circuit 10 operates in the charge pump mode, in response to the alternating current signal 20 being in the positive half cycle, the control unit 160 controls the first switch transistor 101, the fourth switch transistor 112, the fifth switch transistor 121, the seventh switch transistor 124, the ninth switch transistor 133, the first expansion switch transistor 301a and the third expansion switch transistor 304a of the one first expansion unit 300a, and the second expansion switch transistor 303b of the other first expansion unit 300b to be turned on. In response to the alternating current signal 20 being in the negative half cycle, the control unit 160 controls the second switch transistor 102, the third switch transistor 111, the sixth switch transistor 123, the eighth switch transistor 131, the tenth switch transistor 134, the second expansion switch transistor 303a of the one first expansion unit 300a, and the first expansion switch transistor 301b and the third expansion switch transistor 304b of the other first expansion unit 300b to be turned on.

In practice, in response to the alternating current signal 20 being in the positive half cycle, that is, during the time period that the current is generated from the first connection node 1, the first switch transistor 101, the second expansion switch transistor 303b of the first expansion unit 300b, the ninth switch transistor 133, and the fourth switch transistor 112 are turned on. The first expansion switch transistor 301b of the first expansion unit 300b, the third expansion switch transistor 304b of the first expansion unit 300b, the eighth switch transistor 131, the tenth switch transistor 134 are maintained in a turn-off state to charge a second phase of the charge pump. In this case, a fourth capacitor 302b of the first expansion unit 300b, the second capacitor 132, and the first filter capacitor 141 are charged. Direct-current voltages at two terminals of the fourth capacitor 302b of the first expansion unit 300b, and the second capacitor 132 are equal to the output voltage of the third connection node 3. Therefore, during this time period, the voltage on the first connection node 1 is three times the voltage on the third connection node 3, and the voltage on the second connection node 2 is zero, such that a 3:1 DC conversion is generated. Meanwhile, during this time period, the first expansion switch transistor 301a of the one first expansion unit 300a, the third expansion switch transistor 304a of the first expansion unit 300a, the fifth switch transistor 121, and the seventh switch transistor 124 are turned on, such that a fourth capacitor 302a of the first expansion unit 300a, and the first capacitor 122 are discharged to the first filter capacitor 141. Likewise, in response to the alternating current signal 20 being in the negative half cycle, that is, during the time period that the current is output from the second connection node 2, the second switch transistor 102, the third switch transistor 111, the second expansion switch transistor 303a of the first expansion unit 300a, the sixth switch transistor 123 are turned on, and the first expansion switch transistor 301a of the one first expansion unit 300a, the third expansion switch transistor 304a of the one first expansion unit 300a, the fifth switch transistor 121 and the seventh switch transistor 124 are maintained in a turn-off state to charge a first phase of the charge pump. In this case, the fourth capacitor 302a of the first expansion unit 300a, the first capacitor 122, and the first filter capacitor 141 are charged. The direct-current voltages at two terminals of the fourth capacitor 302a of the first expansion unit 300a, and the first capacitor 122 are equal to the output voltage of the third connection node 3. Therefore, the voltage on the second connection node 2 is three times the output voltage of the third connection node 3, and the voltage on the first connection node 1 is zero. In the case that the alternating current signal 20 is reversed again, the above operations are cyclically repeated, and the switching frequency of the charge pump is synchronous with the operating frequency of the wireless charging transmitter.

Figure 10:
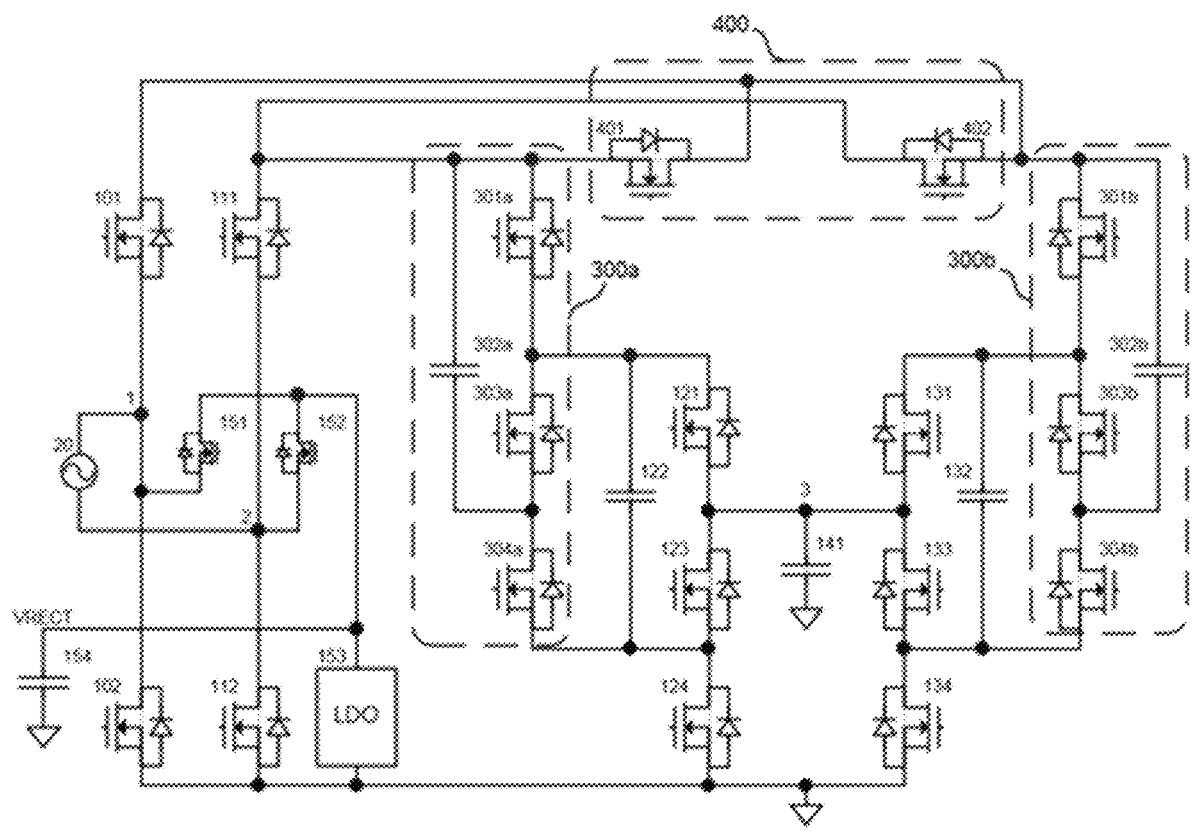
FIG. 10 is a schematic circuit diagram of a wireless charging receiver circuit according to an embodiment of the present disclosure.

Furthermore, a second frequency multiplier unit 400 may be added based on FIG. 9. As illustrated in FIG. 10, the wireless charging receiver circuit 10 further includes the second frequency multiplier unit 400. The second frequency multiplier unit 400 is connected to the first bridge arm unit 100, the second bridge arm unit 110, and the two first expansion units 300. With the second frequency multiplier unit 400, the first expansion unit 300, the first voltage converter unit 120, and the second voltage converter unit 130 operate in the switching frequency that is the integer multiple of the frequency of the alternating current signal 20.

The second frequency multiplier unit 400 includes a seventeenth switch transistor 401 and an eighteenth switch transistor 402. A source of the seventeenth switch transistor 401 and a drain of the eighteenth switch transistor 402 are both connected to the drain of the third switch transistor 111, and a drain of the seventeenth switch transistor 401 and a source of the eighteenth switch transistor 402 are both connected to the drain of the first switch transistor 101.

Figure 11:
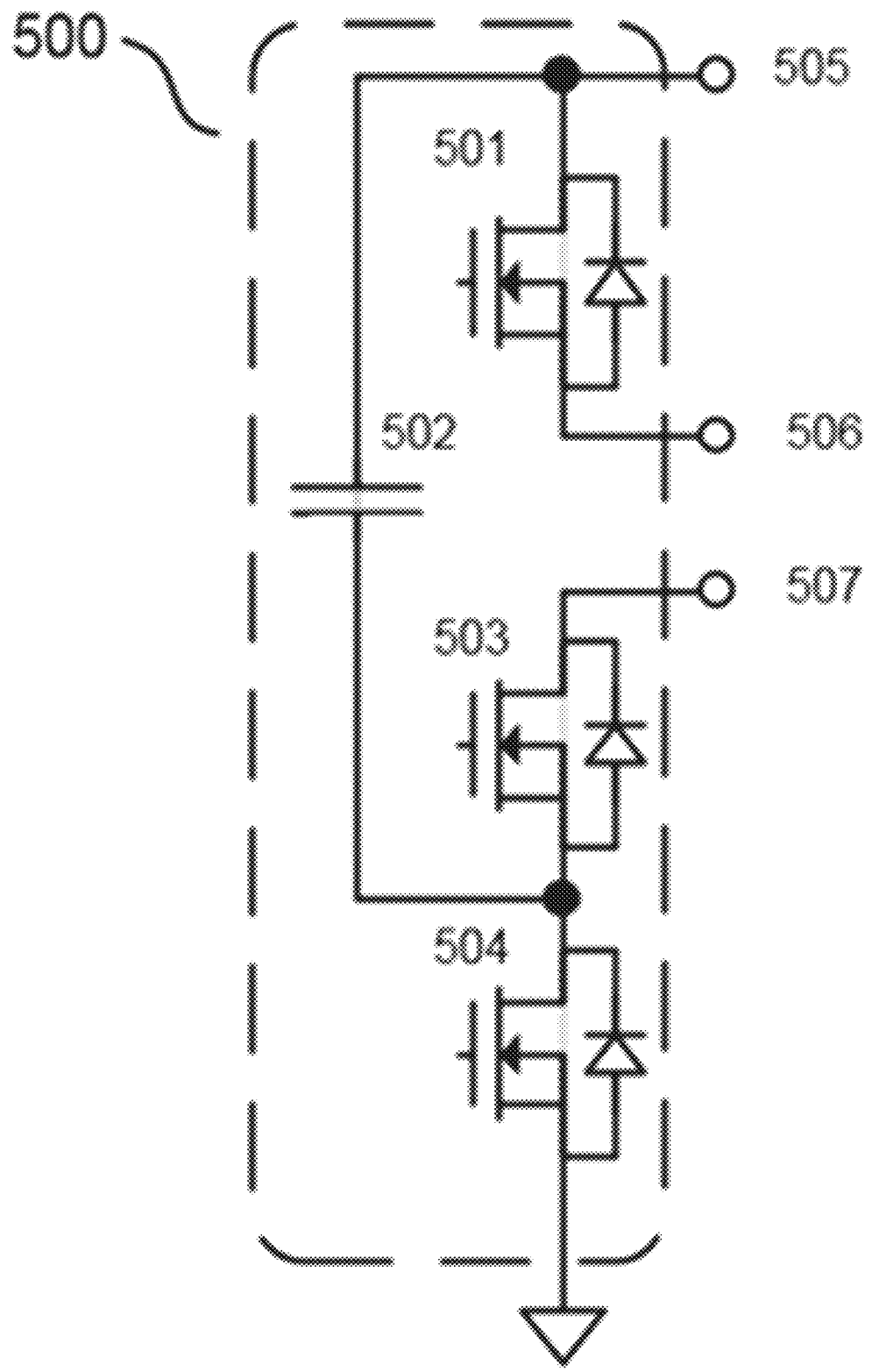
FIG. 11 is a schematic circuit diagram of a second expansion unit according to an embodiment of the present disclosure.

In another embodiment, as illustrated in FIG. 11, the wireless charging receiver circuit 10 further includes at least one second expansion unit 500. The second expansion unit 500 is configured to convert the ratio of the effective value of the voltage difference between the first connection node 1 and the second connection node 2 to the output voltage of the wireless charging receiver circuit 10 to M:1. M is a positive integer.

Optionally, the second expansion unit 500 includes a fifth capacitor 502, a fourth expansion switch transistor 501, a fifth expansion switch transistor 503, and a sixth expansion switch transistor 504. One terminal of the fourth capacitor 502 is connected to a drain of the fourth expansion switch transistor 501, and the other terminal of the fourth capacitor 502 is connected to a source of the fifth expansion switch transistor 503 and a drain of the sixth expansion switch transistor 504. A source of the sixth expansion switch transistor 504 is connected to ground. In addition, three connection nodes 305, 306, and 307 are used to connect other circuits.

Figure 12:
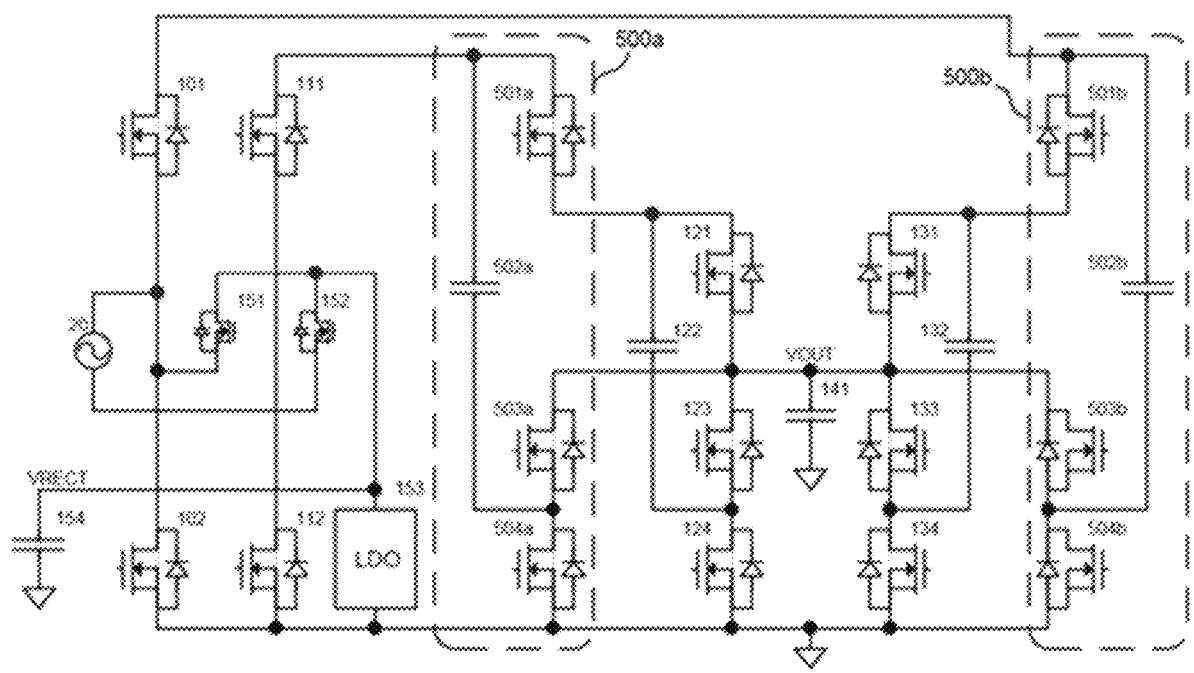
FIG. 12 is a schematic circuit diagram of a wireless charging receiver circuit according to an embodiment of the present disclosure.

In some embodiments, as illustrated in FIG. 12, the wireless charging receiver circuit 10 further includes two second expansion units 500. The two second expansion units 500 are configured to convert the conversion ratio of the effective value of the voltage difference between the first connection node 1 and the second connection node 2 to the output voltage of the voltage output terminal, that is, the voltage on the third connection node 3, to 3:1.

As illustrated in FIG. 12, the drain of the fourth expansion switch transistor 501a of one second expansion unit 500a of the two second expansion units is connected to the drain of the third switch transistor 111. A source of the fourth expansion switch transistor 501a of the one second expansion unit 500a is connected to the drain of the fifth switch transistor 121, and a drain of the fifth expansion switch transistor 503a of the one second expansion unit 500a is connected to the drain of the sixth switch transistor 123. The drain of the fourth expansion switch transistor 501b of the other second expansion unit 500b of the two second expansion units is connected to the drain of the first switch transistor 101. The source of the fourth expansion switch transistor 501b of the other second expansion unit 500b is connected to the drain of the eighth switch transistor 131, and the drain of the fifth expansion switch transistor 503b of the other second expansion unit 500b is connected to the drain of the ninth switch transistor 133.

In the case that the wireless charging receiver circuit 10 operates in the charge pump mode, in response to the alternating current signal 20 being in the positive half cycle, the control unit 160 controls the first switch transistor 101, the fourth switch transistor 112, the sixth switch transistor 123, the eighth switch transistor 131, the tenth switch transistor 134, the fourth expansion switch transistor 501a and the sixth expansion switch transistor 504a of the one second expansion unit 500a, and the fifth expansion switch transistor 503b of the other second expansion unit 500b to be turned on. In response to the alternating current signal 20 being in a negative half cycle, the control unit 160 controls the second switch transistor 102, the third switch transistor 111, the fifth switch transistor 121, the seventh switch transistor 124, the ninth switch transistor 133, the fifth expansion switch transistor 503a of the one second expansion unit 500a, and the fourth expansion switch transistor 501b and the sixth expansion switch transistor 504b of the other second expansion unit 500b to be turned on.

Figure 13:
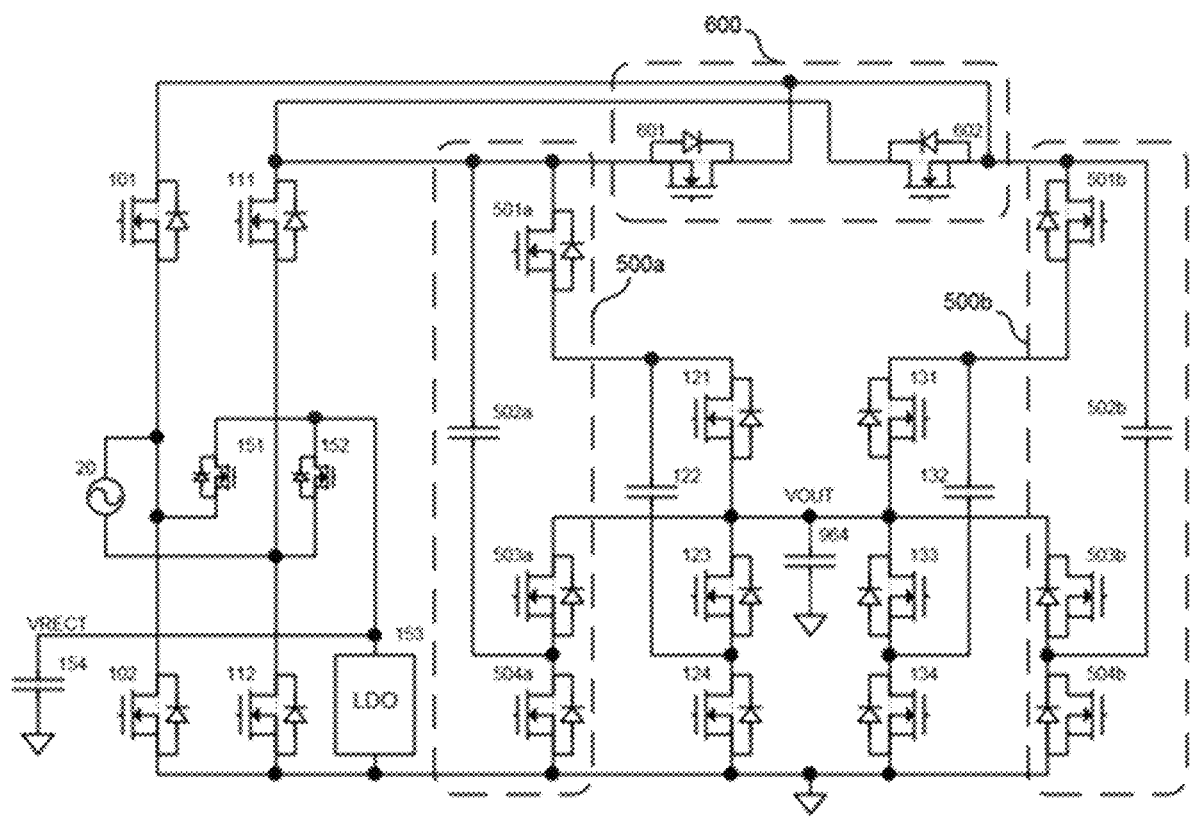
FIG. 13 is a schematic circuit diagram of a wireless charging receiver circuit according to an embodiment of the present disclosure.

Further, a third frequency multiplier unit 600 may be added based on FIG. 12. As illustrated in FIG. 13, the wireless charging receiver circuit 10 further includes a third frequency multiplier unit 600. The third frequency multiplier unit 600 is connected to the first bridge arm unit 100, the second bridge arm unit 110, and the two second expansion unit 500. With the third frequency multiplier unit 600, the second expansion units 500, the first voltage converter unit 120, and the second voltage converter unit 130 operate in the switching frequency that is the integer multiple of the frequency of the alternating current signal 20.

Specifically, the third frequency multiplier unit 600 includes a nineteenth switch transistor 601 and a twentieth switch transistor 602. A source of the nineteenth switch transistor 601 and a drain of the twentieth switch transistor 602 are both connected to the drain of the third switch transistor 111, and a drain of the nineteenth switch transistor 601 and a source of the twentieth switch transistor 602 are both connected to the drain of the first switch transistor 101.

It should be noted that a person skilled in the art may derive different combinations based on the embodiments of the present disclosure to propose other solutions. For example, four first expansion units 300 and the second frequency multiplier unit 400 are added to the circuit as illustrated in FIG. 2, such that each of the first expansion units 300, the first voltage converter unit 120, and the second voltage converter unit 130 operate at the switching frequency that is the integer multiple of the frequency of the alternating current signal 20, and the conversion ratio of the effective value of the voltage difference between the first connection node 1 and the second connection node 2 to the output voltage of the voltage output terminal is 4:1. Such solutions are derived from simple mathematical combinations according to the embodiments of the present disclosure, which pertain to simple variations or modifications of the present disclosure.

The present disclosure further provides a wireless charging receiver chip. The wireless charging receiver chip includes the wireless charging receiver circuit 10 as described above.

The present disclosure further provides a wireless charging receiver. The wireless charging receiver includes a wireless charging receiver coil and the wireless charging receiver chip as described above, wherein the wireless charging receiver coil is configured to generate the alternating current signal 20.

In summary, the present disclosure provides a wireless charging receiver circuit and chip, and a wireless charging receiver. The wireless charging receiver circuit includes a first bridge arm unit 100, a second bridge arm unit 110, a first voltage converter unit 120, a second voltage converter unit 130, and a control unit 160. One terminal of the first bridge arm unit 100 and one terminal of the second voltage converter unit 130 are both connected to a first node P1, one terminal of the second bridge arm unit 110 and one terminal of the first voltage converter unit 120 are both connected to a second node P2, and the other terminal of the first bridge arm unit 100, the other terminal of the second bridge arm unit 110, the other terminal of the first voltage converter unit 120, and the other terminal of the second voltage converter unit 130 are all connected to a common ground node GND. The first bridge arm unit 100 includes a first switch transistor 101 and a second switch transistor 102. The first switch transistor 101 and the second switch transistor 102 are series-connected in a same direction. A connection node between a source of the first switch transistor 101 and a drain of the second switch transistor 102 is a first connection node 1, and a non-inverting output terminal of an externally input alternating current signal 20 is connected to the first connection node 1. The second bridge arm unit 110 includes a third switch transistor 111 and a fourth switch transistor 112. The third switch transistor 111 and the fourth switch transistor 112 are series-connected in a same direction. A connection node between a source of the third switch transistor 111 and a drain of the fourth switch transistor 112 is a second connection node 2, and an inverting output terminal of the alternating current signal 20 is connected to the second connection node 2. In this way, the external filter capacitors are reduced, and thus the size of the integrated circuit device is reduced, and the integration cost is lowered.

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

Figure 14:
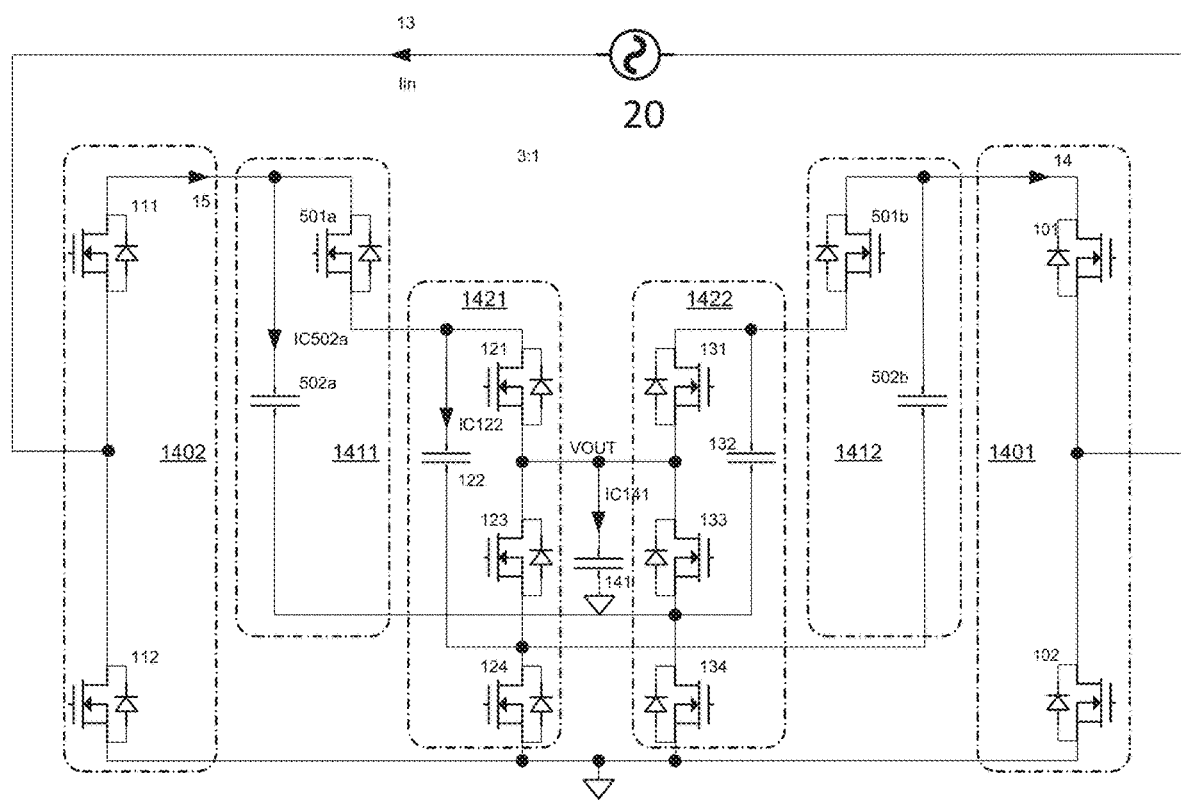
FIG. 14 illustrates a schematic diagram of a simplified 3:1 step-down rectifier circuit in accordance with various embodiments of the present disclosure.

FIG. 14 illustrates a schematic diagram of a simplified 3:1 step-down rectifier circuit in accordance with various embodiments of the present disclosure. Referring back to FIG. 12, when the circuit shown in FIG. 12 is configured to operate at a duty cycle of 50%, a first circuit branch formed by switch 503a and switch 504a, and a second circuit branch formed by switch 133 and switch 134 are connected to the same nodes (VOUT and ground) at both ends. In addition, the control signal of switch 503a is the same as the control signal of switch 133. Likewise, the control signal of switch 504a is the same as that of switch 134. Therefore, these two circuit branches can be combined into one. In consideration with this combination, one terminal of the flying capacitor 502a is connected to the common node of the switches 133 and 134. Similarly, the circuit branch formed by switch 503b and switch 504b can be combined with the circuit branch formed by switch 123 and switch 124. In consideration with this combination, one terminal of the flying capacitor 502b is connected to the common node of the switches 123 and 124.

As shown in FIG. 14, the simplified 3:1 step-down rectifier circuit comprise a first bridge arm unit 1401, a second bridge arm unit 1402, a first second-expansion unit 1411, a second second-expansion unit 1412, a first voltage converter unit 1421 and a second voltage converter unit 1422. As shown in FIG. 14, the first second-expansion unit 1411 is placed between the second bridge arm unit 1402 and the first voltage converter unit 1421. The second second-expansion unit 1412 is placed between the first bridge arm unit 1401 and the second voltage converter unit 1422. Moreover, in order to have a wider range of applications, the start-up circuit and the low-dropout linear voltage regulator shown in FIG. 12 have been removed. The operating principle of the simplified 3:1 step-down rectifier circuit shown in FIG. 14 is similar to that of the circuit shown in FIG. 12, and hence is not discussed herein to avoid repetition.

Figure 15:
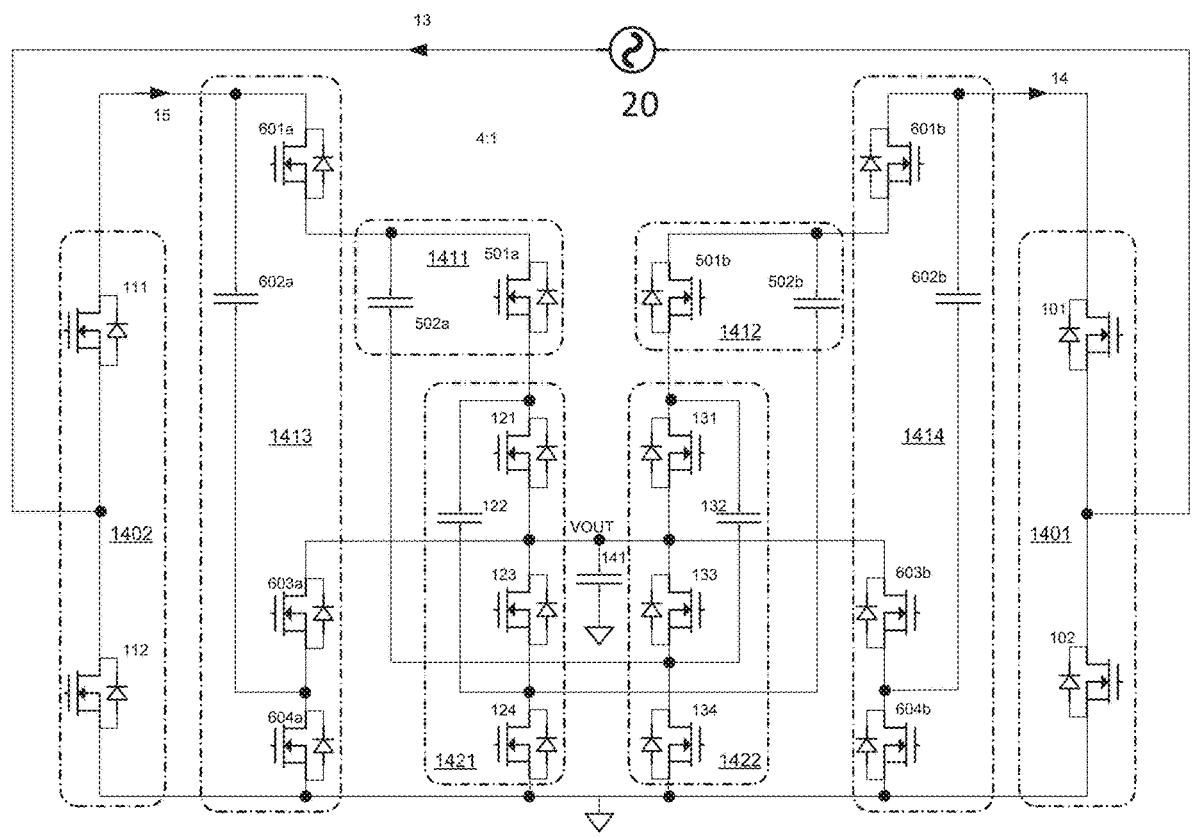
FIG. 15 illustrates a schematic diagram of a 4:1 step-down rectifier circuit in accordance with various embodiments of the present disclosure.

FIG. 15 illustrates a schematic diagram of a 4:1 step-down rectifier circuit in accordance with various embodiments of the present disclosure. Based on the 3:1 step-down rectifier circuit in FIG. 14, two additional second-expansion units can be added to achieve a 4:1 step-down ratio. As shown in FIG. 15, a third second-expansion unit 1413 is added into the 4:1 step-down rectifier circuit. The third second-expansion unit 1413 is connected between the second bridge arm unit 1402 and the first second-expansion unit 1411. As shown in FIG. 15, the switches 603a and 604a are connected in series between the output terminal VOUT and ground. Likewise, a fourth second-expansion unit 1414 is added into the 4:1 step-down rectifier circuit. The fourth second-expansion unit 1414 is connected between the first bridge arm unit 1401 and the second second-expansion unit 1412. As shown in FIG. 15, the switches 603b and 604b are connected in series between the output terminal VOUT and ground.

Figure 16:
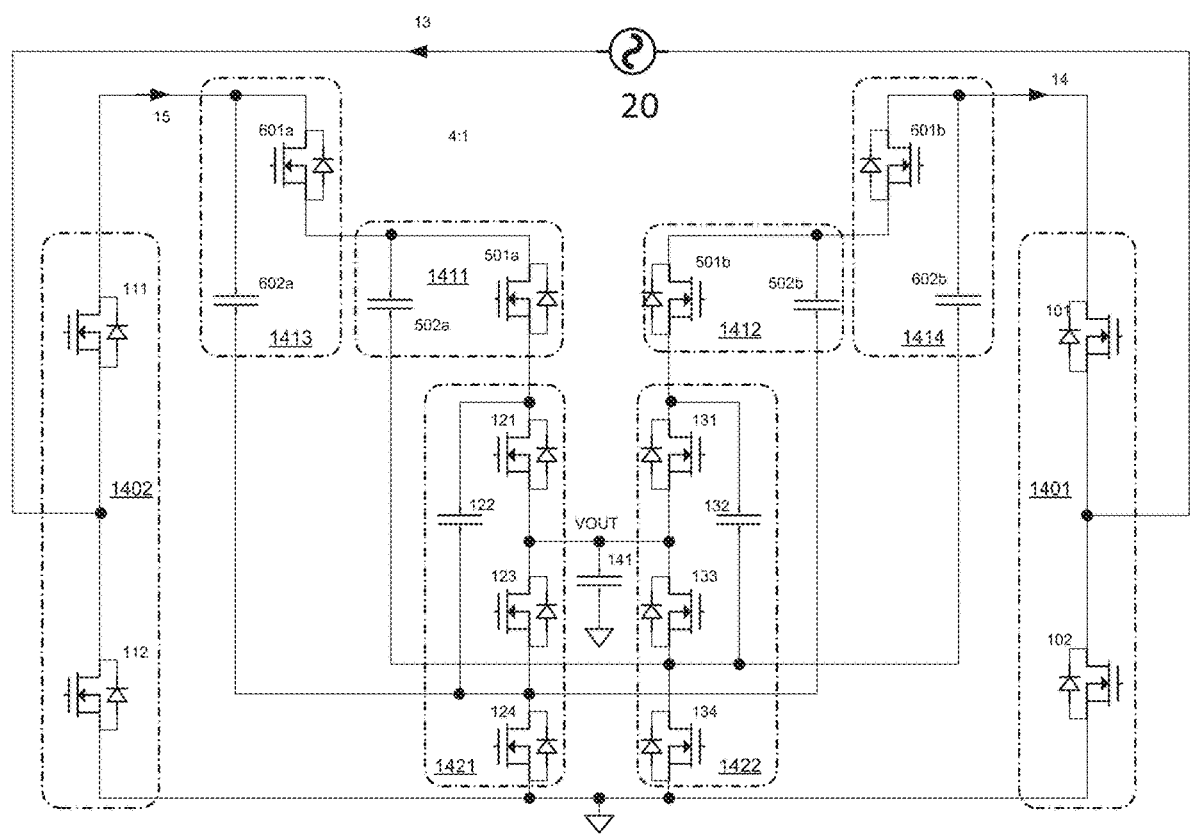
FIG. 16 illustrates a schematic diagram of a simplified 4:1 step-down rectifier circuit in accordance with various embodiments of the present disclosure.

FIG. 16 illustrates a schematic diagram of a simplified 4:1 step-down rectifier circuit in accordance with various embodiments of the present disclosure. The simplification method applied to the 4:1 step-down rectifier circuit shown in FIG. 15 is similar to the simplification method applied to the 3:1 step-down rectifier circuit shown in FIG. 14. Referring back to FIG. 15, when the 4:1 step-down rectifier circuit is configured to operate at a duty cycle of 50%, a first circuit branch formed by switch 603a and switch 604a, and a second circuit branch formed by switch 123 and switch 124 are connected to the same nodes (VOUT and ground) at both ends. In addition, the control signal of switch 603a is the same as the control signal of switch 123. Likewise, the control signal of switch 604a is the same as that of switch 124. Therefore, these two circuit branches can be combined into one. In consideration with this combination, one terminal of the flying capacitor 602a is connected to the common node of the switches 123 and 124 as shown in FIG. 16. Similarly, the circuit branch formed by switch 603b and switch 604b can be combined with the circuit branch formed by switch 133 and switch 134. In consideration with this combination, one terminal of the flying capacitor 602b is connected to the common node of the switches 133 and 134 as shown in FIG. 16.

In operation, the 4:1 step-down rectifier circuit shown in FIG. 16 is configured to operate in the charge pump mode. When the alternating current signal 20 is in a positive half cycle, the control unit (e.g., control unit 160 shown in FIG. 6) is configured to control the second switch 102, the third switch 111, the sixth switch 123, the eighth switch 131, the tenth switch 134, the switch 501a and the switch 601b to be turned on. At this time, the flying capacitor 602a and the output capacitor 141 are connected in series. The input AC current charges the flying capacitor 602a and the output capacitor 141 in series. In addition, the input AC current also supplies power to the load connected to the VOUT terminal (not shown). At the same time, the flying capacitor 502a charges the series-connected flying capacitor 122 and output capacitor 141, and supplies power to the load. Also at the same time, the flying capacitor 602b charges the series-connected flying capacitor 502b and output capacitor 141, and supplies power to the load. Finally, the flying capacitor 132 is connected in parallel with the output capacitor 141. The flying capacitor 132 charges the output capacitor 141, and supplies power to the load.

In operation, the 4:1 step-down rectifier circuit shown in FIG. 16 is configured to operate in a charge pump mode. When the alternating current signal 20 (an AC current source) is in a negative half cycle, a control unit (e.g., control unit 160 shown in FIG. 6) is configured to control the first switch 101, the fourth switch 112, the fifth switch 121, the seventh switch 124, the ninth switch 133, the switch 501b and the switch 601a to be turned on. At this time, the flying capacitor 602b and the output capacitor 141 are connected in series. The input AC current charges the flying capacitor 602b and the output capacitor 141 in series. In addition, the input AC current also supplies power to the load. At the same time, the flying capacitor 502b charges the series-connected flying capacitor 132 and output capacitor 141 in series, and supplies power to the load. Also at the same time, the flying capacitor 602a charges the series-connected flying capacitor 502a and output capacitor 141, and supplies power to the load. Finally, the flying capacitor 122 is connected in parallel with the output capacitor 141. The flying capacitor 122 charges the output capacitor 141, and supplies power to the load.

In FIG. 16, all switches of the step-down rectifier circuit are repeatedly switched at the frequency of the input AC signal with a duty cycle of 50%. When the steady state is reached, the output voltage VOUT is one-fourth of the effective value of the input AC voltage. The voltages on the flying capacitors 602a and 602b are close to three times the output voltage VOUT. The voltages on the flying capacitors 502a and 502b are close to twice the output voltage VOUT. The voltages on the flying capacitors 122, 132 are almost the same as the output voltage VOUT.

According to the examples shown in FIG. 14 and FIG. 16, the step-down ratio of the step-down rectifier circuit can be increased by continuing to increase the number of the switches and the flying capacitors. For example, a 5:1 step-down rectifier circuit can be obtained through adding more switches and flying capacitors. In particular, two switches and two flying capacitors can be added into the 4:1 step-down rectifier circuit shown in FIG. 16 to obtain a 5:1 step-down rectifier circuit. Referring back to FIG. 16, one of the expansion switches is added between the switch 601a and the switch 111. One expansion flying capacitor is connected between a common node of the one of the expansion switches and the switch 111, and a common node of the switches 133 and 134. Likewise, the other expansion switch is added between switch 601b and switch 101. The other expansion flying capacitor is connected between a common node of the other expansion switch and switch 101, and a common node of switch 123 and switch 124. In this way, the 5:1 step-down rectifier circuit can be obtained.

Similarly, a 6:1 step-down rectifier circuit can be obtained based on the 5:1 step-down rectifier circuit through adding two more expansion switches and two more flying capacitors. The expansion method is similar to the expansion method of the 3:1 step-down rectifier circuit discussed above with respect to FIG. 14, and the expansion method of the 4:1 step-down rectifier circuit discussed above with respect to FIG. 16, and hence is not discussed herein to avoid repetition.

Figure 17:
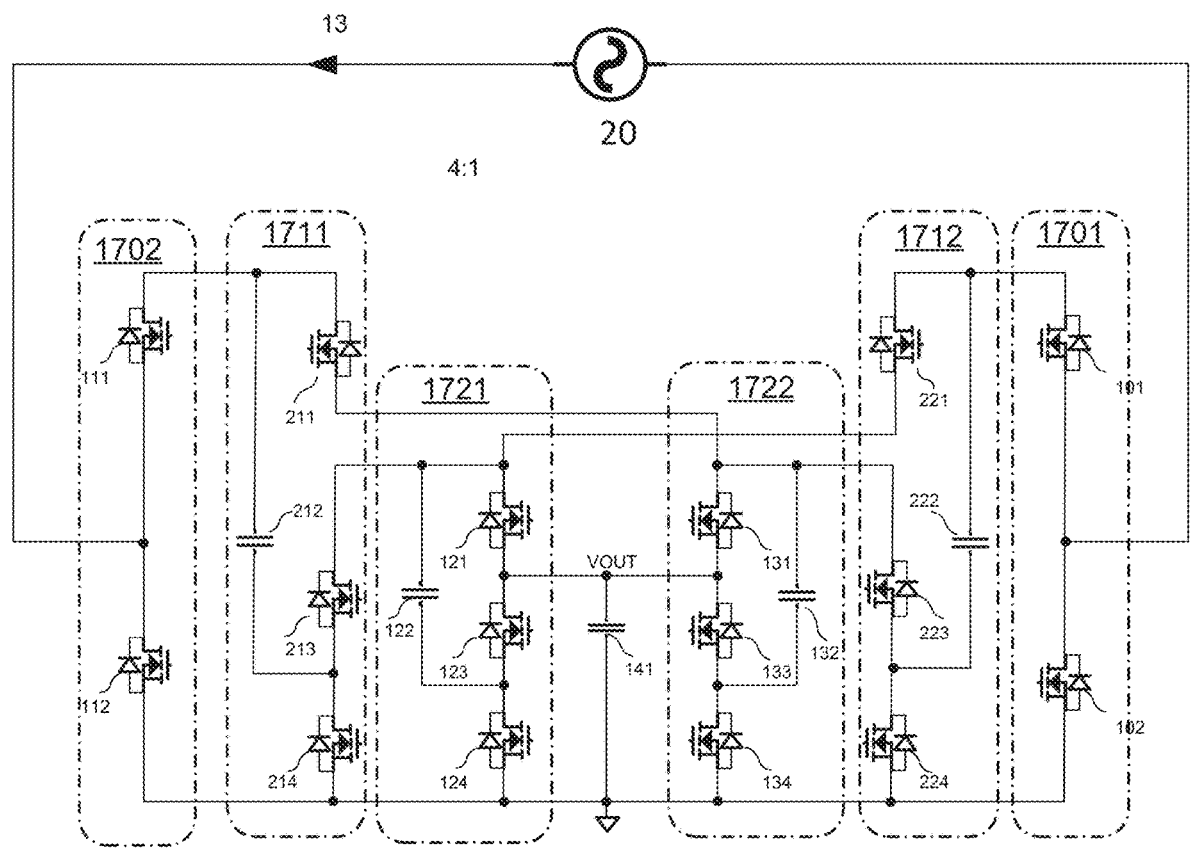
FIG. 17 illustrates a schematic diagram of another 4:1 step-down rectifier circuit in accordance with various embodiments of the present disclosure.

FIG. 17 illustrates a schematic diagram of another 4:1 step-down rectifier circuit in accordance with various embodiments of the present disclosure. Referring back to FIG. 3, the 2:1 step-down rectifier circuit comprises the first bridge arm unit, the second bridge arm unit, the first voltage converter unit and the second voltage converter unit. A 4:1 step-down rectifier circuit can be realized by adding two second-expansion units. As shown in FIG. 17, two second-expansion units 1711 and 1712 are connected between two bridge arm units 1701, 1702 and two voltage converter units 1721, 1722 to achieve a new 4:1 step-down rectifier circuit. Specifically, a first terminal of a first second-expansion unit 1711 is connected to the drain of the switch 111 in the second bridge arm unit 1702. A first terminal of a second second-expansion unit 1712 is connected to the drain of the switch 101 in the first bridge arm unit 1701. A second terminal of the first second-expansion unit 1711 is connected to the drain of the switch 131 in the second voltage converter unit 1722 and a third terminal of the second second-expansion unit 1712. A third terminal of the first second-expansion unit 1711 is connected to the drain of the switch 121 in the first voltage converter unit 1721 and a second terminal of the second second-expansion unit 1712.

In operation, the 4:1 step-down rectifier circuit shown in FIG. 17 is configured to operate in the charge pump mode. When the alternating current signal 20 is in a positive half cycle, the control unit (e.g., control unit 160 shown in FIG.

2) is configured to control the second switch 102, the third switch 111, the sixth switch 123, the eighth switch 131, the tenth switch 134, the switch 213, the switch 221 and the switch 224 to be turned on. At this time, the flying capacitor 212, the flying capacitor 122 and the output capacitor 141 are connected in series. The input AC current charges the flying capacitor 212, the flying capacitor 122 and the output capacitor 141 in series. In addition, the input AC current also supplies power to the load. At the same time, the flying capacitor 222 charges the series-connected flying capacitor 122 and output capacitor 141, and supplies power to the load. Finally, the flying capacitor 132 is connected in parallel with the output capacitor 141. The flying capacitor 132 charges the output capacitor 141, and supplies power to the load.

When the alternating current signal 20 is in a negative half cycle, a control unit (e.g., control unit 160 shown in FIG. 2) is configured to control the first switch 101, the fourth switch 112, the fifth switch 121, the seventh switch 124, the ninth switch 133, the switch 211, the switch 214 and the switch 223 to be turned on. At this time, the flying capacitor 222, the flying capacitor 132 and the output capacitor 141 are connected in series. The input AC current charges the flying capacitor 222, the flying capacitor 132 and the output capacitor 141 in series. In addition, the input AC current also supplies power to the load. At the same time, the flying capacitor 212 charges the series-connected flying capacitor 132 and output capacitor 141, and supplies power to the load. Finally, the flying capacitor 122 is connected in parallel with the output capacitor 141. The flying capacitor 122 charges the output capacitor 141, and supplies power to the load.

In FIG. 17, all switches of the step-down rectifier circuit are repeatedly switched at the frequency of the input AC signal with a duty cycle of 50%. When the steady state is reached, the output voltage VOUT is one-fourth of the effective value of the input AC voltage. The voltages on the flying capacitors 212 and 222 are close to twice the output voltage VOUT. The voltages on the flying capacitors 122, 132 are almost the same as the output voltage VOUT.

In comparison with the 4:1 step-down rectifier circuit in FIG. 16, the 4:1 step-down rectifier circuit in FIG. 17 uses two more switches. In particular, the circuit shown in FIG. 16 comprises 14 switches. The circuit shown in FIG. 17 comprises 16 switches. However, the circuit shown in FIG. 17 uses two less flying capacitors. The saved flying capacitors are capacitors having a high voltage rating. For example, the saved flying capacitors need to withstand three times the output voltage in the circuit shown in FIG. 16. Therefore, the circuit shown in FIG. 17 is more suitable for applications where the input AC signal voltage is relatively high and/or the AC signal frequency is relatively low because these applications require larger flying capacitors, and the circuit in FIG. 17 can reduce the material cost and save the board area.

Figure 18:
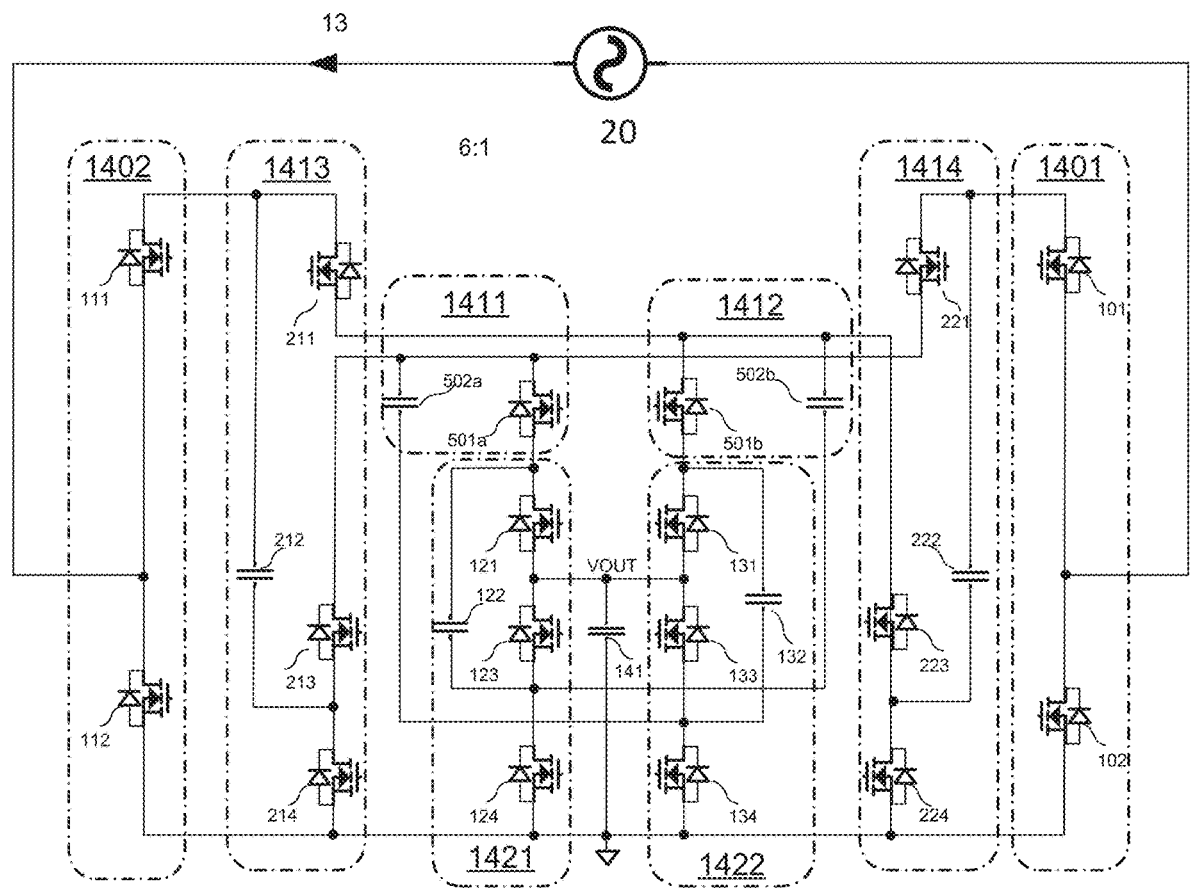
FIG. 18 illustrates a schematic diagram of a 6:1 step-down rectifier circuit in accordance with various embodiments of the present disclosure.

FIG. 18 illustrates a schematic diagram of a 6:1 step-down rectifier circuit in accordance with various embodiments of the present disclosure. The power conversion ratio of the step-down rectifier circuit shown in FIG. 14 can also be increased by adding the second-expansion units in the same fashion as shown in FIG. 17. FIG. 18 shows two second-expansion units 1413, 1414 are connected between two bridge arm units 1401, 1402 and two simplified second-expansion units 1411, 1412 to achieve a 6:1 step-down rectifier circuit. Specifically, a first terminal of the second-expansion unit 1413 is connected to the drain of the switch 111 in the second bridge arm unit 1402. A first terminal of the second-expansion unit 1414 is connected to the drain of the switch 101 in the first bridge arm unit 1401. A second terminal of the second-expansion unit 1413 is connected to the drain of the switch 501b in the second second-expansion unit 1412 and a third terminal of the second-expansion unit 1414. A third terminal of the second-expansion unit 1413 is connected to the drain of the switch 501a in the first second-expansion unit 1411 and a second terminal of the second-expansion unit 1414.

In operation, the 6:1 step-down rectifier circuit shown in FIG. 18 is configured to operate in a charge pump mode. When the alternating current signal 20 is in a positive half cycle, a control unit (e.g., control unit 160 shown in FIG. 6) is configured to control the third switch 111, the second switch 102, the fifth switch 121, the seventh switch 124, the ninth switch 133, the switch 501b, the switch 213, the switch 221 and the switch 224 to be turned on. At this time, the flying capacitor 212, the flying capacitor 502a and the output capacitor 141 are connected in series. The input AC current charges the flying capacitor 212, the flying capacitor 502a and the output capacitor 141 in series. In addition, the input AC current also supplies power to the load. At the same time, the flying capacitor 222 charges the series-connected flying capacitor 502a and output capacitor 141, and supplies power to the load. Also at the same time, the flying capacitor 502b charges the series-connected flying capacitor 132 and output capacitor 141, and supplies power to the load. Finally, the flying capacitor 122 is connected in parallel with the output capacitor 141. The flying capacitor 122 charges the output capacitor 141, and supplies power to the load.

When the alternating current signal 20 is in a negative half cycle, the control unit (e.g., control unit 160 shown in FIG. 6) is configured to control the first switch 101, the fourth switch 112, the sixth switch 123, the eighth switch 131, the tenth switch 134, the switch 501a, the switch 211, the switch 214 and the switch 223 to be turned on. At this time, the flying capacitor 222, the flying capacitor 502b and the output capacitor 141 are connected in series. The input AC current charges the flying capacitor 222, the flying capacitor 502b and the output capacitor 141 in series. In addition, the input AC current also supplies power to the load. At the same time, the flying capacitor 212 charges the series-connected flying capacitor 502b and output capacitor 141, and supplies power to the load. Also at the same time, the flying capacitor 502a charges the series-connected flying capacitor 122 and output capacitor 141, and supplies power to the load.

Finally, the flying capacitor 132 is connected in parallel with the output capacitor 141. The flying capacitor 132 charges the output capacitor 141, and supplies power to the load.

In FIG. 18, all switches of the step-down rectifier circuit are repeatedly switched at the frequency of the input AC signal with a duty cycle of 50%. When the steady state is reached, the output voltage VOUT is one-sixth of the effective value of the input AC voltage. The voltages on the flying capacitors 212 and 222 are close to three times the output voltage VOUT. The voltages on the flying capacitors 502a and 502b are close to twice the output voltage VOUT. The voltages on the flying capacitors 122, 132 are almost the same as the output voltage VOUT.

It should be noted that if the expansion method shown in FIG. 14, FIG. 15 and FIG. 16 is used to realize a 6:1 step-down rectifier circuit, 18 switches and 8 flying capacitors are required. The 6:1 step-down rectifier circuit shown in FIG. 18 also uses 18 switches, but uses two less flying capacitors. The saved flying capacitors are capacitors having a high voltage rating. For example, the saved flying capacitors need to withstand five times and four times the output voltage. Therefore, the circuit shown in FIG. 18 is more suitable for applications where the input AC signal voltage is relatively high and/or the AC signal frequency is relatively low because these applications require larger flying capacitors, and the circuit in FIG. 18 can reduce the material cost and save the board area.

It should further be noted that the second-expansion units and the fashion it is connected to the circuits discussed above with respect to FIG. 17 and FIG. 18 can be used to achieve a higher step-down ratio. In particular, the step-down ratio can be doubled based on the circuits shown in FIG. 14 and FIG. 16. The number of flying capacitors can be reduced. A higher step-down ratio such as 8:1, 10:1 and the like can be achieved. The detailed implementation method is not discussed in detail herein.

Figure 19:
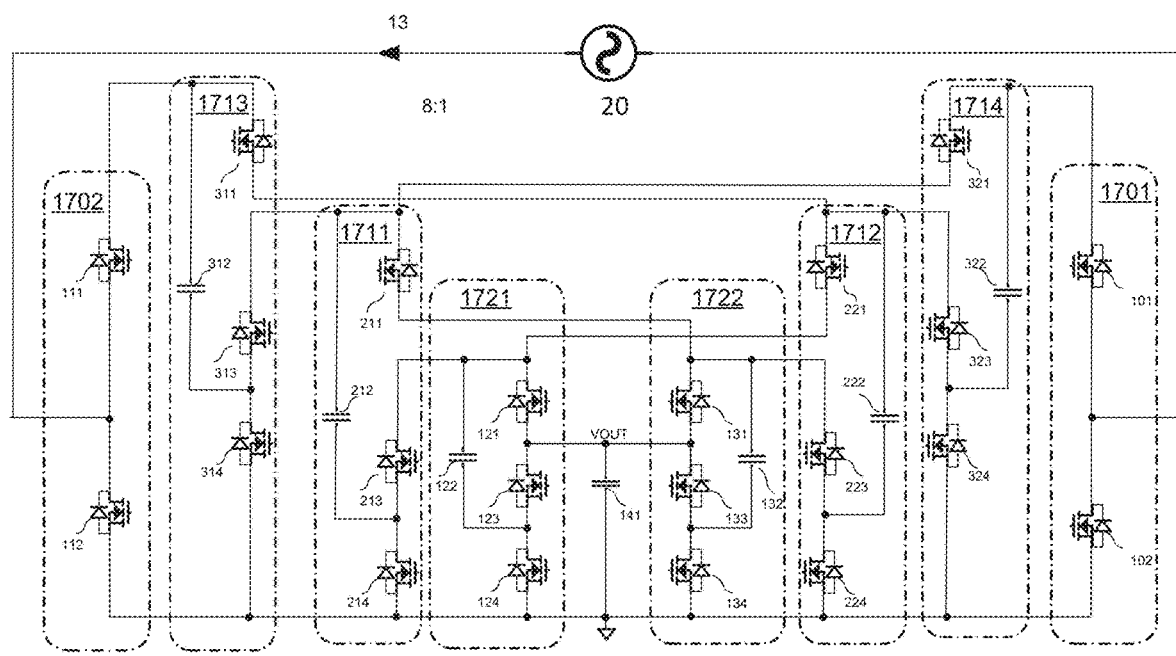
FIG. 19 illustrates a schematic diagram of an 8:1 step-down rectifier circuit in accordance with various embodiments of the present disclosure.

FIG. 19 illustrates a schematic diagram of an 8:1 step-down rectifier circuit in accordance with various embodiments of the present disclosure. The method of using the second-expansion units to increase the step-down ratio shown in FIG. 17 can be used to achieve a higher step-down ratio. As shown in FIG. 19, based on the circuit shown in FIG. 17, two additional second-expansion units 1713, 1714 are placed between the two bridge arm units 1701, 1702 and the two existing second-expansion units 1711, 1712 to achieve the 8:1 step-down rectifier circuit. Specifically, a first terminal of the second-expansion unit 1713 is connected to the drain of the switch 111 in the second bridge arm unit 1702. A first terminal of the second-expansion unit 1714 is connected to the drain of the switch 101 in the first bridge arm unit 1701. A second terminal of the second-expansion unit 1713 is connected to the drain of the switch 221 in the second-expansion unit 1712 and a third terminal of the second-expansion unit 1714. A third terminal of the second-expansion unit 1713 is connected to the drain of the switch 211 in the second-expansion unit 1711 and a second terminal of the second-expansion unit 1714.

In operation, the 8:1 step-down rectifier circuit shown in FIG. 19 is configured to operate in the charge pump mode. When the alternating current signal 20 is in a positive half cycle, the control unit (e.g., control unit 160 shown in FIG. 2) is configured to control the third switch 111, the second switch 102, the sixth switch 123, the eighth switch 131, the tenth switch 134, the switch 324, the switch 321, the switch 213, the switch 313, the switch 221 and the switch 224 to be turned on. At this time, the flying capacitor 312, the flying capacitor 212, the flying capacitor 122 and the output capacitor 141 are connected in series. The input AC current charges the flying capacitor 312, the flying capacitor 212, the flying capacitor 122 and the output capacitor 141 in series. In addition, the input AC current also supplies power to the load. At the same time, the flying capacitor 322 charges the series-connected flying capacitor 212, flying capacitor 122 and output capacitor 141, and supplies power to the load. Also at the same time, the flying capacitor 222 charges the series-connected flying capacitor 122 and output capacitor 141, and supplies power to the load. Finally, the flying capacitor 132 is connected in parallel with the output capacitor 141. The flying capacitor 132 charges the output capacitor 141, and supplies power to the load.

When the alternating current signal 20 is in a negative half cycle, a control unit (e.g., control unit 160 shown in FIG. 2) is configured to control the first switch 101, the fourth switch 112, the fifth switch 121, the seventh switch 124, the ninth switch 133, the switch 223, the switch 211, the switch 214, the switch 311, the switch 314 and the switch 323 to be turned on. At this time, the flying capacitor 322, the flying capacitor 222, the flying capacitor 132 and the output capacitor 141 are connected in series. The input AC current charges the flying capacitor 322, the flying capacitor 222, the flying capacitor 132 and the output capacitor 141 in series. In addition, the input AC current also supplies power to the load. At the same time, the flying capacitor 312 charges the series-connected flying capacitor 222, flying capacitor 132 and output capacitor 141, and supplies power to the load. Also at the same time, the flying capacitor 212 charges the series-connected flying capacitor 132 and output capacitor 141, and supplies power to the load. Finally, the flying capacitor 122 is connected in parallel with the output capacitor 141. The flying capacitor 122 charges the output capacitor 141, and supplies power to the load.

In FIG. 19, all switches of the step-down rectifier circuit are repeatedly switched at the frequency of the input AC signal with a duty cycle of 50%. When the steady state is reached, the output voltage VOUT is one-eighth of the effective value of the input AC voltage. The voltages on the flying capacitors 312 and 322 are close to four times the output voltage VOUT. The voltages on the flying capacitors 212 and 122 are close to twice the output voltage VOUT. The voltages on the flying capacitors 122, 132 are almost the same as the output voltage VOUT.

The 8:1 step-down rectifier circuit shown in FIG. 19 uses less flying capacitors. The saved flying capacitors are capacitors having a high voltage rating. Therefore, the circuit shown in FIG. 19 is more suitable for applications where the input AC signal voltage is relatively high and/or the AC signal frequency is relatively low because these applications require larger flying capacitors, and the circuit in FIG. 19 can reduce the material cost and save the board area.

It should be noted that the use of the second-expansion unit discussed above with respect to FIG. 17 and FIG. 19 can be used to achieve a higher step-down ratio. In particular, the step-down ratio can be doubled based on the circuit shown in FIG. 3. The number of flying capacitors can be reduced. A higher step-down ratio such as 16:1, 32:1 and the like can be achieved. The detailed implementation method is not discussed in detail herein.

Figure 20:
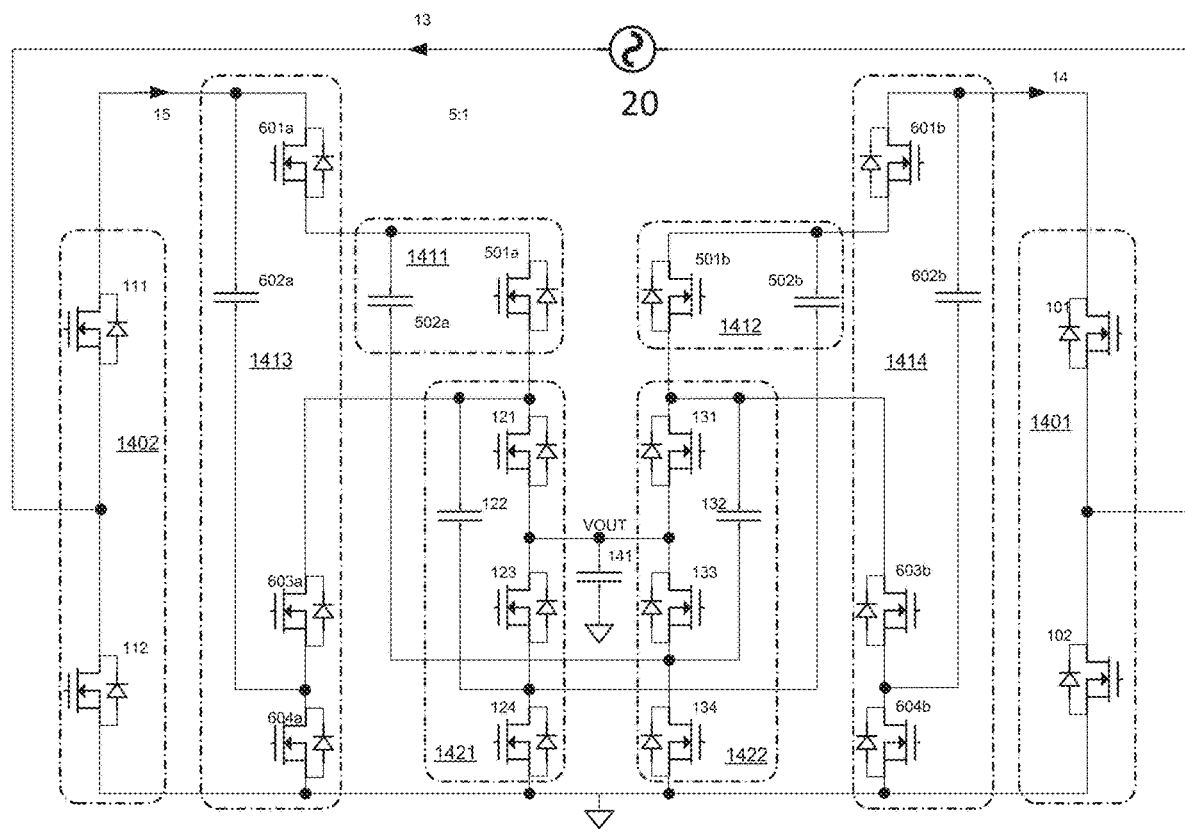
FIG. 20 illustrates a schematic diagram of a 5:1 step-down rectifier circuit in accordance with various embodiments of the present disclosure.

FIG. 20 illustrates a schematic diagram of a 5:1 step-down rectifier circuit in accordance with various embodiments of the present disclosure. Referring back to FIG. 14, two second-expansion units can be added into the circuit shown in FIG. 14 to achieve a higher step-down ratio. FIG. 15 shows a 4:1 step-down rectifier circuit. This 4:1 step-down rectifier circuit is obtained through adding two second-expansion units into the circuit shown in FIG. 14.

FIG. 20 shows a different way to expand the circuit with step-down ratio of 3:1 to connect the second-expansion units to achieve a 5:1 step-down ratio. As shown in FIG. 20, a third second-expansion unit 1413 is added to connect the second bridge arm unit 1402 and the first second-expansion unit 1411. A first terminal of the third second-expansion unit 1413 is connected to the drain of the third switch 111 in the second bridge arm unit 1402. A second terminal of the third second-expansion unit 1413 is connected to the drain of the switch 501*a* in the first second-expansion unit 1411. Similarly, a fourth second-expansion unit 1414 is added to connect the first bridge arm unit 1401 and the second second-expansion unit. A first terminal of the fourth second-expansion unit 1414 is connected to the drain of the first switch 101 in the first bridge arm unit 1401. A second terminal of the fourth second-expansion unit 1414 is connected to the drain of the switch 501*b* in the second second-expansion unit 1412.

It should be noted that the difference between FIG. 15 and FIG. 20 is that the third terminals of the third and fourth second-expansion units 1413, 1414 are no longer connected to the output terminal VOUT, but are respectively connected to the upper terminals of the first and second voltage converter units 1421, 1422. As shown in FIG. 20, the third terminal of the third second-expansion unit 1413 is connected to the drain of the fifth switch 121. The third terminal of the fourth second-expansion unit 1414 is connected to the drain of the eighth switch 131. In this connection configuration, the expansion switches 603a, 604a, 603b, 604b can no longer be combined with the sixth switch 123, the seventh switch 124, the ninth switch 133 and the tenth switch 134 as shown in FIG. 16. In other words, the circuit shown in FIG. 20 cannot be further simplified.

In operation, the 5:1 step-down rectifier circuit shown in FIG. 20 is configured to operate in the charge pump mode. When the alternating current signal 20 is in a positive half cycle, the control unit (e.g., control unit 160 shown in FIG. 2) is configured to control the second switch 102, the third switch 111, the sixth switch 123, the eighth switch 131, the tenth switch 134, the switch 501a, the switch 603a, the switch 604b and the switch 601b to be turned on. At this time, the flying capacitor 602a, the flying capacitor 122 and the output capacitor 141 are connected in series. The input AC current charges the flying capacitor 602a, the flying capacitor 122, and the output capacitor 141 in series. In addition, the input AC current also supplies power to the load. At the same time, the flying capacitor 502a charges the series-connected flying capacitor 122 and output capacitor 141, and supplies power to the load. Also at the same time, the flying capacitor 602b charges the series-connected flying capacitor 502b and output capacitor 141, and supplies power to the load. Finally, the flying capacitor 132 is connected in parallel with the output capacitor 141. The flying capacitor 132 charges the output capacitor 141, and supplies power to the load.

When the alternating current signal 20 is in a negative half cycle, a control unit (e.g., control unit 160 shown in FIG. 2) is configured to control the first switch 101, the fourth switch 112, the fifth switch 121, the seventh switch 124, the ninth switch 133, the switch 501b, the switch 603b, the switch 601a and the switch 604a to be turned on. At this time, the flying capacitor 602b, the flying capacitor 132 and the output capacitor 141 are connected in series. The input AC current charges the flying capacitor 602b, the flying capacitor 132, and the output capacitor 141 in series. In addition, the input AC current also supplies power to the load. At the same time, the flying capacitor 502b charges the series-connected flying capacitor 132 and output capacitor 141, and supplies power to the load. Also at the same time, the flying capacitor 602a charges the series-connected flying capacitor 502a and output capacitor 141, and supplies power to the load. Finally, the flying capacitor 122 is connected in parallel with the output capacitor 141. The flying capacitor 122 charges the output capacitor 141, and supplies power to the load.

In FIG. 20, all switches of the step-down rectifier circuit are repeatedly switched at the frequency of the input AC signal with a duty cycle of 50%. When the steady state is reached, the output voltage VOUT is one-fifth of the effective value of the input AC voltage. The voltages on the flying capacitors 602a and 602b are close to three times the output voltage VOUT. The voltages on the flying capacitors 502a and 502b are close to twice the output voltage VOUT. The voltages on the flying capacitors 122, 132 are almost the same as the output voltage VOUT.

Based on the 5:1 step-down rectifier circuit shown in FIG. 20, the following summarizes the connection methods for achieving different step-down ratios based on different configurations of the second-expansion units. The step-down ratio of the circuit shown in FIG. 20 can be increased by adding the fifth and sixth second-expansion units. The first terminal of the newly added second-expansion unit is always connected to the drain of the upper transistor in the bridge arm unit (e.g., the drain of the first switch 101 in the first bridge arm unit or the drain of the third switch 111 in the second bridge arm unit). The second terminal of the newly added second-expansion unit is always connected to the drain of the top switch of the combination of the expanded voltage converter unit and the expansion unit (e.g., the drain of the switch 601a or the drain of the switch 601b). The connection method of the third terminal of the newly added second-expansion unit directly determines the step-down ratio of the step-down rectifier circuit.

Figure 21:
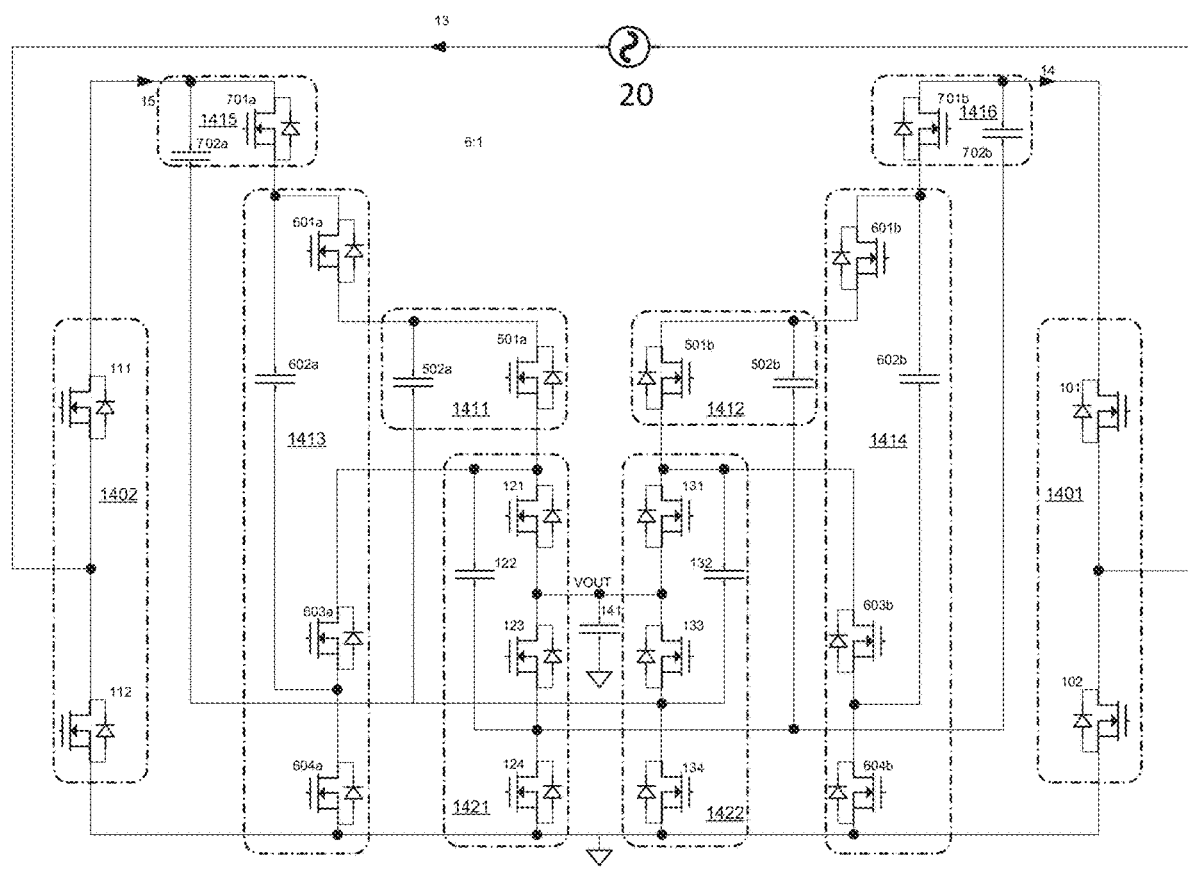
FIG. 21 illustrates a schematic diagram of a 6:1 step-down rectifier circuit in accordance with various embodiments of the present disclosure.

FIG. 21 illustrates a schematic diagram of a 6:1 step-down rectifier circuit in accordance with various embodiments of the present disclosure. The 6:1 step-down rectifier circuit shown in FIG. 21 is obtained based on the 5:1 step-down rectifier circuit shown in FIG. 20.

As shown in FIG. 21, the third terminals of the fifth and sixth second-expansion units 1415, 1416 are respectively coupled to VOUT. As a result, the step-down ratio is increased by adding one voltage (VOUT) across the output capacitor 141 based on the circuit in FIG. 20. In other words, the step-down ratio is increased from 5:1 to 6:1.

It should be noted that the newly added switches of the fifth and sixth second-expansion units 1415, 1416 can be combined with the sixth switch 123, the seventh switch 124, and the ninth switch 133 and the tenth switch 134 in the first and second voltage converter units 1421, 1422 to simplify the circuit structure. Meanwhile, the other terminals of the newly added expansion capacitors 702a and 702b are respectively connected to the common node of the ninth switch 133 and the tenth switch 134, and the common node of the sixth switch 123 and the seventh switch 124 as shown in FIG. 21. The operating principle of the circuit shown in FIG. 21 is similar to the operating principles of the circuits shown in FIG. 16 and FIG. 20. In particular, the switches 102, 111, 121, 133, 124, 501b, 601a, 604a, 603b, and 701b are turned on in one phase, and the other switches are turned on in the other phase. The switches of these two groups are alternately turned on with a 50% duty cycle.

In FIG. 21, all switches of the step-down rectifier circuit are repeatedly switched at the frequency of the input AC signal with a duty cycle of 50%. When the steady state is reached, the output voltage VOUT is one-sixth of the effective value of the input AC voltage. The voltages on the flying capacitors 701a and 701b are close to five times the output voltage VOUT. The voltages on the flying capacitors 602a and 602b are close to three times the output voltage VOUT. The voltages on the flying capacitors 502a and 502b are close to twice the output voltage VOUT. The voltages on the flying capacitors 122, 132 are almost the same as the output voltage VOUT.

It should be noted that the second-expansion units can be added in the same connection method described above to realize a step-down rectifier circuit with a higher step-down ratio.

Combined with the example in which the circuit shown in FIG. 14 is converted into the circuit shown in FIG. 0.15, and then simplified to the circuit shown in FIG. 16, the method of connecting the third terminal of the newly added second-expansion unit to VOUT can be obtained. Each time a pair of second-expansion units is added, the step-down ratio changes from N to N+1.

Figure 22:
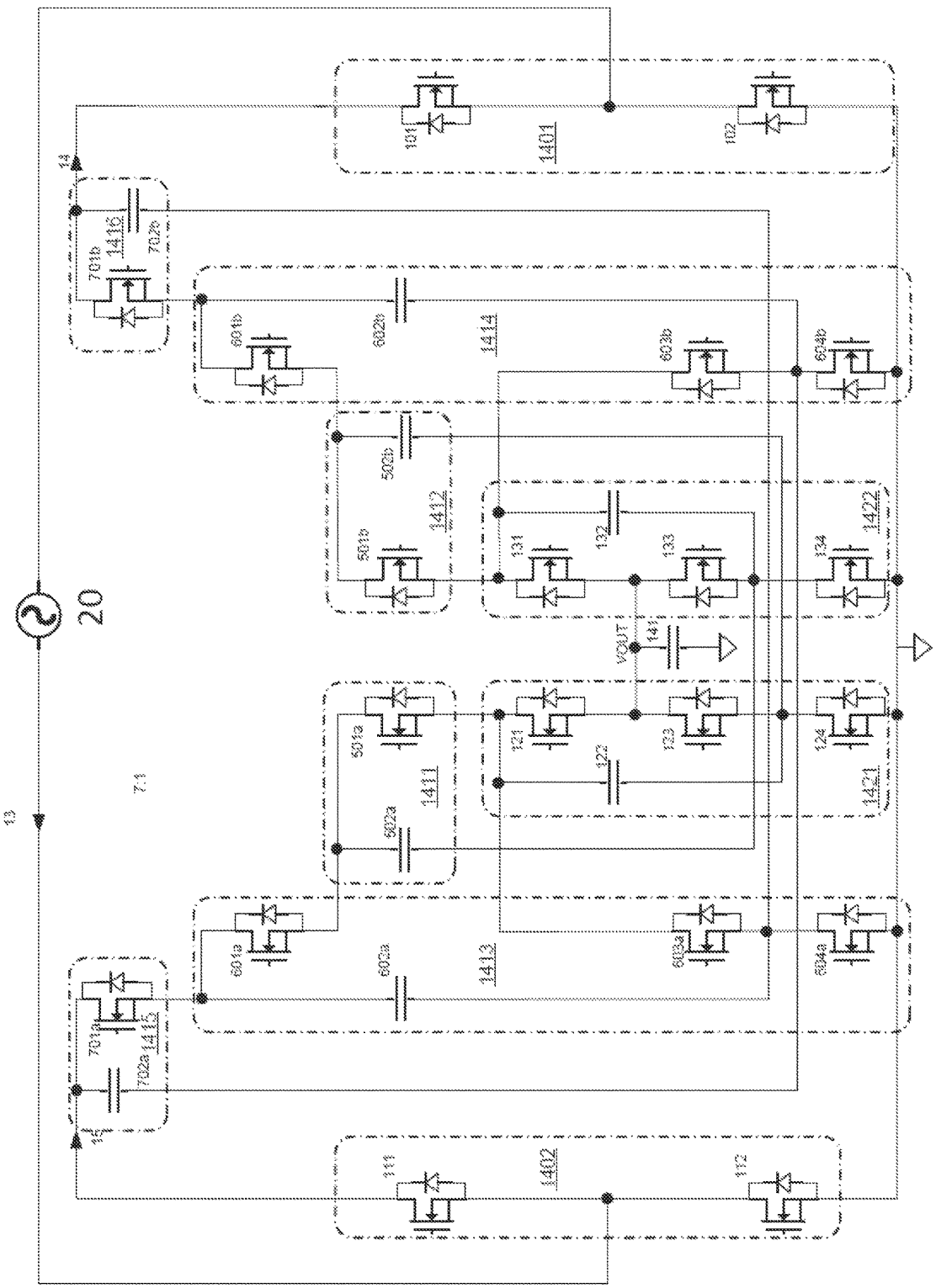
FIG. 22 illustrates a schematic diagram of a 7:1 step-down rectifier circuit in accordance with various embodiments of the present disclosure.

FIG. 22 illustrates a schematic diagram of a 7:1 step-down rectifier circuit in accordance with various embodiments of the present disclosure. The 7:1 step-down rectifier circuit shown in FIG. 22 is obtained based on the 5:1 step-down rectifier circuit shown in FIG. 20.

As shown in FIG. 22, the third terminals of the fifth and sixth second-expansion units 1415, 1416 are respectively connected to the input terminals of the first and second voltage converter units 1421, 1422 (e.g., drain terminal of the fourth switch 121 and drain terminal of the eighth switch 131 respectively). As a result, the step-down ratio is increased by adding one flying capacitor (e.g., 502*b*) voltage based upon the circuit in FIG. 20. The voltage across the flying capacitor 502*b* is equal to twice the output voltage VOUT. In other words, the step-down ratio is increased from 5:1 to 7:1.

It should be noted that the newly added switches of the fifth and sixth second-expansion units 1415, 1416 can no longer be combined with the two lower switches of the first and second voltage converter units 1421, 1422. But these switches can be combined with the two lower switches of the third and fourth second-expansion units 1413, 1414 (e.g., switches 603*a*, 604*a*, 603*b*, and 604*b*) to simplify the circuit structure as shown in FIG. 22. Meanwhile, the other terminals of the newly added expansion capacitors 702*a* and 702*b* are respectively connected to the common node the switch 603*b* and the switch 604*b*, and the common node of the switch 603*a* and the switch 604*a*. The operating principle of the circuit shown in FIG. 22 is similar to the operating principle of the circuit shown in FIG. 20. In particular, the switches 102, 111, 121, 133, 124, 501*b*, 601*a*, 604*a*, 603*b*, and 701*b* are turned on in one phase, and the other switches are turned on in the other phase. The switches of these two groups are alternately turned on with a 50% duty cycle.

In FIG. 22, all switches of the step-down rectifier circuit are repeatedly switched at the frequency of the input AC signal with a duty cycle of 50%. When the steady state is reached, the output voltage VOUT is one-seventh of the effective value of the input AC voltage. The voltages across the flying capacitors 702*a*, 702*b* is about five times VOUT. The voltages on the flying capacitors 602*a* and 602*b* are close to three times the output voltage VOUT. The voltages on the flying capacitors 502*a* and 502*b* are close to twice the output voltage VOUT. The voltages on the flying capacitors 122, 132 are almost the same as the output voltage VOUT.

It should be noted that the second-expansion units can be added in the same connection method as the expansion from the circuit with 5:1 step-down ratio in FIG. 20 to the circuit with 7:1 step-down ratio in FIG. 22 described above to realize a step-down rectifier circuit with a higher step-down ratio. Combined with the example in which the circuit shown in FIG. 14 is converted into the circuit shown in FIG. 20, the method of connecting the third terminal of the newly added second-expansion unit to the non-ground terminals of the voltage converter units can be obtained. Each time a pair of second-expansion units is added, the step-down ratio changes from N to N+2.

Figure 23:
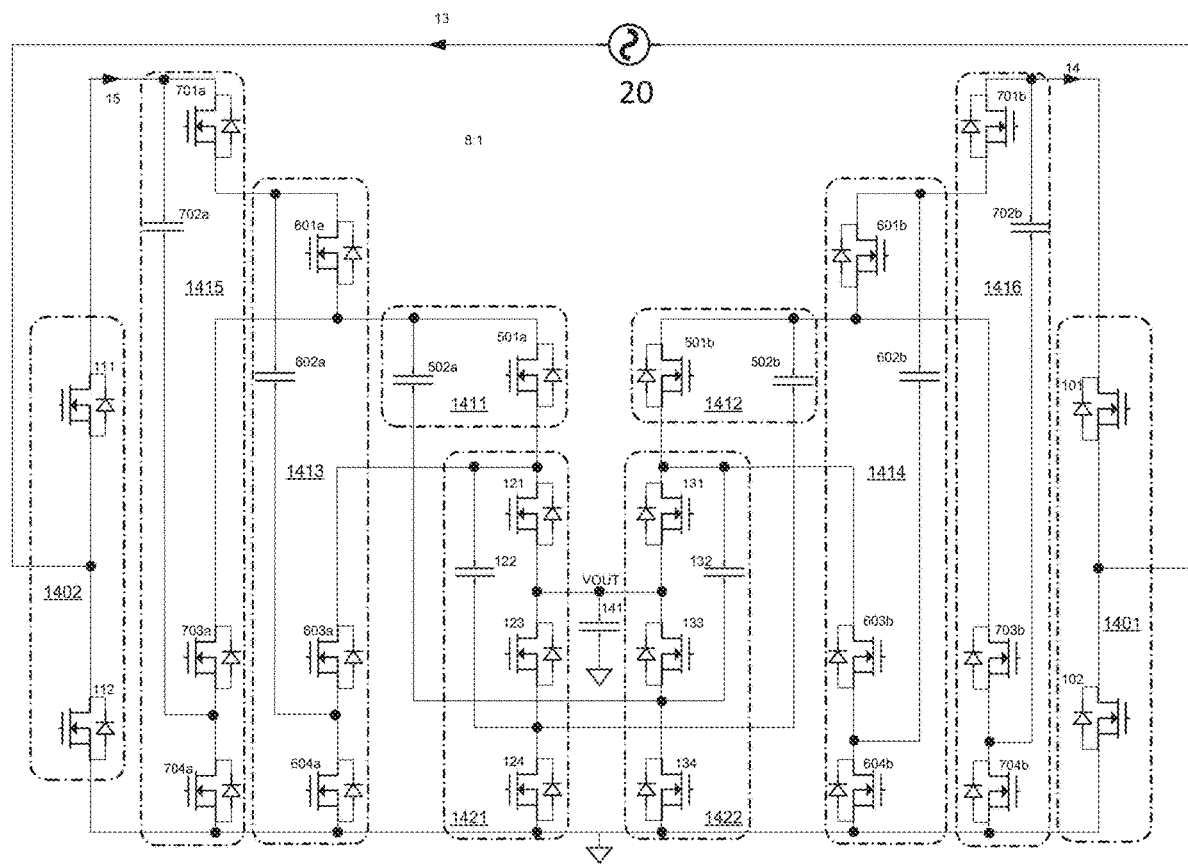
FIG. 23 illustrates a schematic diagram of an 8:1 step-down rectifier circuit in accordance with various embodiments of the present disclosure.

FIG. 23 illustrates a schematic diagram of an 8:1 step-down rectifier circuit in accordance with various embodiments of the present disclosure. The 8:1 step-down rectifier circuit shown in FIG. 23 is obtained based on the 5:1 step-down rectifier circuit shown in FIG. 20.

As shown in FIG. 23, the third terminals of the fifth and sixth second-expansion units 1415, 1416 are respectively connected to the sources of the uppermost switches of the combination of the voltage converter units and the second-expansion units (e.g., the source of the switch 601*a* or the source of the switch 601*b*). As a result, the step-down ratio is increased by adding one flying capacitor (e.g., 602*a*) voltage based upon the circuit in FIG. 20. The voltage across the flying capacitor 602*a* is equal to three times the output voltage VOUT. In other words, the step-down ratio is increased from 5:1 to 8:1.

It should be noted that the lower two switches (e.g., switches 703*a*, 704*a*, 703*b*, 704*b*) of the newly added fifth and sixth second-expansion units can no longer be combined with the existing circuits. The operating principle of the circuit shown in FIG. 23 is similar to the operating principle of the circuit shown in FIG. 20. In particular, the switches 102, 111, 121, 133, 124, 501*b*, 601*a*, 604*a*, 603*b*, 701*b*, 703*a*, and 704*b* are turned on in one phase, and the other switches are turned on in the other phase. The switches of these two groups are alternately turned on with a 50% duty cycle.

In FIG. 23, all switches of the step-down rectifier circuit are repeatedly switched at the frequency of the input AC signal with a duty cycle of 50%. When the steady state is reached, the output voltage VOUT is one-eighth of the effective value of the input AC voltage. The voltages across the flying capacitors 702*a*, 702*b* is about five times VOUT. The voltages on the flying capacitors 602*a* and 602*b* are close to three times the output voltage VOUT. The voltages on the flying capacitors 502*a* and 502*b* are close to twice the output voltage VOUT. The voltages on the flying capacitors 122, 132 are almost the same as the output voltage VOUT.

It should be noted that the second-expansion units can be added in the same connection method described above to realize a step-down rectifier circuit with a higher step-down ratio.

Combined with the example in which the circuit shown in FIG. 14 is converted into the circuit shown in FIG. 20, the method of connecting the third terminal of the newly added second-expansion unit to the source of the uppermost switch of the combination of the voltage converter unit and the second-expansion unit can be obtained. Each time a pair of second-expansion units is added, the step-down ratio changes from F(N) to F(N+1), where F(N)=F(N−1)+F(N−2), F(0)=F(1)=1, that is, F(N) is a Fibonacci sequence (e.g., 1, 1, 2, 3, 5, 8, 13 . . . ).

Figure 24:
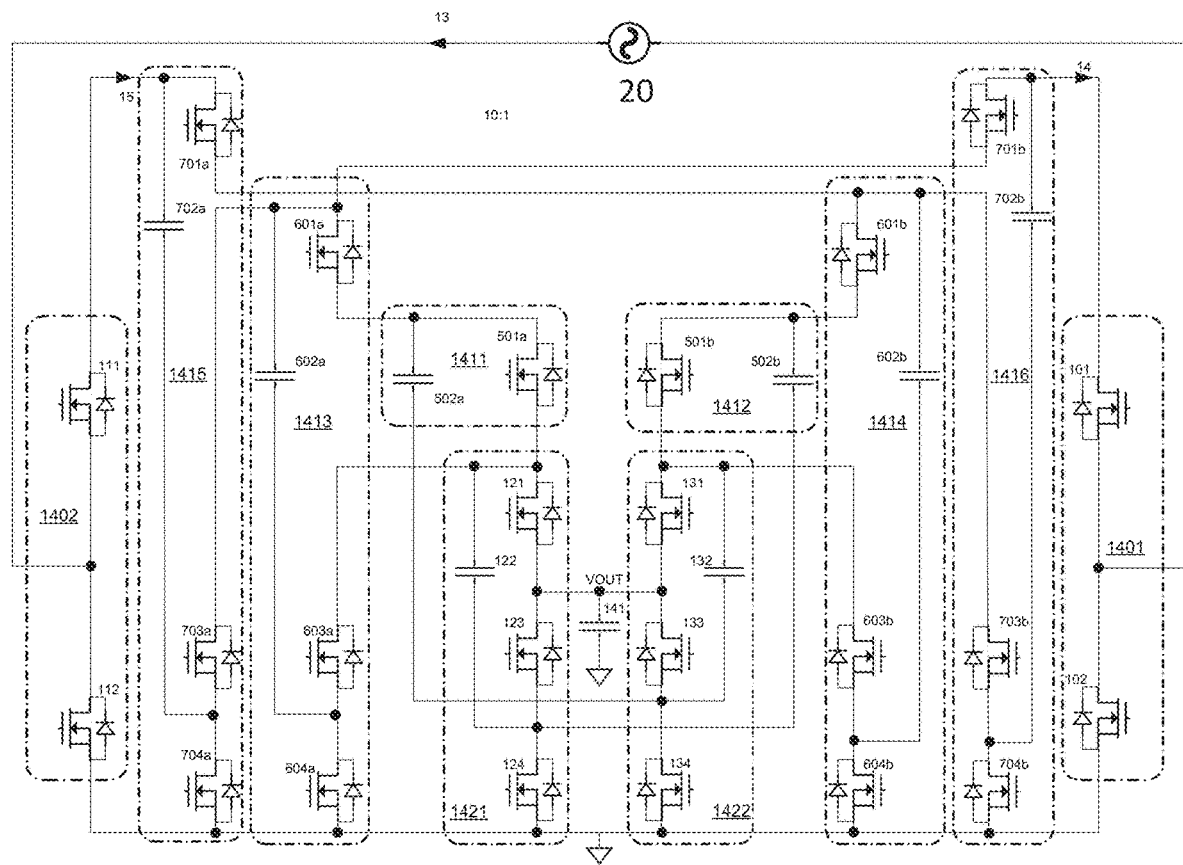
FIG. 24 illustrates a schematic diagram of a 10:1 step-down rectifier circuit in accordance with various embodiments of the present disclosure.

FIG. 24 illustrates a schematic diagram of a 10:1 step-down rectifier circuit in accordance with various embodiments of the present disclosure. The 10:1 step-down rectifier circuit shown in FIG. 24 is obtained based on the 5:1 step-down rectifier circuit shown in FIG. 20.

As shown in FIG. 24, the second terminals of the newly added fifth and sixth second-expansion unit 1416, 1415 are connected to the drains of the top switches of the combination of the expanded voltage converter unit and the expansion unit (e.g., the drain of the switch 601*a* or the drain of the switch 601*b* respectively). The third terminals of the fifth and sixth second-expansion units 1415, 1416 are respectively connected to the drains of the uppermost switches of the combination of the voltage converter units and the second-expansion units on the opposite side. (e.g., the drain of the switch 601*a* or the drain of the switch 601*b* respectively). As a result, the step-down ratio is doubled based on the circuit in FIG. 20. In other words, the step-down ratio is increased from 5:1 to 10:1.

Specifically, the second and third terminals of the fifth second-expansion unit 1415 are connected to the drains of the switch 601*b* and the switch 601*a*, respectively. The second and third terminals of the sixth second-expansion unit 1416 are connected to the drains of the switch 601a and the switch 601b, respectively. It should be noted here that the lower two switches (e.g., switches 703a, 704a, 703b, 704b) of the newly added fifth and sixth second-expansion units 1415, 1416 can no longer be combined with the existing circuits. The operating principle of the circuit shown in FIG. 24 is similar to the operating principle of the circuit shown in FIG. 20. In particular, the switches 101, 112, 121, 133, 124, 501b, 601a, 604a, 603b, 701a, 703b, and 704a are turned on in one phase, and the other switches are turned on in the other phase. The switches of these two groups are alternately turned on with a 50% duty cycle.

In FIG. 24, all switches of the step-down rectifier circuit are repeatedly switched at the frequency of the input AC signal with a duty cycle of 50%. When the steady state is reached, the output voltage VOUT is one-tenth of the effective value of the input AC voltage. The voltages across the flying capacitors 702a, 702b is about five times VOUT. The voltages on the flying capacitors 602a and 602b are close to three times the output voltage VOUT. The voltages on the flying capacitors 502a and 502b are close to twice the output voltage VOUT. The voltages on the flying capacitors 122, 132 are almost the same as the output voltage VOUT.

It should be noted that the second-expansion units can be added in the same connection method described above to realize a step-down rectifier circuit with a higher step-down ratio. Combined with the examples in which the circuit shown in FIG. 13 is converted into the circuit shown in FIG. 18, the circuit shown in FIG. 18 is converted into the circuit shown in FIG. 19, and the circuit shown in FIG. 14 is converted into the circuit shown in FIG. 18, the method of alternately connecting the second and third terminals of the newly added second-expansion units to the drains of the uppermost switches of the combination of the voltage converter units and the second-expansion units can be obtained. Each time a pair of second-expansion units is added, the step-down ratio is doubled. In other words, the step-down ratio changes from N to 2N.

The various methods for connecting the third terminal of the second-expansion unit described above can be used in combination to obtain an arbitrary integer step-down ratio, and those skilled in the art can combine appropriate step-down rectifier circuits according to actual needs. Various permutations and combinations based on the second-expansion units are within the scope of the present disclosure.

The above-mentioned various step-down rectifier circuits have a common challenge, that is, when the frequency of the input AC signal is relatively low (e.g., the operating frequency of the wireless charging system in a range from about 110 KHz to about 148.5 KHz), charge transferring between flying capacitors may cause current spikes, thereby generating power losses. In order to solve this problem, the present disclosure proposes two circuit structures and the corresponding control methods to improve the power conversion efficiency of the step-down rectifier circuit. The first method for improving the power conversion efficiency of the step-down rectifier circuit will be discussed below with respect to FIGS. 25-27. The second method for improving the power conversion efficiency of the step-down rectifier circuit will be discussed below with respect to FIGS. 28-35.

Figure 25:
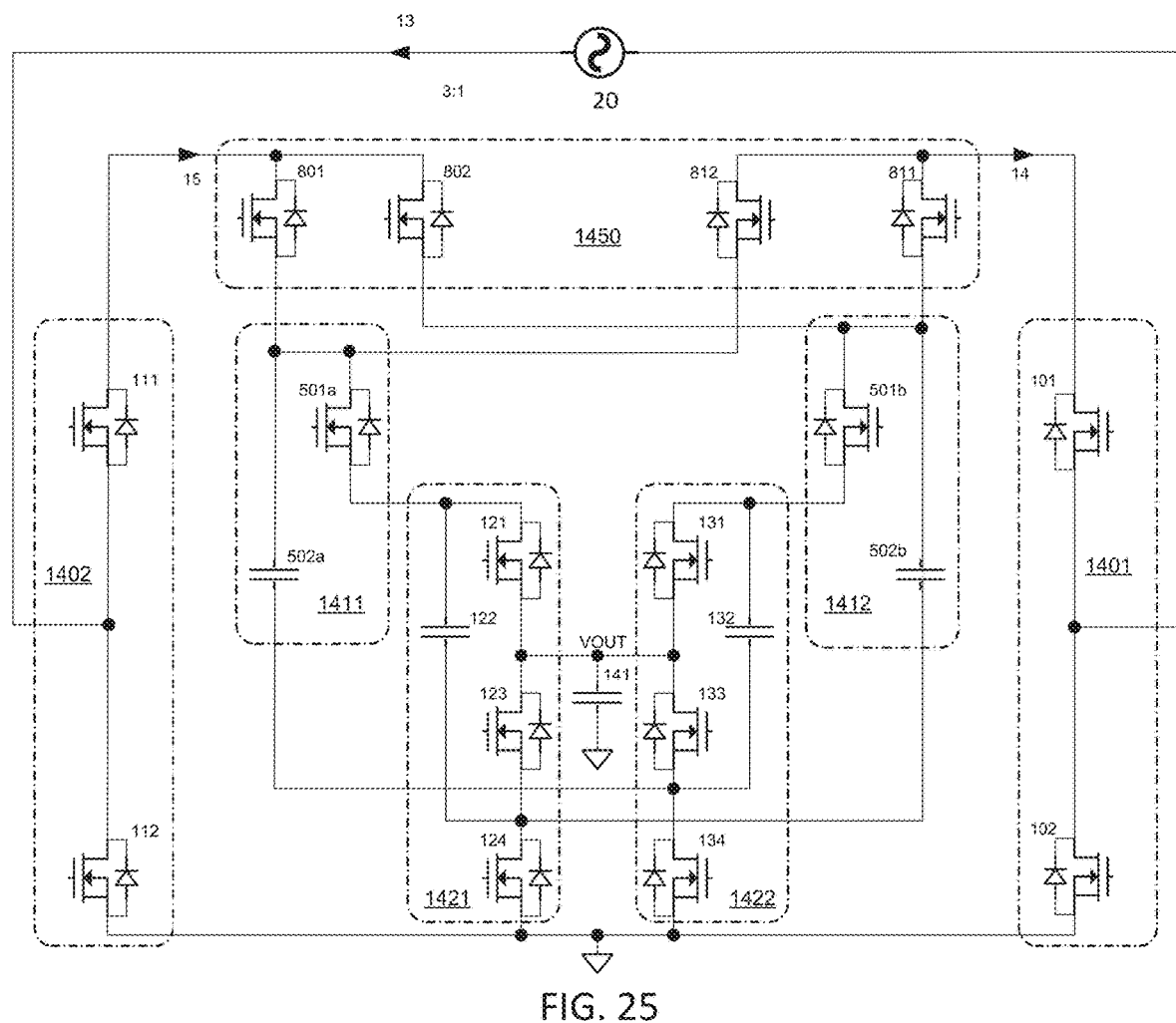
FIG. 25 illustrates a schematic diagram of a 3:1 step-down rectifier circuit including a frequency multiplier unit in accordance with various embodiments of the present disclosure.

FIG. 25 illustrates a schematic diagram of a 3:1 step-down rectifier circuit including a frequency multiplier unit in accordance with various embodiments of the present disclosure. In order to operate efficiently at a relatively low frequency of the input AC signal, the step-down rectifier circuit operating efficiently can be realized by inserting a frequency multiplier unit 1450. As a result of having this frequency multiplier unit 1450, the 3:1 step-down rectifier circuit operates at a frequency equal to an integer multiple of the input AC signal frequency.

The 3:1 step-down rectifier circuit shown in FIG. 25 is similar to the 3:1 step-down rectifier circuit shown in FIG. 14 except that a frequency multiplier unit 1450 is included. The frequency multiplier unit 1450 comprises switches 801, 802, 811, 812. These four switches may be alternatively referred to as frequency multiplication switches.

As shown in FIG. 25, the bridge arm units 1401, 1402 and the circuit comprising the voltage converter units 1421, 1422 and the second-expansion units 1411, 1412 are disconnected, and switches 801, 802, 811, 812 are inserted into the 3:1 step-down rectifier circuit. The drains of the first and second frequency multiplication switches 801 and 802 are both connected to the drains of the third switch 111 in the second bridge arm unit 1402. The drains of the third and fourth frequency multiplication switches 812 and 811 are both connected to the drains of the first switching transistors 101 in the first bridge arm unit 1401. The sources of the first and third frequency multiplying switches 801 and 812 are connected to the drain of the switch 501a. The sources of the second and fourth frequency multiplying switches 802 and 811 are connected to the drain of the switch 501b.

In operation, each switch in the 3:1 step-down rectifier circuit comprising the voltage converter units 1421, 1422, the second-expansion units 1411, 1412 and the frequency multiplier unit 1450 operates at a frequency equal to an integer multiple of the input AC signal frequency to reduce the current spikes caused by charge transferring between the flying capacitors, thereby reducing the charge transferring losses due to the current spikes. For example, the 3:1 step-down rectifier circuit is configured to operate at the double frequency of the input AC signal. When the input AC signal is in a first half of the positive half cycle, the control unit controls the switches 102, 111, 802, 501a, 123, 131, 134 to be turned on, and controls the other switches to be turned off. When the input AC signal is in a second half of the positive half cycle, the control unit controls switches 102, 111, 801, 501b, 121, 124, and 133 to be turned on, and control the other switches to be turned off. When the input AC signal is in a first half of the negative half cycle, the control unit controls the switches 101, 112, 811, 501a, 123, 131, and 134 to be turned on, and controls the other switches to be turned off. When the input AC signal is in a second half of the negative half cycle, the control unit controls switches 101, 112, 812, 501b, 121, 124, and 133 to be turned on, and controls the other switches to be turned off. In this way, a voltage at the output terminal VOUT is one-third of the effective value of the input AC voltage.

It should be noted that the step-down rectifier circuit comprising the voltage converter unit, the expansion units and the frequency multiplier unit can be configured to operate at any integer multiple of the frequency of the input AC signal. Similarly, the circuits shown in FIGS. 14-24 in the present disclosure can be controlled by the same method discussed above with respect to FIG. 25. More particularly, the method comprises disconnecting the bridge arm units from the voltage converter units and the expansion units, and inserting the frequency multiplication unit. The method can control the step-down rectifier circuit comprising the voltage converter unit, the expansion units and the frequency multiplier unit so that each switch in the step-down rectifier circuit operates at an integer multiple of the frequency of the input AC signal. As a result, higher power conversion efficiency can be achieved when the frequency of the input AC signal is low.

Figure 26:
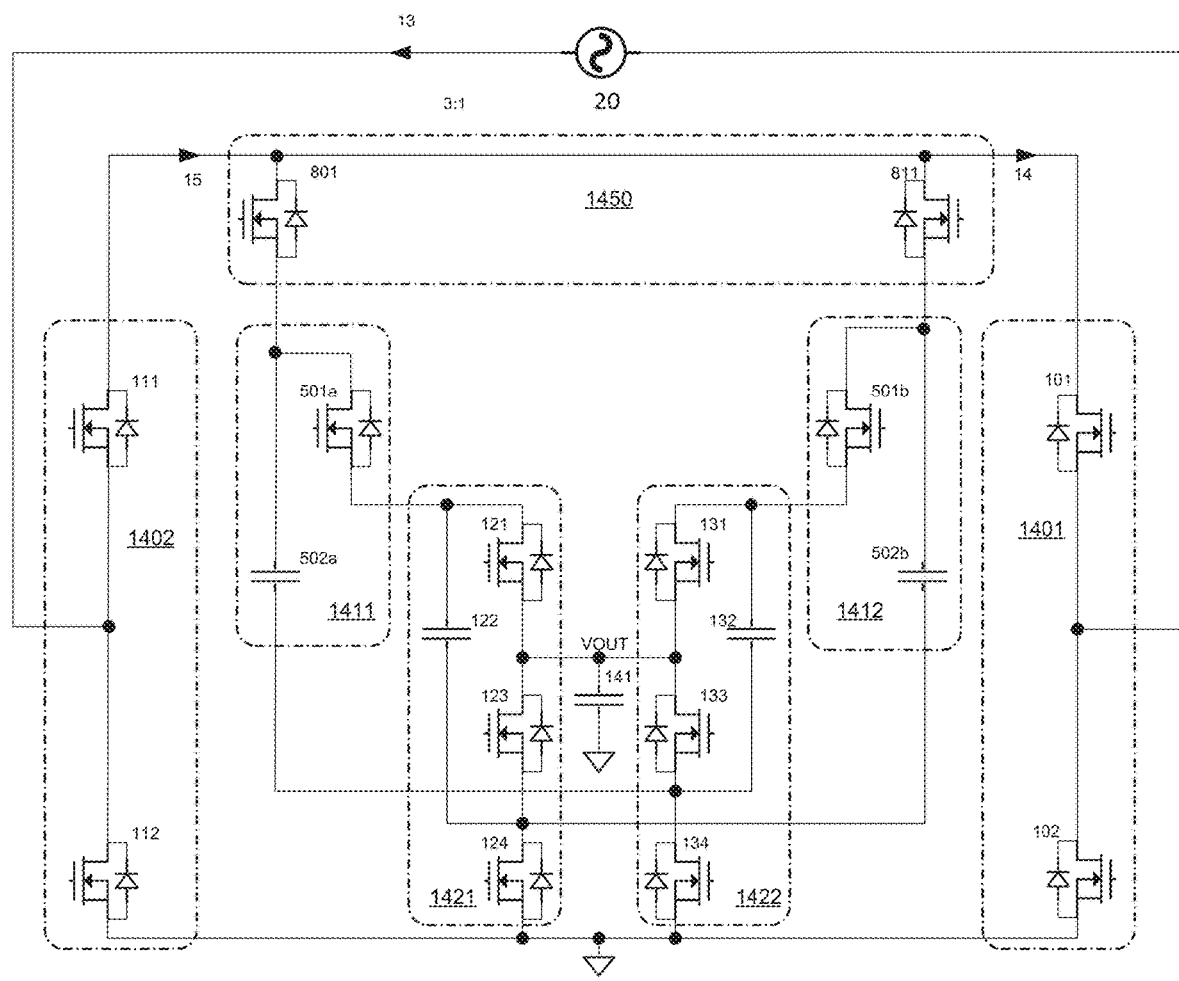
FIG. 26 illustrates a schematic diagram of another 3:1 step-down rectifier circuit including a frequency multiplier unit in accordance with various embodiments of the present disclosure.

FIG. 26 illustrates a schematic diagram of another 3:1 step-down rectifier circuit including a frequency multiplier unit in accordance with various embodiments of the present disclosure. The 3:1 step-down rectifier circuit shown in FIG. 26 is similar to the 3:1 step-down rectifier circuit shown in FIG. 14 except that a frequency multiplier unit 1450 is included. The frequency multiplier unit 1450 comprises switches 801, 811. These two switches may be alternatively referred to as frequency multiplication switches.

As shown in FIG. 26, the bridge arm units 1401, 1402 and the circuit comprising the voltage converter units 1421, 1422 and the second-expansion units 1411, 1412 are disconnected, and switches 801, 811 are inserted into the 3:1 step-down rectifier circuit. The drains of the frequency multiplication switches 801 and 802 are connected to the drains of the third switch 111 in the second bridge arm unit 1402 and the drain of the first switch 101 in the first bridge arm unit 1401. The source of the first frequency multiplication switch 801 is connected to the drain of the switch 501a, and the source of the frequency multiplication switch 811 is connected to the drain of the switch 501b.

In operation, each switch in the 3:1 step-down rectifier circuit comprising the voltage converter units 1421, 1422, the second-expansion units 1411, 1412 and the frequency multiplier unit 1450 operates at a frequency equal to an integer multiple of the input AC signal frequency to reduce the current spikes caused by charge transferring between the flying capacitors, thereby reducing the charge transferring losses due to the current pulses. Specifically, the control unit controls the combination of switches 811, 501a, 123, 131 and 134, and the combination of switches 801, 501b, 121, 124 and 133 to be turned on and off alternately at an integer multiple of the frequency of the input AC signal. The switching of the switches in the first and second bridge arms is synchronized with the switching of the switches of the step-down section of the 3:1 step-down rectifier circuit. In this way, a voltage at the output terminal VOUT is one-third of the effective value of the input AC voltage.

Figure 27:
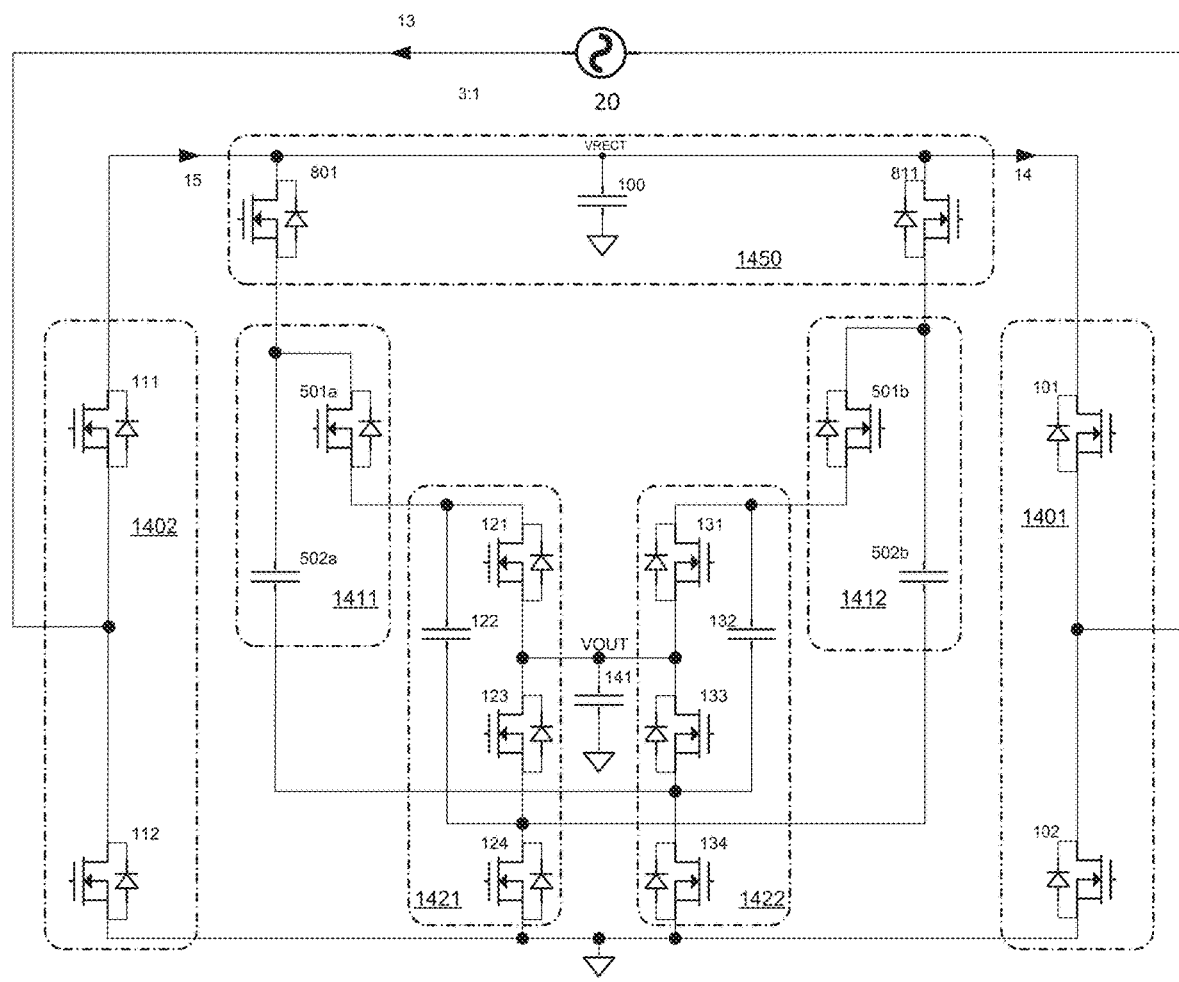
FIG. 27 illustrates a schematic diagram of yet another 3:1 step-down rectifier circuit including a frequency multiplier unit in accordance with various embodiments of the present disclosure.

It should be noted that the step-down rectifier circuit comprising the voltage converter unit, the expansion units and the frequency multiplier unit can be configured to operate at any integer multiple of the frequency of the input AC signal. Similarly, the circuits shown in FIGS. 14-24 in the present disclosure can be controlled by the same method discussed above with respect to FIG. 26. More particularly, the method comprises disconnecting the bridge arm units from the voltage converter units and the expansion units, and inserting the frequency multiplication unit. The method can control the step-down rectifier circuit comprising the voltage converter unit, the expansion units and the frequency multiplier unit so that each switch in the step-down rectifier circuit operates at an integer multiple of the frequency of the input AC signal. As a result, higher power conversion efficiency can be achieved when the frequency of the input AC signal is low FIG. 27 illustrates a schematic diagram of yet another 3:1 step-down rectifier circuit including a frequency multiplier unit in accordance with various embodiments of the present disclosure. The 3:1 step-down rectifier circuit shown in FIG. 27 is similar to the 3:1 step-down rectifier circuit shown in FIG. 26 except that a filtering capacitor 100 is included.

As shown in FIG. 27, the filtering capacitor 100 is added to make the voltage at the VRECT terminal close to a DC voltage. As a result of having a DC voltage at VRECT, the operating frequency of the 3:1 step-down rectifier circuit can be freely selected, and it is not necessary to have an integer multiple relationship or synchronization with the input AC signal frequency. Similar frequency decoupling units (e.g., filtering capacitor 100) can be used in any of the circuits shown in FIGS. 14-24 of the present disclosure to achieve the operating frequency decoupling.

The second method to deal with the extra loss caused by the current spike when the charge is transferred between the flying capacitors is to limit the sudden change of the current in the charging and discharging loop by connecting inductive elements in series. For a step-down rectifier circuit, the input is often an inductive coil (e.g., the receiving coil in wireless charging applications). The input is an inductive input. This inductive input is similar to a current source. As a result, there will be no current spikes when the flying capacitors are charged by the AC input. However, in the process of discharging the flying capacitor to the load, the output VOUT is connected in parallel with the output capacitor 141. When the charge is transferred from the flying capacitor to the output capacitor 141, a current spike will inevitably be generated due to the voltage difference.

Figure 28:
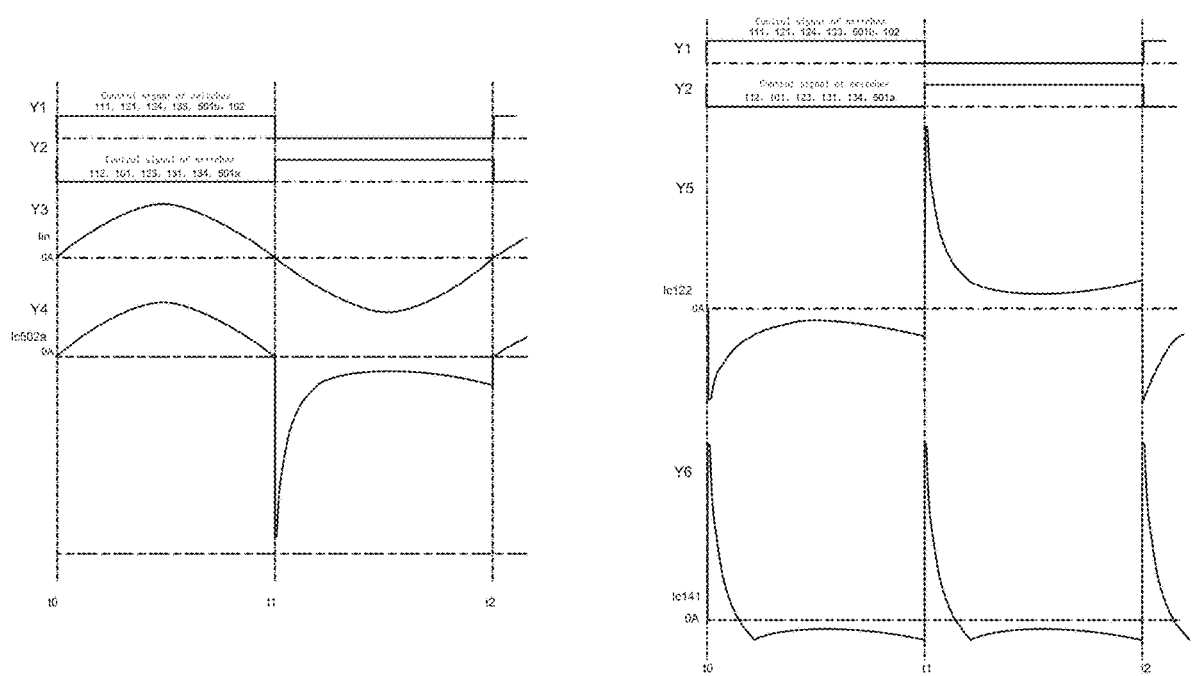
FIG. 28 illustrates various waveforms associated with the 3:1 step-down rectifier circuit shown in FIG. 14 in accordance with various embodiments of the present disclosure.

FIG. 28 illustrates various waveforms associated with the 3:1 step-down rectifier circuit shown in FIG. 14 in accordance with various embodiments of the present disclosure. The horizontal axis of FIG. 28 represents intervals of time. There may be six vertical axes. The first vertical axis Y1 represents the gate drive signal of switches 111, 121, 124, 133, 501b and 102. The second vertical axis Y2 represents the gate drive signal of switches 112, 101, 123, 131, 134 and 501a. The third vertical axis Y3 represents the input current Iin. The fourth vertical axis Y4 represents the current Ic502a flowing through the flying capacitor 502a. The fifth vertical axis Y5 represents the current Ic122 flowing through the flying capacitor 122. The sixth vertical axis Y6 represents the current Ic141 flowing through the output capacitor 141.

Figure 29:
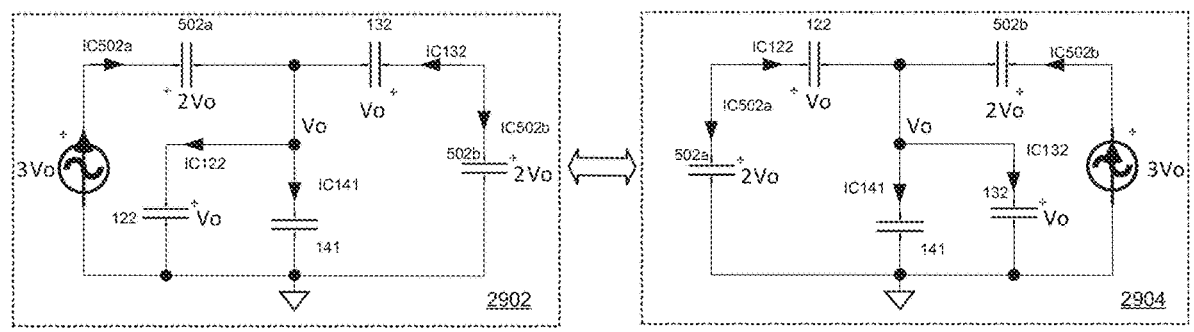
FIG. 29 illustrates two equivalent circuit diagrams for operating in two different half cycles in accordance with various embodiments of the present disclosure.

FIG. 29 illustrates two equivalent circuit diagrams for operating in two different half cycles in accordance with various embodiments of the present disclosure. Circuit 2902 is the equivalent circuit of the 3:1 step-down rectifier circuit shown in FIG. 14 configured to operate in the first half cycle. Circuit 2904 is the equivalent circuit of the 3:1 step-down rectifier circuit shown in FIG. 14 configured to operate in the second half cycle.

FIG. 28 shows when the input AC current signal Iin is in the positive half cycle (from t0 to t1 shown in FIG. 28), the input AC current charges the series-connected flying capacitor 502a and the output capacitor 141 through the turned-on switches 111 and 133, and provides power to the load at VOUT. At the same time, the flying capacitor 502b discharges through the series-connected flying capacitor 132 and output capacitor 141 and the turned-on switches 501b and 133, and supplies power to the load at the VOUT terminal. Also at the same time, the flying capacitor 122 is connected in parallel with the output capacitor 141 and the load at the VOUT terminal through the turned-on switches 121 and 124. The equivalent circuit of this period is shown in circuit 2902 in FIG. 29.

As shown in FIG. 28, the current Ic502a flowing through the flying capacitor 502a indicates the current source characteristics of the input AC source 20. As shown in FIG. 28, the current Ic502a is a sine wave. On the other hand, the current Ic141 flowing through the output capacitor 141 has a significant current spike at the beginning (t0 shown in FIG. 28) of the positive half cycle of the input current. At this time, since the voltage at the VOUT terminal of the series-connected flying capacitors 502b and 132 is higher than the voltage on the output capacitor 141, the charge transferred from the flying capacitors 502b and 132 to the output capacitor 141 at time t0 will generate a significant current spike. The current spike also causes charge transfer losses. In the same way, the flying capacitor 122 is also connected in parallel with the output capacitor 141 and the load. At time t0, the voltage on the flying capacitor 122 is also slightly higher than the voltage on the output capacitor 141, so the current Ic122 flowing through the flying capacitor 122 will also have a current spike. At time t0, the flying capacitor 122 is also charging the output capacitor at the same time.

When the input AC current signal Iin is in the negative half cycle (from t1 to t2 shown in FIG. 28), the input AC current charges the series-connected flying capacitor 502b and output capacitor 141 through the turned-on switches 101 and 123 and provides power to the load. At the same time, the flying capacitor 502a charges the series-connected flying capacitor 122 and output capacitor 141 through the turned-on switches 501a and 123, and supplies power to the load at the VOUT terminal. At the same time, the flying capacitor 132 is connected in parallel with the output capacitor 141 and the load at the VOUT terminal through the turned-on switches 131 and 134. The equivalent circuit of this period is shown in circuit 2904 in FIG. 29.

The current Ic141 flowing through the output capacitor 141 shows there is also a significant current spike at the beginning of the negative half cycle of the input current (time t1). This is because the voltage at the VOUT terminal of the series circuit formed by the flying capacitors 502a and 122 is higher than the voltage on the output capacitor 141. When the charge is transferred from the flying capacitors 502a and 122 to the output capacitor 141 at time t1, the voltage difference will generate a significant current spike. The current spike also causes charge transfer losses. Due to the series connection, the currents Ic122 and Ic502a have the same amplitude and opposite directions in the negative half cycle (from t1 to t2) of the input current. The flying capacitor 132 is also connected in parallel with the output capacitor 141 and the load. At time t1, the voltage on the flying capacitor 132 is also slightly higher than the voltage on the output capacitor 141. At time t0, the flying capacitor 132 is also charging the output capacitor at the same time.

It can be seen from the analysis above that although the input AC constant current source characteristics brought by the inductive coil can eliminate the current spike and the corresponding charge transfer losses during the charging process of the flying capacitor, in the process of discharging the flying capacitor to the output, there are still significant current spikes and charge transfer losses between the flying capacitor and the output capacitor. In order to solve this problem, an inductive element is connected in series with the output terminal of the step-down rectifier circuit to limit the peak current when the flying capacitor discharges to the output capacitor.

Figure 30:
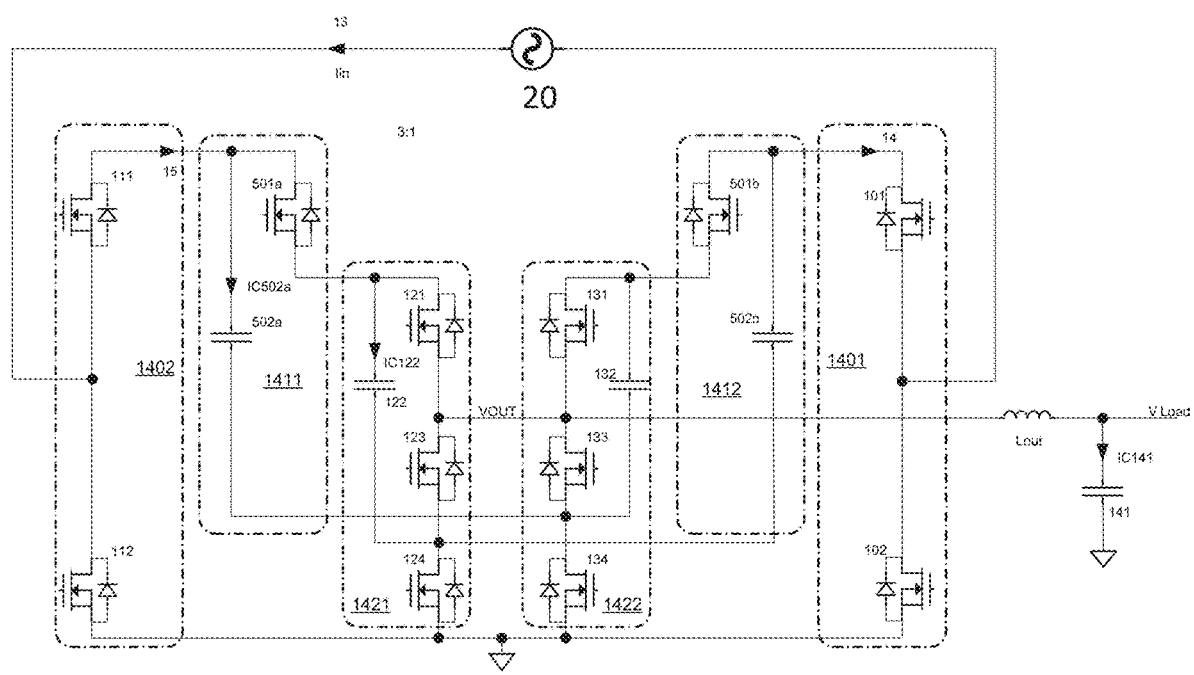
FIG. 30 illustrates a schematic diagram of a 3:1 step-down rectifier circuit including an inductive element in accordance with various embodiments of the present disclosure.

FIG. 30 illustrates a schematic diagram of a 3:1 step-down rectifier circuit including an inductive element in accordance with various embodiments of the present disclosure. As shown in the circuit in FIG. 30, based on the circuit structure in FIG. 14, a series inductor Lout is added to the VOUT terminal to limit the rapid change of the current on the output capacitor, thereby reducing the losses caused by the charge transfer between the flying capacitor and the output capacitor.

Figure 31:
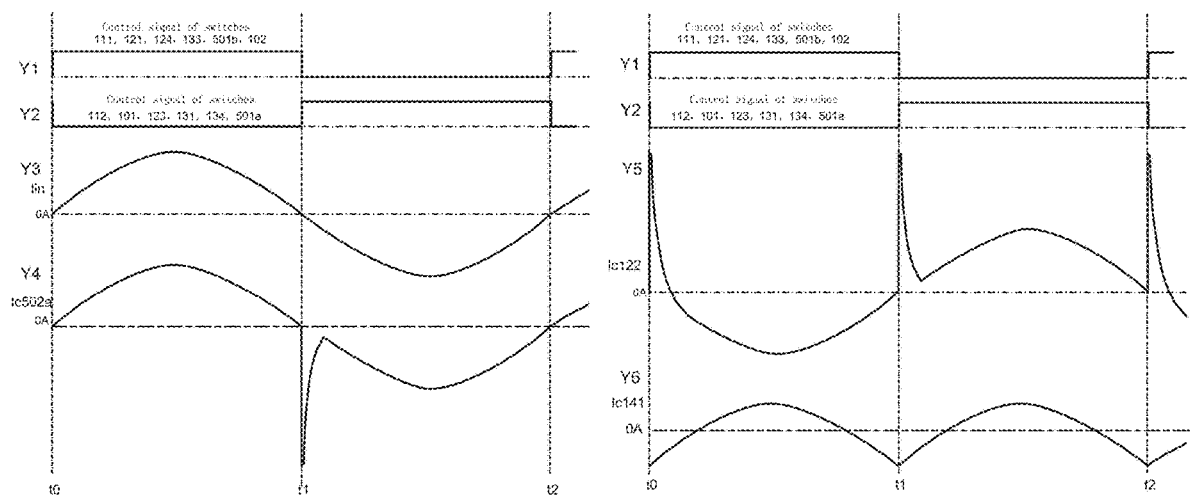
FIG. 31 illustrates various waveforms associated with the 3:1 step-down rectifier circuit shown in FIG. 30 in accordance with various embodiments of the present disclosure.

FIG. 31 illustrates various waveforms associated with the 3:1 step-down rectifier circuit shown in FIG. 30 in accordance with various embodiments of the present disclosure. The horizontal axis of FIG. 31 represents intervals of time. There may be six vertical axes. The first vertical axis Y1 represents the gate drive signal of switches 111, 121, 124, 133, 501b and 102. The second vertical axis Y2 represents the gate drive signal of switches 112, 101, 123, 131, 134 and 501a. The third vertical axis Y3 represents the input current Iin. The fourth vertical axis Y4 represents the current Ic502a flowing through the flying capacitor 502a. The fifth vertical axis Y5 represents the current Ic122 flowing through the flying capacitor 122. The sixth vertical axis Y6 represents the current Ic141 flowing through the output capacitor 141.

In some embodiments, the value of the output inductance Lout can be selected to resonate with the total capacitance in the discharge loop at the switching frequency to further reduce the switching losses. From the circuit at the output capacitor 141, due to the existence of the output inductance Lout, the current spike flowing through the output capacitor 141 no longer exists. When the output inductance and the total capacitance in the discharge loop reach resonance, the waveform of the current flowing through the output capacitor 141 is approximately half a sine wave as shown in FIG. 31.

From the current waveforms of Ic502a and Ic122 in FIG. 31, it can be seen that although the current spike on the output capacitor is eliminated, the flying capacitor 122 still has a current spike at time t0 and t1. In other words, there is still an uncontrolled transfer of charge between capacitors, resulting in current spikes.

As can be seen from the previous analysis of FIG. 28 and combined with the equivalent circuit 2902 shown in FIG. 29, in the positive half cycle of the input AC current, the flying capacitor 122 and the series-connected flying capacitors 502b and 132 are connected in parallel to charge the output capacitor 141. The voltage on the VOUT terminal of the series-connected flying capacitors 502b and 132 is higher than the voltage from the flying capacitor 122. The combination of two different branches of flying capacitors can simultaneously charge the output capacitor 141 with different currents. The discharge current of the branch including the flying capacitor 122 is smaller than that of the branch including the flying capacitors 502b and 132 in series. However, in the step-down rectifier circuit in FIG. 30, the newly added output inductor Lout limits the change of the current discharged from the flying capacitors to the output capacitor 141. The two branches of flying capacitors connected in parallel have different voltages at the VOUT terminal. As a result of the voltage difference, charge transfer between capacitors occurs.

As can be seen from the waveform of the current flowing through Ic122 in FIG. 31, at time t0, due to the existence of Lout, and the voltage on VOUT from the series-connected flying capacitors 502b and 132 is slightly higher, the flying capacitor 122 no longer supplies power to the output capacitor 141. Instead, the flying capacitor 122 is charged by the series-connected flying capacitors 502b and 132. As shown in FIG. 31, the direction of the current spike of the current flowing through the flying capacitor 122 is positive. Until the voltage on the flying capacitor 122 and the voltage on the series-connected flying capacitors 502b and 132 are balanced, the series-connected flying capacitors 502b and 132 supplies power to the output capacitor 141 and the load at the same time. As shown in FIG. 31, between t0 and t1, the current direction of the current flowing through the flying capacitor 122 changes from positive to negative.

Similarly, at the beginning of the negative half cycle of the input AC current (time t1), the series-connected flying capacitors 502a and 122 are connected in parallel with the flying capacitor 132, and the voltage from the flying capacitor 132 is slightly lower. At the time t1, the series-connected flying capacitors 502*a* and 122 first charges the flying capacitor 132 with a current spike until the voltage on the flying capacitor 132 and the voltage on the series-connected flying capacitors 502*a* and 122 are balanced, and then the two branches of flying capacitors simultaneously charge the output capacitor 141, and supply power to the load. Due to the series connection, in the negative half cycle of the input current (from t1 to t2), the currents Ic122 and Ic502*a* have the same amplitude and opposite directions as shown in FIG. 31.

It should be noted that the charge transfer current spike between the flying capacitors and the consequent loss caused by the voltage imbalance are a common problem in the expansion of the step-down rectifier circuit. It needs a new control scheme to solve this problem.

Figure 32:
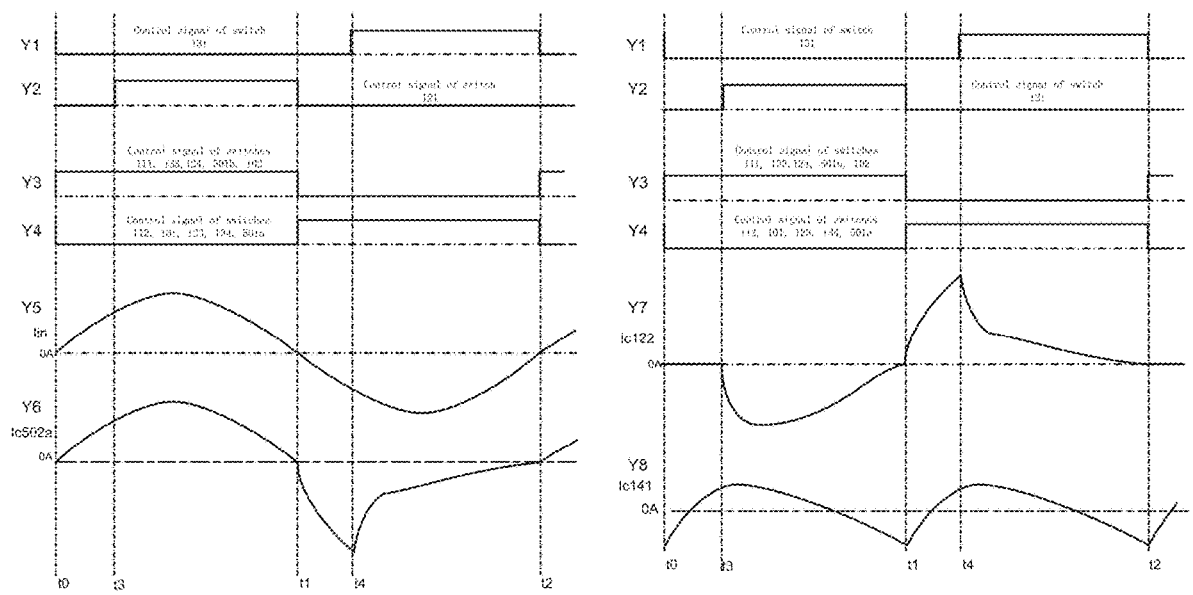
FIG. 32 illustrates various waveforms associated with the 3:1 step-down rectifier circuit shown in FIG. 30 under a new control scheme in accordance with various embodiments of the present disclosure.

FIG. 32 illustrates various waveforms associated with the 3:1 step-down rectifier circuit shown in FIG. 30 under a new control scheme in accordance with various embodiments of the present disclosure. The horizontal axis of FIG. 32 represents intervals of time. There may be eight vertical axes. The first vertical axis Y1 represents the gate drive signal of switches 131. The second vertical axis Y2 represents the gate drive signal of switches 121. The third vertical axis Y3 represents the gate drive signal of switches 111, 133, 124, 501*b* and 102. The fourth vertical axis Y4 represents the gate drive signal of switches 112, 101, 123, 134 and 501*a*. The fifth vertical axis Y5 represents the input current Iin. The sixth vertical axis Y6 represents the current Ic502*a* flowing through the flying capacitor 502*a*. The seventh vertical axis Y7 represents the current Ic122 flowing through the flying capacitor 122. The eighth vertical axis Y8 represents the current Ic141 flowing through the output capacitor 141.

Figure 33:
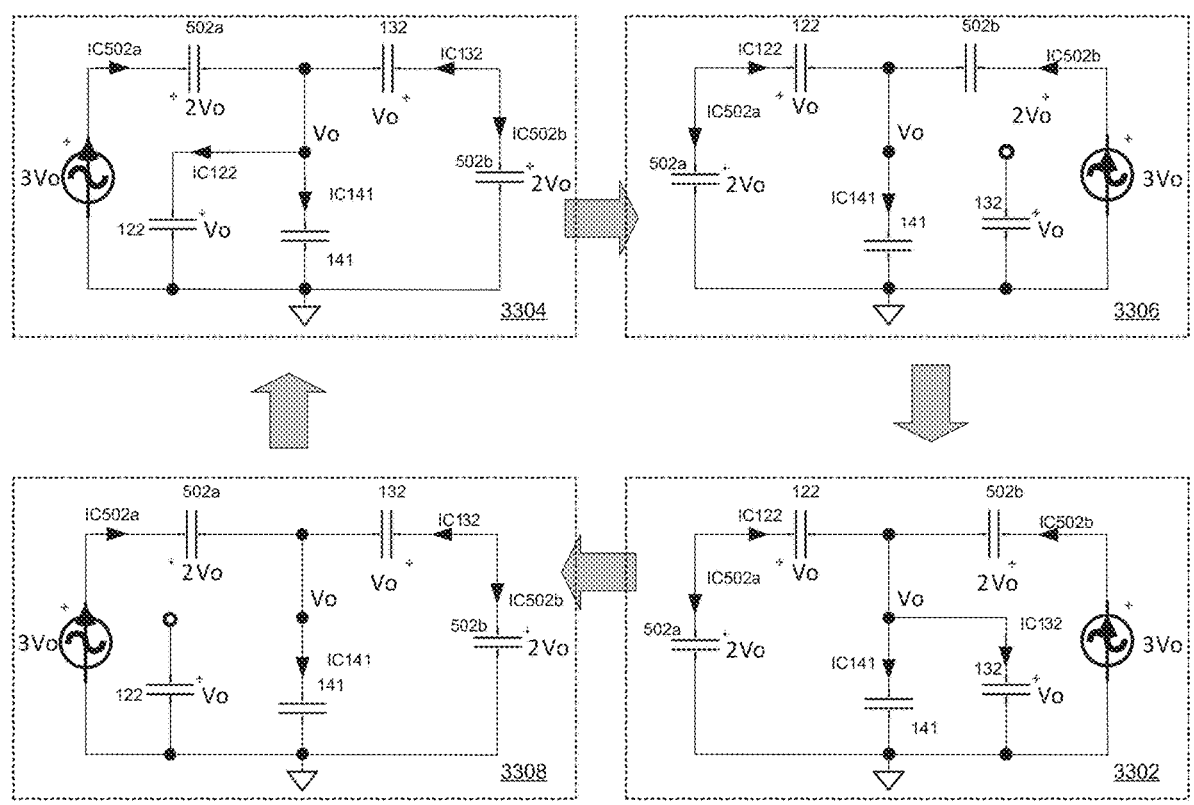
FIG. 33 illustrates four equivalent circuit diagrams for operating in two different operating modes in accordance with various embodiments of the present disclosure.

FIG. 33 illustrates four equivalent circuit diagrams for operating in two different operating modes in accordance with various embodiments of the present disclosure. The operating principle shown in FIG. 33 is similar to that shown in FIG. 29 except that a third equivalent circuit 3306 and a fourth equivalent circuit 3308 are added to avoid the power loss caused by charge transferring.

As shown in FIG. 33, the new control scheme extends the control of the step-down rectifier circuit in FIG. 30 from two equivalent circuits (shown in FIG. 29) to four equivalent circuits. At the beginning of the positive half cycle of the input AC current (time t0), the fourth equivalent circuit 3308 shows the operating principle of the step-down rectifier circuit. In order to avoid the charge transfer between the flying capacitors, only the series-connected flying capacitors 502*b* and 132 are used to charge the output capacitor 141, and provide power to the load. The fourth equivalent circuit 3308 shows the flying capacitor 122 is disconnected from the circuit by opening switch 121. It can be seen from FIG. 32 that the current flowing through the flying capacitor 122 is equal to zero during the period from t0 to t3.

As the voltage across the series-connected flying capacitors 502*b* and 132 discharges, the voltage on VOUT gradually decreases. At time t3, the voltage on VOUT and the voltage across the flying capacitor 122 are equal. At this time, the switch 121 is turned on to connect the flying capacitor 122 in parallel with the output as shown in the second equivalent circuit 3304. The flying capacitor 122 and the series-connected flying capacitors 502*b*, 132 supply power to the output capacitor and the load together. Since the voltage on VOUT and the voltage across the flying capacitor 122 are equal when the flying capacitor 122 is switched in, charge transfer does not occur. As shown in FIG. 32, current spikes do not occur.

At the beginning of the negative half cycle of the input AC current (time t1), the third equivalent circuit 3306 shows the operating principle of the step-down rectifier circuit. In order to avoid the charge transfer between the flying capacitors, only the series-connected flying capacitors 502*a* and 122 are used to charge the output capacitor 141, and provide power to the load. The third equivalent circuit 3306 shows the flying capacitor 132 is disconnected from the circuit by opening switch 131. It can be seen from FIG. 32 that the current flowing through the flying capacitors 122 and 502*a* increases significantly during the period from t1 to t4. This is because the flying capacitor 132 is disconnected, and all the output current is provided by the flying capacitors 122 and 502*a*.

As the voltage across the series-connected flying capacitors 502*a* and 122 discharges, the voltage on VOUT gradually decreases. At time t4, the voltage on VOUT and the voltage across the flying capacitor 132 are equal. At this time, the switch 131 is turned on to connect the flying capacitor 132 in parallel with the output as shown in the first equivalent circuit 3302. The flying capacitor 132 and the series-connected flying capacitors 502*a*, 122 supply power to the output capacitor and the load together. Since the voltage on VOUT and the voltage across the flying capacitor 132 are equal when the flying capacitor 132 is switched in, charge transfer does not occur. As shown in FIG. 32, current spikes do not occur.

Figure 34:
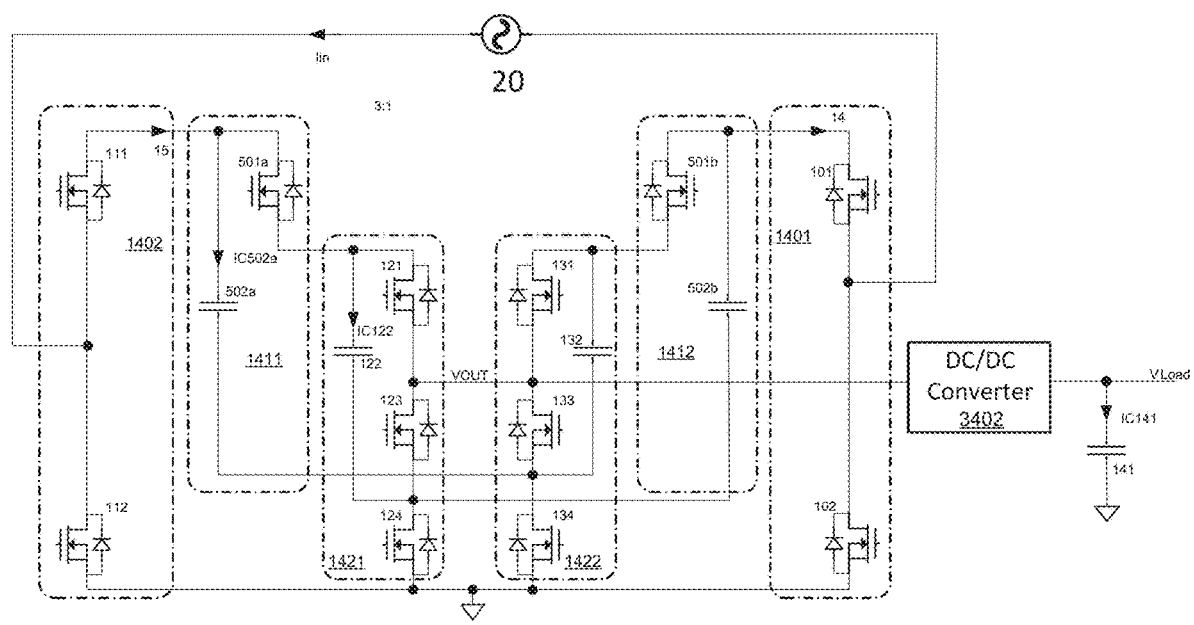
FIG. 34 illustrates a schematic diagram of a 3:1 step-down rectifier circuit including a DC/DC converter in accordance with various embodiments of the present disclosure.

FIG. 34 illustrates a schematic diagram of a 3:1 step-down rectifier circuit including a DC/DC converter in accordance with various embodiments of the present disclosure. As shown in the circuit in FIG. 34, based on the circuit structure in FIG. 14, the DC/DC converter 3402 is added between the VOUT terminal and the output capacitor 141.

Similar to the circuit in FIG. 30 used to eliminate the current spike in the output capacitor, this function can be realized by cascading the step-down rectifier circuit with the DC/DC converter 3402. As shown in FIG. 34, when the switching frequency of the DC/DC converter 3402 is much higher than the operating frequency of the step-down rectifier circuit, the DC/DC converter 3402 can be regarded as a current sink. A small filtering capacitor can be placed at the input of the DC/DC converter 3402 to filter out higher harmonics. This configuration can allow the voltage at VOUT to fluctuate within a certain range so as to effectively control the current spike when the flying capacitors in the step-down rectifier circuit are configured to supply power to the output, thereby reducing the charge transfer loss in the step-down rectifier circuit. However, when the step-down rectifier circuit includes the second-expansion unit described in the present disclosure, the circuit in FIG. 34 still needs the new control scheme described in FIG. 33. The waveforms of the circuit in FIG. 34 operating under the new control scheme will be discussed below with respect to FIG. 35.

Figure 35:
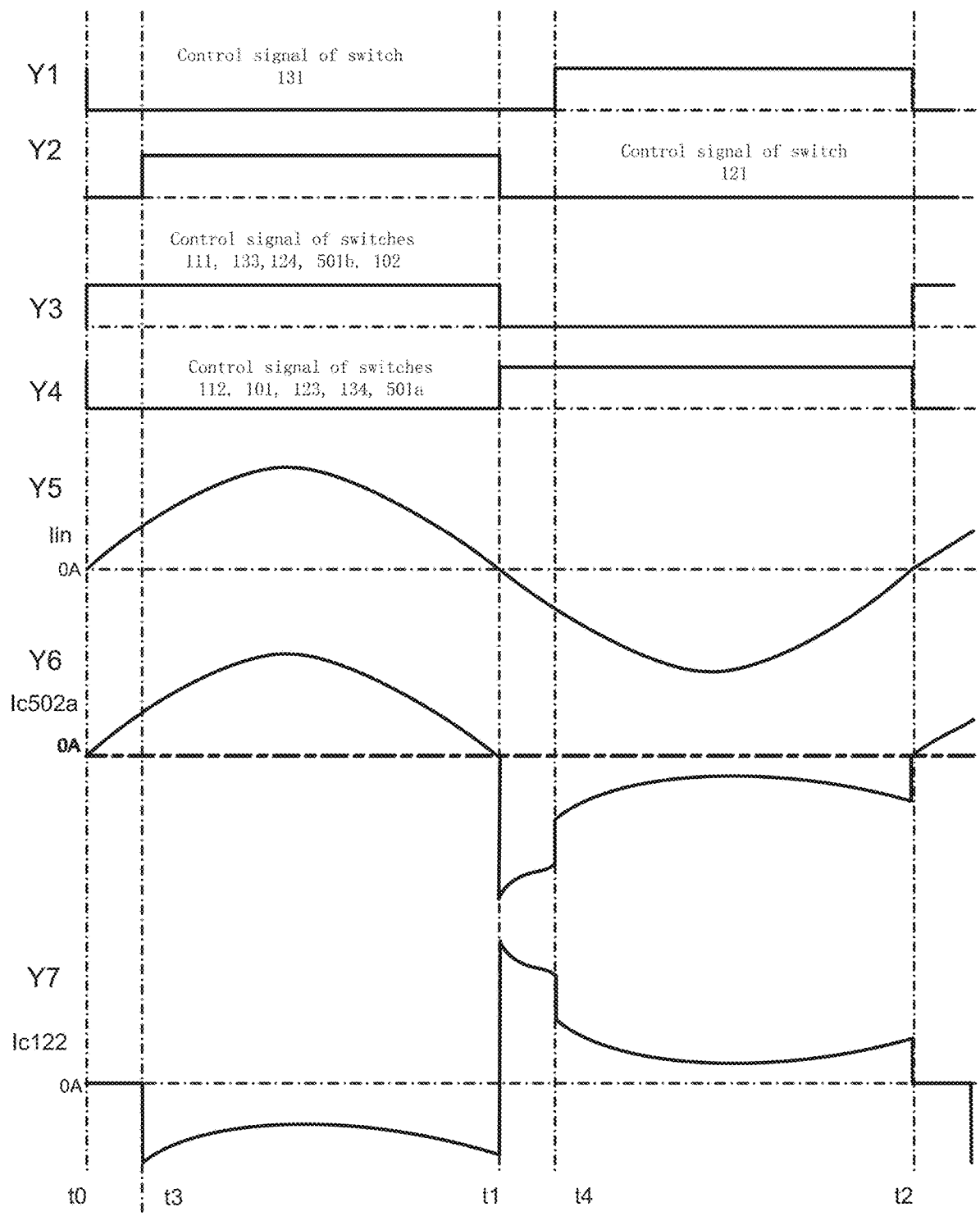
FIG. 35 illustrates various waveforms associated with the 3:1 step-down rectifier circuit shown in FIG. 34 operating the new control scheme in accordance with various embodiments of the present disclosure.

FIG. 35 illustrates various waveforms associated with the 3:1 step-down rectifier circuit shown in FIG. 34 operating the new control scheme in accordance with various embodiments of the present disclosure. The horizontal axis of FIG. 35 represents intervals of time. There may be seven vertical axes. The first vertical axis Y1 represents the gate drive signal of switch 131. The second vertical axis Y2 represents the gate drive signal of switch 121. The third vertical axis Y3 represents the gate drive signal of switches 111, 133, 124, 501*b* and 102. The fourth vertical axis Y4 represents the gate drive signal of switches 112, 101, 123, 134 and 501*a*. The fifth vertical axis Y5 represents the input current Iin. The sixth vertical axis Y6 represents the current Ic502a flowing through the flying capacitor 502a. The seventh vertical axis Y7 represents the current Ic122 flowing through the flying capacitor 122.

FIG. 35 shows after the new control scheme has been used, the voltage imbalance between two branches of the flying capacitor can be solved by delaying the connection of one branch of the flying capacitor in parallel with the output terminal until the voltage of the other branch of flying capacitors has been discharged to an equal voltage level. This method can eliminate current spikes and their corresponding charge transfer losses.

As shown in FIG. 35, the current waveforms of the currents Ic122 and Ic502 are relatively average. Basically, it can be considered that the loss of the step-down rectifier circuit is only the conduction loss of the switches. Because the method can make the step-down rectifier circuit based on the second-expansion units operate efficiently under the condition of a very low operating frequency and a small flying capacitance value, the higher frequency DC/DC with voltage regulation can realize a step-down rectifier circuit with high efficiency, high step-down ratio and low ripple.

It can be seen from FIG. 32 that by delaying the time when a single flying capacitor connected in parallel with the output is connected to the step-down rectifier circuit, current spikes can be eliminated. Even when the flying capacitor is small and the operating frequency is very low, the entire step-down rectifier circuit has almost no charge transfer loss during operation, so that the efficiency of the step-down rectifier circuit can be greatly improved. The same control method can be applied to the step-down rectifier circuit structure based on the second-expansion units in the present disclosure to achieve higher power conversion efficiency.

In accordance with an embodiment, the switches shown in various embodiments of the present disclosure may be MOSFET devices. Alternatively, the switches can be any controllable switches such as insulated gate bipolar transistor (IGBT) devices, integrated gate commutated thyristor (IGCT) devices, gate turn-off thyristor (GTO) devices, silicon-controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted while some embodiments shows the switches are implemented as depletion mode transistors, this is merely an example. A person skilled in the art would recognize there may be many variations, modifications and alternatives. For example, depending on different applications and design needs, all or at least some of the switches may be implemented as enhancement mode transistors. Furthermore, each switch the switches shown in various embodiments of the present disclosure may be implemented as a plurality of switches connected in parallel. Moreover, a capacitor may be connected in parallel with one switch to achieve zero voltage switching (ZVS)/zero current switching (ZCS).

In accordance with an embodiment, a wireless charging receiver circuit comprises a first bridge arm unit and a second bridge arm unit, wherein a midpoint of the first bridge arm unit and a midpoint of the second bridge arm unit are configured to be connected to two terminals of an ac current source, respectively, a first voltage converter unit and a second voltage converter unit, wherein a first switch common node of the first voltage converter unit and a first switch common node of the second voltage converter unit are connected together and further connected to an output terminal of the wireless charging receiver circuit, a flying capacitor of the first voltage converter unit is coupled between an input terminal of the first voltage converter unit and a second switch common node of the first voltage converter unit, and a flying capacitor of the second voltage converter unit is coupled between an input terminal of the second voltage converter unit and a second switch common node of the second voltage converter unit, a first second-expansion unit coupled between the second bridge arm unit and the first voltage converter unit, and a second second-expansion unit coupled between the first bridge arm unit and the second voltage converter unit.

In accordance with an embodiment, a method comprises providing a step-down rectifier circuit comprising a first bridge arm unit and a second bridge arm unit, wherein a midpoint of the first bridge arm unit and a midpoint of the second bridge arm unit are configured to be connected to two terminals of an ac source, respectively, a first voltage converter unit and a second voltage converter unit, wherein a first switch common node of the first voltage converter unit and a first switch common node of the second voltage converter unit are connected together and further connected to an output terminal of the step-down rectifier circuit, a flying capacitor of the first voltage converter unit is coupled between an input terminal of the first voltage converter unit and a second switch common node of the first voltage converter unit, and a flying capacitor of the second voltage converter unit is coupled between an input terminal of the second voltage converter unit and a second switch common node of the second voltage converter unit, a first second-expansion unit coupled between the second bridge arm unit and the first voltage converter unit, and a second second-expansion unit coupled between the first bridge arm unit and the second voltage converter unit, in a first half cycle of the ac current source, configuring an uppermost switch of the first voltage converter unit to be turned on after a first delay, and in a second half cycle of the ac current source, configuring an uppermost switch of the second voltage converter unit to be turned on after a second delay, wherein the first delay and the second delay are configured to prevent charge transferring between flying capacitors from occurring.

The first voltage converter unit comprises three switches connected in series between the input terminal of the first voltage converter unit and ground, and wherein a common node of a first switch and a second switch of the first voltage converter unit is the first switch common node of the first voltage converter unit, a common node of the second switch and a third switch of the first voltage converter unit is the second switch common node of the first voltage converter unit, the first switch of the first voltage converter unit is the uppermost switch of the first voltage converter unit, and the third switch of the first voltage converter unit is the bottommost switch of the first voltage converter unit.

It should be noted that the first switch common node of the first or second voltage converter unit described above is the same as the voltage output terminal of the first or second voltage converter unit discussed above with respect to FIG. 2.

The second voltage converter unit comprises three switches connected in series between the input terminal of the second voltage converter unit and ground, and wherein a common node of a first switch and a second switch of the second voltage converter unit is the first switch common node of the second voltage converter unit, a common node of the second switch and a third switch of the second voltage converter unit is the second switch common node of the second voltage converter unit, the first switch of the second voltage converter unit is the uppermost switch of the second voltage converter unit, and the third switch of the second voltage converter unit is the bottommost switch of the second voltage converter unit.

The first bridge arm unit comprises two switches connected in series between an input terminal of the first bridge arm unit and ground, and wherein a common node of a first switch and a second switch of the first bridge arm unit is the midpoint of the first bridge arm unit.

The second bridge arm unit comprises two switches connected in series between an input terminal of the second bridge arm unit and ground, and wherein a common node of a first switch and a second switch of the second bridge arm unit is the midpoint of the second bridge arm unit.

The first second-expansion unit comprises a switch and a flying capacitor, wherein the flying capacitor of the first second-expansion unit is coupled between the input terminal of the second bridge arm unit and the second switch common node of the second voltage converter unit, and the switch of the first second-expansion unit is coupled between the input terminal of the second bridge arm unit and the input terminal of the first voltage converter unit.

The second second-expansion unit comprises a switch and a flying capacitor, wherein the flying capacitor of the second second-expansion unit is coupled between the input terminal of the first bridge arm unit and the second switch common node of the first voltage converter unit, and the switch of the second second-expansion unit is coupled between the input terminal of the first bridge arm unit and the input terminal of the second voltage converter unit, and wherein the first voltage converter unit, the second voltage converter unit, the first bridge arm unit, the second bridge arm unit, the first second-expansion unit and the second second-expansion unit form a 3:1 step-down rectifier circuit.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A step-down rectifier circuit comprising:
   a first bridge arm unit and a second bridge arm unit, wherein a midpoint of the first bridge arm unit and a midpoint of the second bridge arm unit are configured to be connected to two terminals of an ac source, respectively;
   a first voltage converter unit and a second voltage converter unit, wherein:
      a first switch common node of the first voltage converter unit and a first switch common node of the second voltage converter unit are connected together and further connected to an output terminal of the step-down rectifier circuit;
      a flying capacitor of the first voltage converter unit is coupled between an input terminal of the first voltage converter unit and a second switch common node of the first voltage converter unit; and
      a flying capacitor of the second voltage converter unit is coupled between an input terminal of the second voltage converter unit and a second switch common node of the second voltage converter unit;
   a first second-expansion unit coupled between the second bridge arm unit and the first voltage converter unit; and
   a second second-expansion unit coupled between the first bridge arm unit and the second voltage converter unit.

2. The step-down rectifier circuit according to claim 1, wherein:
   the first voltage converter unit comprises three switches connected in series between the input terminal of the first voltage converter unit and ground, and wherein:
      a common node of a first switch and a second switch of the first voltage converter unit is the first switch common node of the first voltage converter unit; and
      a common node of the second switch and a third switch of the first voltage converter unit is the second switch common node of the first voltage converter unit;
   the second voltage converter unit comprises three switches connected in series between the input terminal of the second voltage converter unit and ground, and wherein:
      a common node of a first switch and a second switch of the second voltage converter unit is the first switch common node of the second voltage converter unit; and
      a common node of the second switch and a third switch of the second voltage converter unit is the second switch common node of the second voltage converter unit;
   the first bridge arm unit comprises two switches connected in series between an input terminal of the first bridge arm unit and ground, and wherein a common node of a first switch and a second switch of the first bridge arm unit is the midpoint of the first bridge arm unit;
   the second bridge arm unit comprises two switches connected in series between an input terminal of the second bridge arm unit and ground, and wherein a common node of a first switch and a second switch of the second bridge arm unit is the midpoint of the second bridge arm unit;
   the first second-expansion unit comprises a switch and a flying capacitor, wherein:
      the flying capacitor of the first second-expansion unit is coupled between the input terminal of the second bridge arm unit and the second switch common node of the second voltage converter unit; and
      the switch of the first second-expansion unit is coupled between the input terminal of the second bridge arm unit and the input terminal of the first voltage converter unit; and
   the second second-expansion unit comprises a switch and a flying capacitor, wherein:
      the flying capacitor of the second second-expansion unit is coupled between the input terminal of the first bridge arm unit and the second switch common node of the first voltage converter unit; and the switch of the second second-expansion unit is coupled between the input terminal of the first bridge arm unit and the input terminal of the second voltage converter unit.

3. The step-down rectifier circuit according to claim 2, wherein:
the first voltage converter unit, the second voltage converter unit, the first bridge arm unit, the second bridge arm unit, the first second-expansion unit and the second second-expansion unit form a 3:1 step-down rectifier circuit.

4. The step-down rectifier circuit according to claim 2, further comprising:
a third second-expansion unit coupled between the second bridge arm unit and the first second-expansion unit; and
a fourth second-expansion unit coupled between the first bridge arm unit and the second second-expansion unit, wherein:
the third second-expansion unit comprises three switches and a flying capacitor, and wherein:
a first switch of the third second-expansion unit is connected between the input terminal of the second bridge arm unit and the first second-expansion unit;
a second switch and a third switch of the third second-expansion unit are connected in series between the output terminal and ground; and
the flying capacitor of the third second-expansion unit is connected between the input terminal of the second bridge arm unit and a common node of the second switch and the third switch of the third second-expansion unit; and
the fourth second-expansion unit comprises three switches and a flying capacitor, and wherein:
a first switch of the fourth second-expansion unit is connected between the input terminal of the first bridge arm unit and the second second-expansion unit;
a second switch and a third switch of the fourth second-expansion unit are connected in series between the output terminal and ground; and
the flying capacitor of the fourth second-expansion unit is connected between the input terminal of the first bridge arm unit and a common node of the second switch and the third switch of the fourth second-expansion unit, and wherein the first voltage converter unit, the second voltage converter unit, the first bridge arm unit, the second bridge arm unit, the first second-expansion unit, the second second-expansion unit, the third second-expansion unit and the fourth second-expansion unit form a 4:1 step-down rectifier circuit.

5. The step-down rectifier circuit according to claim 2, further comprising:
a third second-expansion unit coupled between the second bridge arm unit and the first second-expansion unit; and
a fourth second-expansion unit coupled between the first bridge arm unit and the second second-expansion unit, wherein:
the third second-expansion unit comprises one switch and a flying capacitor, and wherein:
the one switch of the third second-expansion unit is connected between the input terminal of the second bridge arm unit and the first second-expansion unit; and
the flying capacitor of the third second-expansion unit is connected between the input terminal of the second bridge arm unit, and the common node of the second switch and the third switch of the first voltage converter unit; and
the fourth second-expansion unit comprises one switch and a flying capacitor, and wherein:
the one switch of the fourth second-expansion unit is connected between the input terminal of the first bridge arm unit and the second second-expansion unit; and
the flying capacitor of the fourth second-expansion unit is connected between the input terminal of the first bridge arm unit, and the common node of the second switch and the third switch of the second voltage converter unit, and wherein the first voltage converter unit, the second voltage converter unit, the first bridge arm unit, the second bridge arm unit, the first second-expansion unit, the second second-expansion unit, the third second-expansion unit and the fourth second-expansion unit form a 4:1 step-down rectifier circuit.

6. The step-down rectifier circuit according to claim 1, wherein:
the first voltage converter unit comprises three switches connected in series between the input terminal of the first voltage converter unit and ground, and wherein:
a common node of a first switch and a second switch of the first voltage converter unit is the first switch common node of the first voltage converter unit; and
a common node of the second switch and a third switch of the first voltage converter unit is the second switch common node of the first voltage converter unit;
the second voltage converter unit comprises three switches connected in series between the input terminal of the second voltage converter unit and ground, and wherein:
a common node of a first switch and a second switch of the second voltage converter unit is the first switch common node of the second voltage converter unit; and
a common node of the second switch and a third switch of the second voltage converter unit is the second switch common node of the second voltage converter unit;
the first bridge arm unit comprises two switches connected in series between an input terminal of the first bridge arm unit and ground, and wherein a common node of a first switch and a second switch of the first bridge arm unit is the midpoint of the first bridge arm unit;
the second bridge arm unit comprises two switches connected in series between an input terminal of the second bridge arm unit and ground, and wherein a common node of a first switch and a second switch of the second bridge arm unit is the midpoint of the second bridge arm unit;
the first second-expansion unit comprises three switches and a flying capacitor, wherein:
a first switch of the first second-expansion unit is coupled between the input terminal of the second bridge arm unit and the input terminal of the second voltage converter unit;
a second switch and a third switch of the first second-expansion unit are connected in series between the input terminal of the first voltage converter unit and ground; and
the flying capacitor of the first second-expansion unit is coupled between the input terminal of the second bridge arm unit and a common node of the second switch and the third switch of the first second-expansion unit; and the second second-expansion unit comprises three switches and a flying capacitor, wherein:
  a first switch of the second second-expansion unit is coupled between the input terminal of the first bridge arm unit and the input terminal of the first voltage converter unit;
  a second switch and a third switch of the second second-expansion unit are connected in series between the input terminal of the second voltage converter unit and ground; and
  the flying capacitor of the second second-expansion unit is coupled between the input terminal of the first bridge arm unit and a common node of the second switch and the third switch of the second second-expansion unit, and wherein the first voltage converter unit, the second voltage converter unit, the first bridge arm unit, the second bridge arm unit, the first second-expansion unit and the second second-expansion unit form a 4:1 step-down rectifier circuit.

7. The step-down rectifier circuit according to claim 1, further comprising:
  a third second-expansion unit coupled between the second bridge arm unit and the first second-expansion unit; and
  a fourth second-expansion unit coupled between the first bridge arm unit and the second second-expansion unit, wherein:
    the first voltage converter unit comprises three switches connected in series between the input terminal of the first voltage converter unit and ground, and wherein:
      a common node of a first switch and a second switch of the first voltage converter unit is the first switch common node of the first voltage converter unit; and
      a common node of the second switch and a third switch of the first voltage converter unit is the second switch common node of the first voltage converter unit;
    the second voltage converter unit comprises three switches connected in series between the input terminal of the second voltage converter unit and ground, and wherein:
      a common node of a first switch and a second switch of the second voltage converter unit is the first switch common node of the second voltage converter unit; and
      a common node of the second switch and a third switch of the second voltage converter unit is the second switch common node of the second voltage converter unit;
    the first bridge arm unit comprises two switches connected in series between an input terminal of the first bridge arm unit and ground, and wherein a common node of a first switch and a second switch of the first bridge arm unit is the midpoint of the first bridge arm unit;
    the second bridge arm unit comprises two switches connected in series between an input terminal of the second bridge arm unit and ground, and wherein a common node of a first switch and a second switch of the second bridge arm unit is the midpoint of the second bridge arm unit;
    the first second-expansion unit comprises a switch and a flying capacitor, wherein:
      the flying capacitor of the first second-expansion unit is coupled between an input terminal of the first second-expansion unit and the second switch common node of the second voltage converter unit; and
      the switch of the first second-expansion unit is coupled between the input terminal of the first second-expansion unit and the input terminal of the first voltage converter unit;
    the second second-expansion unit comprises a switch and a flying capacitor, wherein:
      the flying capacitor of the second second-expansion unit is coupled between an input terminal of the second second-expansion unit and the second switch common node of the first voltage converter unit; and
      the switch of the second second-expansion unit is coupled between the input terminal of the second second-expansion unit and the input terminal of the second voltage converter unit;
    the third second-expansion unit comprises three switches and a flying capacitor, wherein:
      a first switch of the third second-expansion unit is coupled between the input terminal of the second bridge arm unit and the input terminal of the second second-expansion unit;
      a second switch and a third switch of the third second-expansion unit are connected in series between the input terminal of the first second-expansion unit and ground; and
      the flying capacitor of the third second-expansion unit is coupled between the input terminal of the second bridge arm unit, and a common node of the second switch and the third switch of the third second-expansion unit; and
    the fourth second-expansion unit comprises three switches and a flying capacitor, wherein:
      a first switch of the fourth second-expansion unit is coupled between the input terminal of the first bridge arm unit and the input terminal of the first second-expansion unit;
      a second switch and a third switch of the fourth second-expansion unit are connected in series between the input terminal of the second second-expansion unit and ground; and
      the flying capacitor of the fourth second-expansion unit is coupled between the input terminal of the first bridge arm unit and a common node of the second switch and the third switch of the fourth second-expansion unit, and wherein the first voltage converter unit, the second voltage converter unit, the first bridge arm unit, the second bridge arm unit, the first second-expansion unit, the second second-expansion unit, the third second-expansion unit and the fourth second-expansion unit form a 6:1 step-down rectifier circuit.

8. The step-down rectifier circuit according to claim 1, further comprising:
  a third second-expansion unit coupled between the second bridge arm unit and the first second-expansion unit; and
  a fourth second-expansion unit coupled between the first bridge arm unit and the second second-expansion unit, wherein:
    the first voltage converter unit comprises three switches connected in series between the input terminal of the first voltage converter unit and ground, and wherein:

a common node of a first switch and a second switch of the first voltage converter unit is the first switch common node of the first voltage converter unit; and a common node of the second switch and a third switch of the first voltage converter unit is the second switch common node of the first voltage converter unit;

the second voltage converter unit comprises three switches connected in series between the input terminal of the second voltage converter unit and ground, and wherein:

a common node of a first switch and a second switch of the second voltage converter unit is the first switch common node of the second voltage converter unit; and a common node of the second switch and a third switch of the second voltage converter unit is the second switch common node of the second voltage converter unit;

the first bridge arm unit comprises two switches connected in series between an input terminal of the first bridge arm unit and ground, and wherein a common node of a first switch and a second switch of the first bridge arm unit is the midpoint of the first bridge arm unit;

the second bridge arm unit comprises two switches connected in series between an input terminal of the second bridge arm unit and ground, and wherein a common node of a first switch and a second switch of the second bridge arm unit is the midpoint of the second bridge arm unit;

the first second-expansion unit comprises three switches and a flying capacitor, wherein:

a first switch of the first second-expansion unit is coupled between an input terminal of the first second-expansion unit and the input terminal of the second voltage converter unit;

a second switch and a third switch of the first second-expansion unit are connected in series between the input terminal of the first voltage converter unit and ground; and the flying capacitor of the first second-expansion unit is coupled between the input terminal of the first second-expansion unit and a common node of the second switch and the third switch of the first second-expansion unit; and the second second-expansion unit comprises three switches and a flying capacitor, wherein:

a first switch of the second second-expansion unit is coupled between an input terminal of the second second-expansion unit and the input terminal of the first voltage converter unit;

a second switch and a third switch of the second second-expansion unit are connected in series between the input terminal of the second voltage converter unit and ground; and the flying capacitor of the second second-expansion unit is coupled between the input terminal of the second second-expansion unit and a common node of the second switch and the third switch of the second second-expansion unit;

the third second-expansion unit comprises three switches and a flying capacitor, wherein:

a first switch of the third second-expansion unit is coupled between the input terminal of the second bridge arm unit and the input terminal of the second second-expansion unit;

a second switch and a third switch of the third second-expansion unit are connected in series between the input terminal of the first second-expansion unit and ground; and the flying capacitor of the third second-expansion unit is coupled between the input terminal of the second bridge arm unit and a common node of the second switch and the third switch of the third second-expansion unit; and the fourth second-expansion unit comprises three switches and a flying capacitor, wherein:

a first switch of the fourth second-expansion unit is coupled between the input terminal of the first bridge arm unit and the input terminal of the first second-expansion unit;

a second switch and a third switch of the fourth second-expansion unit are connected in series between the input terminal of the second second-expansion unit and ground; and the flying capacitor of the fourth second-expansion unit is coupled between the input terminal of the first bridge arm unit and a common node of the second switch and the third switch of the fourth second-expansion unit, and wherein the first voltage converter unit, the second voltage converter unit, the first bridge arm unit, the second bridge arm unit, the first second-expansion unit, the second second-expansion unit, the third second-expansion unit and the fourth second-expansion unit form an 8:1 step-down rectifier circuit.

9. The step-down rectifier circuit according to claim 1, further comprising:

a third second-expansion unit coupled between the second bridge arm unit and the first second-expansion unit; and a fourth second-expansion unit coupled between the first bridge arm unit and the second second-expansion unit, wherein:

the first voltage converter unit comprises three switches connected in series between the input terminal of the first voltage converter unit and ground, and wherein:

a common node of a first switch and a second switch of the first voltage converter unit is the first switch common node of the first voltage converter unit; and a common node of the second switch and a third switch of the first voltage converter unit is the second switch common node of the first voltage converter unit;

the second voltage converter unit comprises three switches connected in series between the input terminal of the second voltage converter unit and ground, and wherein:

a common node of a first switch and a second switch of the second voltage converter unit is the first switch common node of the second voltage converter unit; and a common node of the second switch and a third switch of the second voltage converter unit is the second switch common node of the second voltage converter unit;

the first bridge arm unit comprises two switches connected in series between an input terminal of the first bridge arm unit and ground, and wherein a common node of a first switch and a second switch of the first bridge arm unit is the midpoint of the first bridge arm unit;

the second bridge arm unit comprises two switches connected in series between an input terminal of the second bridge arm unit and ground, and wherein a common node of a first switch and a second switch of the second bridge arm unit is the midpoint of the second bridge arm unit;

the first second-expansion unit comprises a switch and a flying capacitor, wherein:
the flying capacitor of the first second-expansion unit is coupled between an input terminal of the first second-expansion unit and the second switch common node of the second voltage converter unit; and
the switch of the first second-expansion unit is coupled between the input terminal of the first second-expansion unit and the input terminal of the first voltage converter unit;

the second second-expansion unit comprises a switch and a flying capacitor, wherein:
the flying capacitor of the second second-expansion unit is coupled between an input terminal of the second second-expansion unit and the second switch common node of the first voltage converter unit; and
the switch of the second second-expansion unit is coupled between the input terminal of the second second-expansion unit and the input terminal of the second voltage converter unit;

the third second-expansion unit comprises three switches and a flying capacitor, wherein:
a first switch of the third second-expansion unit is coupled between the input terminal of the second bridge arm unit and the input terminal of the first second-expansion unit;
a second switch and a third switch of the third second-expansion unit are connected in series between the input terminal of the first voltage converter unit and ground; and
the flying capacitor of the third second-expansion unit is coupled between the input terminal of the second bridge arm unit and a common node of the second switch and the third switch of the third second-expansion unit; and the fourth second-expansion unit comprises three switches and a flying capacitor, wherein:
a first switch of the fourth second-expansion unit is coupled between the input terminal of the first bridge arm unit and the input terminal of the second second-expansion unit;
a second switch and a third switch of the fourth second-expansion unit are connected in series between the input terminal of the second voltage converter unit and ground; and
the flying capacitor of the fourth second-expansion unit is coupled between the input terminal of the first bridge arm unit and a common node of the second switch and the third switch of the fourth second-expansion unit, and wherein the first voltage converter unit, the second voltage converter unit, the first bridge arm unit, the second bridge arm unit, the first second-expansion unit, the second second-expansion unit, the third second-expansion unit and the fourth second-expansion unit form a 5:1 step-down rectifier circuit.

10. The step-down rectifier circuit according to claim 9, further comprising:
a fifth second-expansion unit coupled between the second bridge arm unit and the third second-expansion unit; and
a sixth second-expansion unit coupled between the first bridge arm unit and the fourth second-expansion unit, wherein:
the fifth second-expansion unit comprises a switch and a flying capacitor, and wherein:
the flying capacitor of the fifth second-expansion unit is coupled between the input terminal of the second bridge arm unit and the second switch common node of the second voltage converter unit; and
the switch of the fifth second-expansion unit is coupled between the input terminal of the second bridge arm unit and the input terminal of the third second-expansion unit;
the sixth second-expansion unit comprises a switch and a flying capacitor, and wherein:
the flying capacitor of the sixth second-expansion unit is coupled between the input terminal of the second bridge arm unit and the second switch common node of the first voltage converter unit; and
the switch of the sixth second-expansion unit is coupled between the input terminal of the first bridge arm unit and the input terminal of the fourth second-expansion unit, and wherein the first voltage converter unit, the second voltage converter unit, the first bridge arm unit, the second bridge arm unit, the first second-expansion unit, the second second-expansion unit, the third second-expansion unit, the fourth second-expansion unit, the fifth second-expansion unit and the sixth second-expansion unit form a 6:1 step-down rectifier circuit.

11. The step-down rectifier circuit according to claim 9, further comprising:
a fifth second-expansion unit coupled between the second bridge arm unit and the third second-expansion unit; and
a sixth second-expansion unit coupled between the first bridge arm unit and the fourth second-expansion unit, wherein:
the fifth second-expansion unit comprises a switch and a flying capacitor, and wherein:
the flying capacitor of the fifth second-expansion unit is coupled between the input terminal of the second bridge arm unit and the common node of the second switch and the third switch of the fourth second-expansion unit; and
the switch of the fifth second-expansion unit is coupled between the input terminal of the second bridge arm unit and the input terminal of the third second-expansion unit;
the sixth second-expansion unit comprises a switch and a flying capacitor, and wherein:
the flying capacitor of the sixth second-expansion unit is coupled between the input terminal of the second bridge arm unit and the common node of the second switch and the third switch of the third second-expansion unit; and
the switch of the sixth second-expansion unit is coupled between the input terminal of the first bridge arm unit and the input terminal of the fourth second-expansion unit, and wherein the first voltage converter unit, the second voltage converter unit, the first bridge arm unit, the second bridge arm unit, the first second-expansion unit, the second second-expansion unit, the third second-expansion unit, the fourth second-expansion unit, the fifth second-expansion unit and the sixth second-expansion unit form a 7:1 step-down rectifier circuit.

12. The step-down rectifier circuit according to claim 9, further comprising:
a fifth second-expansion unit coupled between the second bridge arm unit and the third second-expansion unit; and
a sixth second-expansion unit coupled between the first bridge arm unit and the fourth second-expansion unit, wherein:
the fifth second-expansion unit comprises three switches and a flying capacitor, wherein:
a first switch of the fifth second-expansion unit is coupled between the input terminal of the second bridge arm unit and the input terminal of the third second-expansion unit;
a second switch and a third switch of the fifth second-expansion unit are connected in series between the input terminal of the first second-expansion unit and ground; and
the flying capacitor of the fifth second-expansion unit is coupled between the input terminal of the second bridge arm unit and a common node of the second switch and the third switch of the fifth second-expansion unit; and
the sixth second-expansion unit comprises three switches and a flying capacitor, wherein:
a first switch of the sixth second-expansion unit is coupled between the input terminal of the first bridge arm unit and the input terminal of the fourth second-expansion unit;
a second switch and a third switch of the sixth second-expansion unit are connected in series between the input terminal of the second second-expansion unit and ground; and
the flying capacitor of the sixth second-expansion unit is coupled between the input terminal of the first bridge arm unit and a common node of the second switch and the third switch of the sixth second-expansion unit, and wherein the first voltage converter unit, the second voltage converter unit, the first bridge arm unit, the second bridge arm unit, the first second-expansion unit, the second second-expansion unit, the third second-expansion unit, the fourth second-expansion unit, the fifth second-expansion unit and the sixth second-expansion unit form an 8:1 step-down rectifier circuit.

13. The step-down rectifier circuit according to claim 9, further comprising:
a fifth second-expansion unit coupled between the second bridge arm unit and the third second-expansion unit; and
a sixth second-expansion unit coupled between the first bridge arm unit and the fourth second-expansion unit, wherein:
the fifth second-expansion unit comprises three switches and a flying capacitor, wherein:
a first switch of the fifth second-expansion unit is coupled between the input terminal of the second bridge arm unit and the input terminal of the fourth second-expansion unit;
a second switch and a third switch of the fifth second-expansion unit are connected in series between the input terminal of the third second-expansion unit and ground; and
the flying capacitor of the fifth second-expansion unit is coupled between the input terminal of the second bridge arm unit and a common node of the second switch and the third switch of the fifth second-expansion unit; and
the sixth second-expansion unit comprises three switches and a flying capacitor, wherein:
a first switch of the sixth second-expansion unit is coupled between the input terminal of the first bridge arm unit and the input terminal of the third second-expansion unit;
a second switch and a third switch of the sixth second-expansion unit are connected in series between the input terminal of the fourth second-expansion unit and ground; and
the flying capacitor of the sixth second-expansion unit is coupled between the input terminal of the first bridge arm unit and a common node of the second switch and the third switch of the sixth second-expansion unit, and wherein the first voltage converter unit, the second voltage converter unit, the first bridge arm unit, the second bridge arm unit, the first second-expansion unit, the second second-expansion unit, the third second-expansion unit, the fourth second-expansion unit, the fifth second-expansion unit and the sixth second-expansion unit form a 10:1 step-down rectifier circuit.

14. The step-down rectifier circuit according to claim 1, further comprising a frequency multiplier unit comprising four switches, wherein:
a first switch of the frequency multiplier unit is coupled between the second bridge arm unit and the first second-expansion unit;
a second switch of the frequency multiplier unit is coupled between the second bridge arm unit and the second second-expansion unit;
a third switch of the frequency multiplier unit is coupled between the first bridge arm unit and the first second-expansion unit; and
a fourth switch of the frequency multiplier unit is coupled between the first bridge arm unit and the second second-expansion unit.

15. The step-down rectifier circuit according to claim 1, further comprising a frequency multiplier unit comprising two switches, wherein:
a first switch of the frequency multiplier unit is coupled between the second bridge arm unit and the first second-expansion unit; and
a second switch of the frequency multiplier unit is coupled between the second bridge arm unit and the second second-expansion unit, and wherein an input terminal of the first bridge arm unit is coupled to an input terminal of the second bridge arm unit.

16. The step-down rectifier circuit according to claim 1, further comprising a frequency multiplier unit comprising two switches and a capacitor, wherein:
a first switch of the frequency multiplier unit is coupled between the second bridge arm unit and the first second-expansion unit; and a second switch of the frequency multiplier unit is coupled between the second bridge arm unit and the second second-expansion unit, and wherein an input terminal of the first bridge arm unit is coupled to an input terminal of the second bridge arm unit and further coupled to the capacitor.

17. The step-down rectifier circuit according to claim 1, further comprising:
an inductor coupled between the output terminal of the step-down rectifier circuit and a load.

18. The step-down rectifier circuit according to claim 1, further comprising:
a DC/DC converter coupled between the output terminal of the step-down rectifier circuit and a load.

19. A method comprising:
providing a step-down rectifier circuit comprising:
  a first bridge arm unit and a second bridge arm unit, wherein a midpoint of the first bridge arm unit and a midpoint of the second bridge arm unit are configured to be connected to two terminals of an ac current source, respectively;
  a first voltage converter unit and a second voltage converter unit, wherein:
    a first switch common node of the first voltage converter unit and a first switch common node of the second voltage converter unit are connected together and further connected to an output terminal of the step-down rectifier circuit;
    a flying capacitor of the first voltage converter unit is coupled between an input terminal of the first voltage converter unit and a second switch common node of the first voltage converter unit; and
    a flying capacitor of the second voltage converter unit is coupled between an input terminal of the second voltage converter unit and a second switch common node of the second voltage converter unit;
  a first second-expansion unit coupled between the second bridge arm unit and the first voltage converter unit; and
  a second second-expansion unit coupled between the first bridge arm unit and the second voltage converter unit;
in a first half cycle of the ac current source, configuring an uppermost switch of the first voltage converter unit to be turned on after a first delay; and
in a second half cycle of the ac current source, configuring an uppermost switch of the second voltage converter unit to be turned on after a second delay, wherein the first delay and the second delay are configured to prevent charge transferring between flying capacitors from occurring.

20. The method according to claim 19, wherein:
the first voltage converter unit comprises three switches connected in series between the input terminal of the first voltage converter unit and ground, and wherein:
  a common node of a first switch and a second switch of the first voltage converter unit is the first switch common node of the first voltage converter unit;
  a common node of the second switch and a third switch of the first voltage converter unit is the second switch common node of the first voltage converter unit;
  the first switch of the first voltage converter unit is the uppermost switch of the first voltage converter unit; and
  the third switch of the first voltage converter unit is a bottommost switch of the first voltage converter unit;
the second voltage converter unit comprises three switches connected in series between the input terminal of the second voltage converter unit and ground, and wherein:
  a common node of a first switch and a second switch of the second voltage converter unit is the first switch common node of the second voltage converter unit;
  a common node of the second switch and a third switch of the second voltage converter unit is the second switch common node of the second voltage converter unit;
  the first switch of the second voltage converter unit is the uppermost switch of the second voltage converter unit; and
  the third switch of the second voltage converter unit is a bottommost switch of the second voltage converter unit;
the first bridge arm unit comprises two switches connected in series between an input terminal of the first bridge arm unit and ground, and wherein a common node of a first switch and a second switch of the first bridge arm unit is the midpoint of the first bridge arm unit;
the second bridge arm unit comprises two switches connected in series between an input terminal of the second bridge arm unit and ground, and wherein a common node of a first switch and a second switch of the second bridge arm unit is the midpoint of the second bridge arm unit;
the first second-expansion unit comprises a switch and a flying capacitor, wherein:
  the flying capacitor of the first second-expansion unit is coupled between the input terminal of the second bridge arm unit and the second switch common node of the second voltage converter unit; and
  the switch of the first second-expansion unit is coupled between the input terminal of the second bridge arm unit and the input terminal of the first voltage converter unit; and
the second second-expansion unit comprises a switch and a flying capacitor, wherein:
  the flying capacitor of the second second-expansion unit is coupled between the input terminal of the first bridge arm unit and the second switch common node of the first voltage converter unit; and
  the switch of the second second-expansion unit is coupled between the input terminal of the first bridge arm unit and the input terminal of the second voltage converter unit, and wherein the first voltage converter unit, the second voltage converter unit, the first bridge arm unit, the second bridge arm unit, the first second-expansion unit and the second second-expansion unit form a 3:1 step-down rectifier circuit.

* * * * *